US009244606B2

(12) United States Patent
Kocienda et al.

(10) Patent No.: US 9,244,606 B2
(45) Date of Patent: Jan. 26, 2016

(54) DEVICE, METHOD, AND GRAPHICAL USER INTERFACE FOR NAVIGATION OF CONCURRENTLY OPEN SOFTWARE APPLICATIONS

(75) Inventors: Kenneth L. Kocienda, San Jose, CA (US); Imran Chaudhri, San Francisco, CA (US)

(73) Assignee: APPLE INC., Cupertino, CA (US)

( * ) Notice: Subject to any disclaimer, the term of this patent is extended or adjusted under 35 U.S.C. 154(b) by 646 days.

(21) Appl. No.: 13/077,524

(22) Filed: Mar. 31, 2011

(65) Prior Publication Data

US 2012/0159380 A1 Jun. 21, 2012

Related U.S. Application Data

(60) Provisional application No. 61/425,207, filed on Dec. 20, 2010.

(51) Int. Cl.
*G06F 3/0488* (2013.01)

(52) U.S. Cl.
CPC ........ *G06F 3/04883* (2013.01); *G06F 3/04886* (2013.01)

(58) Field of Classification Search
CPC ... G06F 3/0481; G06F 3/0482; G06F 3/0485; G06F 3/04817; G06F 3/016; G06F 3/017
USPC ......... 715/779, 810, 764, 830, 836, 702, 790, 715/835, 841, 854, 863
See application file for complete search history.

(56) References Cited

U.S. PATENT DOCUMENTS

| 5,910,882 A | 6/1999 | Burrell |
| 6,115,043 A | 9/2000 | Levine et al. |
| 6,323,846 B1 | 11/2001 | Westerman et al. |

(Continued)

FOREIGN PATENT DOCUMENTS

| CN | 1658150 A | 8/2005 |
| CN | 1661556 A | 8/2005 |

(Continued)

OTHER PUBLICATIONS

Final Office Action dated Nov. 19, 2012, received in U.S. Appl. No. 12/888,381 16 pages (Chaudhri).

(Continued)

*Primary Examiner* — Rashawn Tillery
(74) *Attorney, Agent, or Firm* — Morrison & Foerster LLP

(57) ABSTRACT

An electronic device includes a touch-sensitive display and one or more programs stored in memory for execution by one or more processors. The one or more programs include instructions for displaying a first application view that corresponds to a first application in a plurality of concurrently open applications. The one or more programs include instructions for detecting a first input, and in response, concurrently displaying a group of open application icons that correspond to at least some of the plurality of concurrently open applications with at least a portion of the first application view. The open application icons are displayed in accordance with a predetermined sequence of the open applications. The one or more programs include instructions for detecting a first gesture distinct from the first input, and in response, displaying a second application view that corresponds to a second application adjacent to the first application in the predetermined sequence.

21 Claims, 36 Drawing Sheets

(56) References Cited

U.S. PATENT DOCUMENTS

| | | |
|---|---|---|
| 6,396,962 B1 | 5/2002 | Haffey et al. |
| 6,459,424 B1 | 10/2002 | Resman |
| 6,459,442 B1 | 10/2002 | Edwards et al. |
| 6,489,975 B1 | 12/2002 | Patil et al. |
| 6,570,557 B1 | 5/2003 | Westerman et al. |
| 6,677,932 B1 | 1/2004 | Westerman |
| 6,831,666 B1 | 12/2004 | Kreis |
| 7,036,088 B2 | 4/2006 | Tunney |
| 7,134,093 B2 | 11/2006 | Etgen et al. |
| 7,346,855 B2 | 3/2008 | Hellyar et al. |
| 7,380,218 B2 | 5/2008 | Rundell |
| 7,441,204 B2 | 10/2008 | Thomson et al. |
| 7,581,186 B2 | 8/2009 | Dowdy et al. |
| 7,614,008 B2 | 11/2009 | Ording |
| 7,633,076 B2 | 12/2009 | Huppi et al. |
| 7,653,883 B2 | 1/2010 | Hotelling et al. |
| 7,657,849 B2 | 2/2010 | Chaudhri et al. |
| 7,663,607 B2 | 2/2010 | Hotelling et al. |
| 7,673,255 B2 | 3/2010 | Schechter et al. |
| 7,680,513 B2 | 3/2010 | Haitani et al. |
| 7,694,231 B2 | 4/2010 | Kocienda et al. |
| 7,694,236 B2 | 4/2010 | Gusmorino et al. |
| 7,739,604 B1 | 6/2010 | Lyons et al. |
| 7,757,185 B2 | 7/2010 | Paquette et al. |
| 7,788,595 B2 | 8/2010 | Biwer et al. |
| 7,844,914 B2 | 11/2010 | Andre et al. |
| 7,880,728 B2 | 2/2011 | de los Reyes et al. |
| 7,921,373 B2 | 4/2011 | Yamashita et al. |
| 7,957,762 B2 | 6/2011 | Herz et al. |
| 8,006,002 B2 | 8/2011 | Kalayjian et al. |
| 8,010,900 B2 | 8/2011 | Hart et al. |
| 8,020,028 B1 | 9/2011 | Lutter |
| 8,024,670 B1 | 9/2011 | Rahmatian et al. |
| 8,046,712 B2 | 10/2011 | Landman et al. |
| 8,214,768 B2 | 7/2012 | Boule et al. |
| 8,239,784 B2 | 8/2012 | Hotelling et al. |
| 8,279,180 B2 | 10/2012 | Hotelling et al. |
| 8,381,135 B2 | 2/2013 | Hotelling et al. |
| 8,438,504 B2 | 5/2013 | Cranfill et al. |
| 8,479,122 B2 | 7/2013 | Hotelling et al. |
| 8,806,369 B2 | 8/2014 | Khoe et al. |
| 9,058,186 B2 | 6/2015 | Chaudhri |
| 2002/0015024 A1 | 2/2002 | Westerman et al. |
| 2002/0075289 A1 | 6/2002 | Hatori et al. |
| 2002/0149609 A1 | 10/2002 | Suzuki et al. |
| 2003/0119562 A1 | 6/2003 | Kokubo |
| 2004/0025112 A1 | 2/2004 | Chasen et al. |
| 2004/0085328 A1 | 5/2004 | Maruyama et al. |
| 2004/0155908 A1 | 8/2004 | Wagner |
| 2004/0174398 A1 | 9/2004 | Luke et al. |
| 2005/0022138 A1 | 1/2005 | Tunney |
| 2005/0177798 A1 | 8/2005 | Thomson et al. |
| 2005/0190059 A1 | 9/2005 | Wehrenberg |
| 2006/0017692 A1 | 1/2006 | Wehrenberg et al. |
| 2006/0026536 A1 | 2/2006 | Hotelling et al. |
| 2006/0033724 A1 | 2/2006 | Chaudhri et al. |
| 2006/0055662 A1 | 3/2006 | Rimas-Ribikauskas et al. |
| 2006/0107226 A1 | 5/2006 | Matthews et al. |
| 2006/0161861 A1 | 7/2006 | Holecek et al. |
| 2006/0197753 A1 | 9/2006 | Hotelling |
| 2006/0242602 A1 | 10/2006 | Schechter et al. |
| 2006/0265653 A1* | 11/2006 | Paasonen et al. ............. 715/704 |
| 2007/0004451 A1 | 1/2007 | Anderson |
| 2007/0128899 A1 | 6/2007 | Mayer |
| 2007/0152980 A1 | 7/2007 | Kocienda et al. |
| 2007/0157089 A1 | 7/2007 | van Os et al. |
| 2007/0220445 A1* | 9/2007 | Yach et al. .................... 715/790 |
| 2007/0226327 A1 | 9/2007 | Redpath |
| 2007/0262964 A1 | 11/2007 | Zotov et al. |
| 2007/0294639 A1 | 12/2007 | Van Berkel et al. |
| 2008/0036743 A1 | 2/2008 | Westerman et al. |
| 2008/0094368 A1 | 4/2008 | Ording et al. |
| 2008/0109753 A1 | 5/2008 | Karstens |
| 2008/0165144 A1 | 7/2008 | Forstall et al. |
| 2008/0165152 A1 | 7/2008 | Forstall et al. |
| 2008/0168379 A1* | 7/2008 | Forstall et al. ................ 715/778 |
| 2008/0168401 A1 | 7/2008 | Boule et al. |
| 2008/0211959 A1 | 9/2008 | Balram et al. |
| 2008/0222545 A1 | 9/2008 | Lemay et al. |
| 2008/0270910 A1 | 10/2008 | Lukasik et al. |
| 2008/0316183 A1 | 12/2008 | Westerman et al. |
| 2008/0320391 A1 | 12/2008 | Lemay et al. |
| 2009/0036108 A1* | 2/2009 | Cho .............................. 455/418 |
| 2009/0094562 A1 | 4/2009 | Jeong et al. |
| 2009/0293007 A1* | 11/2009 | Duarte et al. ................. 715/767 |
| 2010/0023858 A1 | 1/2010 | Ryu |
| 2010/0088628 A1* | 4/2010 | Flygh et al. ................... 715/779 |
| 2010/0125816 A1 | 5/2010 | Bezos |
| 2010/0156812 A1 | 6/2010 | Stallings et al. |
| 2010/0269039 A1 | 10/2010 | Pahlavan et al. |
| 2010/0299597 A1* | 11/2010 | Shin et al. ..................... 715/702 |
| 2011/0035662 A1 | 2/2011 | King et al. |
| 2011/0043652 A1 | 2/2011 | King et al. |
| 2011/0087982 A1 | 4/2011 | McCann et al. |
| 2011/0096174 A1 | 4/2011 | King et al. |
| 2011/0145068 A1 | 6/2011 | King et al. |
| 2011/0164042 A1 | 7/2011 | Chaudhri |
| 2011/0167058 A1 | 7/2011 | van Os |
| 2011/0167339 A1 | 7/2011 | Lemay |
| 2011/0167382 A1 | 7/2011 | van Os |
| 2011/0202872 A1* | 8/2011 | Park .............................. 715/790 |
| 2011/0252357 A1 | 10/2011 | Chaudhri |
| 2011/0252376 A1 | 10/2011 | Chaudhri et al. |
| 2011/0258582 A1 | 10/2011 | Bang |
| 2011/0296333 A1* | 12/2011 | Bateman et al. ............... 715/773 |
| 2011/0307778 A1 | 12/2011 | Tsai et al. |
| 2012/0159380 A1 | 6/2012 | Kocienda et al. |
| 2012/0216139 A1 | 8/2012 | Ording et al. |
| 2012/0216143 A1 | 8/2012 | Shiplacoff et al. |
| 2012/0218304 A1 | 8/2012 | Anzures et al. |
| 2013/0080923 A1 | 3/2013 | Anzures et al. |
| 2013/0232445 A1 | 9/2013 | Ording et al. |

FOREIGN PATENT DOCUMENTS

| | | |
|---|---|---|
| CN | 1955906 | 5/2007 |
| CN | 101102573 | 1/2008 |
| CN | 201107762 Y | 8/2008 |
| CN | 101727268 A | 6/2010 |
| EP | 1 562 105 A2 | 8/2005 |
| EP | 1 568 966 A2 | 8/2005 |
| EP | 1 571 549 A2 | 9/2005 |
| EP | 1 640 855 A2 | 3/2006 |
| GB | 2 350 991 | 12/2000 |
| JP | 2000-148348 A | 5/2000 |
| JP | 2002-41023 A | 2/2002 |
| JP | 2002-268867 A | 9/2002 |
| JP | 2002 286489 | 10/2002 |
| JP | 2003 084744 | 3/2003 |
| JP | 2004-152169 A | 5/2004 |
| JP | 2005-70777 A | 3/2005 |
| JP | 2005-222553 A | 8/2005 |
| JP | 2005-309933 A | 11/2005 |
| JP | 2007-517462 A | 6/2007 |
| JP | 2008-17373 A | 1/2008 |
| JP | 2008-76818 A | 4/2008 |
| JP | 2008-76853 A | 4/2008 |
| JP | 2009-217815 A | 9/2009 |
| KR | 10-2010-0010302 A | 2/2010 |
| KR | 10-2010-0023637 A | 3/2010 |
| KR | 2010 0034608 | 4/2010 |
| WO | 2006/073020 A1 | 7/2006 |
| WO | WO 2009/059062 | 5/2009 |
| WO | WO 2009/143294 | 11/2009 |
| WO | 2009/148781 A1 | 12/2009 |

OTHER PUBLICATIONS

Office Action dated Aug. 28, 2012, received in Chinese Patent Application No. 201010602688.2, which corresponds to U.S. Appl. No. 12/888,381, 6 pages. (Chaudhri).

Final Office Action dated Nov. 15, 2012, received in U.S. Appl. No. 12/888,382, 14 pages (Chaudhri).

(56) References Cited

OTHER PUBLICATIONS

Final Office Action dated Nov. 7, 2012, received in U.S. Appl. No. 12/888,384, 5 pages, (Chaudhri).
Final Office Action dated Nov. 8, 2012, recieved in U.S. Appl. No. 12/888,386, 16 pages (Chaudhri).
Office Action dated Jan. 23, 2013, received in U.S. Appl. No. 12/888,389, 14 pages (Chaudhri).
Apple: "iPhone User Guide for iPhone and iPhone 3G," Jul. 11, 2008, 154 pages, http://manuals.info.apple.com/en_US/iPhone_User_Guide.pdf.
HTC, "User Manual—PDA Phone—HTC_P3050 Touch," Nov. 2, 2007, pp. 12-28, http://web.archive.org/web/20101228223033/http://www.comparecellular.com/images/phones/userguide1130.pdf.
Jade et al., "Apple's iPhone 4.0 to support multitasking via Expose-like interface," appleInsider.com, Mar. 31, 2010, 4 pages, http://www.appleinsider.com/articles/10/03/31/apples_iphone_4_0_to_support_multitasking_via_expose_like_interface.html.
Jade et al,, "Apple's iPhone 4.0 software to deliver multitasking support," AppleInsider.com, Mar. 11, 2010, 3 pages, http://www.appleinsider.com/articles/10/03/11/apples_iphone_4_0_sotfware_to_deliver_multitasking_support.html.
Newman, "Sprint's HTC EVO 4G: 5 Killer Features," pcworld, Mar. 24, 2010, 3 pages, http://www.pcworld.com/article/192286/sprints_htc_evo_4g_5_killer_features.html.
Nickinson, "Review: The new HTC Sense interface on Android phones," Android Central, Feb. 22, 2010, 10 pages, http://www.androidcentral.com/review-new-htc-sense-android-phones.
Savov, "HTC enhances Sense with Leap and Friend Stream (updated with video)," Engadget, Feb. 16, 2010, http://www.engadget.com/2010/02/16/htc-enhances-sense-with-leap-and-friend-stream/.
International Search Report and Written Opinion dated Dec. 10, 2010, received in International Application No. PCT/US2010/050057, which corresponds to U.S. Appl. No. 12/888,381, 10 pages (Chaudhri).
Office Action dated May 22, 2012, received in U.S. Appl. No. 12/888,381, 19 pages (Chaudhri).
Office Action dated May 10, 2012, received in U.S. Appl. No. 12/888,382, 9 pages (Chaudhri).
Office Action dated May 17, 2012, received in U.S. Appl. No. 12/888,384, 15 pages (Chaudhri).
Office Action dated May 16, 2012, received in U.S. Appl. No. 12/888,386, 12 pages (Chaudhri).
Notice of Allowance dated Jun. 15, 2012, received in U.S. Appl. No. 12/888,391, 26 pages (Chaudhri).
Alzona, C., "Full Screen Maximization with RightZoom," brighthub.com, Mar. 31 2009, http://www.brighthub.com/computing/mac-platform/articles/31024.aspx, 2 pages.
ask.metafilter, "Enable screen resize?" ask.metafilter.com, Jan. 29, 2006, http://ask.metafilter.com/31720/Enable-screen-resize, 3 pages.
Fahey, M., "The iPad Blows Up iPhone, Apps Real Good," Jan. 28, 2010, www.kotaku.com.au/2010/01/the-ipad-blows-up-iphone-apps-real-good/, 3 pages.
Hintsforums, "Windows that actually Maximize to fit the screen," hintsforum.macworld.com, Jun. 17, 2003, http://hintsforums.macworld.com/archieve/index.php/t-12747.html, 4 pages.
Kishore, A., "Make the OS X Maximize Button Work like Windows," switchingtomac.com, May 5, 2009, http://www.switchingtomac.com/making-the-switch/make-the-os-x-maximize-button-work-like-windows/, 3 pages.
MacRumors, "Fit to screen button poll for Mac," MacRumors.com, Dec. 11, 2008, http://forums.macrumors.com/showthread.php?t=615215, 7 pages.
MacRumors, "window, fit to screen?" MacRumors.com, Feb. 22, 2008, http://forums.macrumors.com/showthread.php?t=439783, 2 pages.
Siracusa, J., "Antacid tablet," arstechnica.com, Jan. 1, 2010, http://arstechnica.com/staff/2010/01/antacid-tablet/, 4 pages.

European Search Report dated Oct. 14, 2013, received in European Patent Application No. 13175232.1, which corresponds to U.S. Appl. No. 12/789,426, 6 pages (Lemay).
Final Office Action dated Oct. 10, 2013, received in U.S. Appl. No. 12/789,426, 9 pages (Lemay).
Decision to Grant dated Nov. 25, 2013, received in Japanese Patent Application No. 2012 548041, which corresponds to U.S. Appl. No. 12/789,426, 3 pages (Lemay).
Office Action dated Sep. 27, 2013, received in Korean Patent Application No. 10 2012 7020443, which corresponds to U.S. Appl. No. 12/789,426, 1 page (Lemay).
Office Action dated Nov. 25, 2013, received in Japanese Patent Application No. 2012 548042, which corresponds to U.S. Appl. No. 12/788,277, 2 pages (Chaudhri).
Office Action dated Sep. 27, 2013, received in Korean Patent Application No. 10 2012 702542, which corresponds to U.S. Appl. No. 12/788,277, 3 pages (Chaudhri).
Office Action dated Dec. 10, 2013, received in U.S. Appl. No. 12/888,381, 13 pages (Chaudhri).
Office Action dated Dec. 6, 2013, received in Japanese Patent Application No. 2013 503722, which corresponds to U.S. Appl. No. 12/888,381, 2 pages (Chaudhri).
Office Action dated Nov. 29, 2013, received in Korean Patent Application No. 2012 7029281, which corresponds to U.S. Appl. No. 12/888,381, 4 pages (Chaudhri).
Office Action dated Dec. 10, 2013, received in U.S. Appl. No. 12/888,382, 15 pages (Chaudhri).
Final Office Action dated Dec. 5, 2013, received in U.S. Appl. No. 13/333,909, 28 pages (Khoe).
Fehily, C., "Visual QuickStart Guide: Microsoft Windows 7," 2009, Peachpit Press, pp. x, 34-37, 40, 71, 76, and 267.
Moth, D., "Share Code—Write Code Once for Both Mobile and Desktop Apps," MSDN Magazine, Jul. 2007, 11 pages, http://msdn.microsoft.com/en-us/magazine/cc163387.aspx.
Nilsson, D., "Design guidelines for mobile applications," SINTEF ICT, Jun. 2008, 73 pages.
Nilsson et al., "Design patterns for user interface for mobile applications," Advances in Engineering Software, Elsevier Science, Oxford, GB, vol. 40, No. 12, Dec. 1, 2009, pp. 1318-1328.
Rleger, B., Effective Design for Multiple Screen Sizes, Jan. 2009, 12 pages.
Seffah et al., "Multi-devices 'Multiple' user interfaces: development models and research opportunities," The Journal of Systems and Software, available online Dec. 2003, 14 pages.
Viana et al., "Xmobile: A MB-UID environment for semi-automatic generation of adaptive applications for mobile devices," The Journal of Systems and Software, available online Jun. 2007, 13 pages.
International Search Report and Written Opinion dated May 17, 2011, received in International Application No. PCT/US2010/0062306, which corresponds to U.S. Appl. No. 12/789,426, 21 pages (Lemay).
European Search Report dated May 16, 2011, received in European Patent Application No. 11150223.3, which corresponds to U.S. Appl. No. 12/789,426, 7 pages (Lemay).
International Search Report and Written Opinion dated Apr. 14, 2011, received in International Application No. PCT/US2010/062309, which corresponds to U.S. Appl. No. 12/788,277, 13 pages (Chaudhri).
Office Action dated Apr. 4, 2013, received in U.S. Appl. No. 12/789,426, 9 pages (Lemay).
Office Action dated Jun. 14, 2013, received in Australian Patent Application No. 2010339698, which corresponds to U.S. Appl. No. 12/789,426, 3 pages (Lemay).
Office Action dated Mar. 29, 2012, received in European Patent Application No. 11 150 223.3, which corresponds to U.S. Appl. No. 12/789,426, 2 pages (Lemay).
Decision to Grant dated Aug. 1, 2013, received in European Patent Application No. 11150223.3, which corresponds to U.S. Appl. No. 12/789,426, 1 page (Lemay).
Office Action dated Aug. 30, 2012, received in U.S. Appl. No. 12/788,277, 17 pages (Chaudhri).
Final Office Action dated Mar. 12, 2013, received in U.S. Appl. No. 12/788,277, 20 pages (Chaudhri).

(56) References Cited

OTHER PUBLICATIONS

Office Action dated Jun. 14, 2013, received in Australian Patent Application No. 2010339633, which corresponds to U.S. Appl. No. 12/788,277, 3 pages (Chaudhri).
Office Action dated Aug. 28, 2012, received in European Patent Application No. 11 150 188.8, which corresponds to U.S. Appl. No. 12/788,277, 4 pages (Chaudhri).
Office Action dated Aug. 8, 2013, received in Australian Patent Application No. 2010350740, which corresponds to U.S. Appl. No. 12/888,381, 3 pages (Chaudhri).
Office Action dated May 24, 2013, received in Chinese Patent Application No. 201010602688.2, which corresponds to U.S. Appl. No. 12/888,381, 7 pages (Chaudhri).
Office Action dated Aug. 6, 2013, received in European Patent Application No. 10 760 867.1, which corresponds to U.S. Appl. No. 12/888,381, 4 pages (Chaudhri).
Final Office Action dated Sep. 12, 2013, received in U.S. Appl. No. 12/888,389, 10 pages (Chaudhri).
Office Action dated Mar. 19, 2013, received in U.S. Appl. No. 13/333,909, 20 pages (Khoe).
*Apple Inc.* vs. *Samsung Electronics Co. Ltd. et al.*, Judgment in Interlocutory proceeding, Case No. 396957/KG ZA 11-730, civil law sector, Aug. 24, 2011, pp. 1-65.
*Apple Inc.* vs. *Samsung Electronics Co. Ltd., et al.*, Samsung's Motion to Supplement Invalidity Contentions, Case No. 11-cv-01846-LHK, filed Jan. 27, 2012 together with Exhibit 6, Jan. 27, 2012, 47 pages.
*Apple Inc.* vs. *Samsung Electronics Co. Ltd., et al.*, Samsung's Patent Local Rule 3-3 and 3-4 Disclosures, Case No. 11-cv-01846-LHK, dated Oct. 7, 2011, together with Exhibits G-1 through G-7 and Exhibit H, Oct. 7, 2011, 287 pages.
HTC Europe Co. Ltd and Apple Inc. Invalidity Claim dated Apr. 5, 2012, together with annexes, Apr. 5, 2012, 12 pages.
HTC Europe Co. Ltd and Apple Inc. invalidity Claim dated Jul. 29, 2011, together with amended Particulars of Claim and amended Grounds of Invalidity, Jul. 29, 2011, 22 pages.
Motorola Mobility Opposition Grounds to Apple Inc. European Patent EP 2126678 dated Apr. 11, 2012, together with Exhibits E3, E4, and E5 re: CHT 2005, Apr. 2-7, 2005, Portland Oregon, USA, Apr. 2012, 53 pages.
Notice of Appeal in Expedited Appeal in Summary Proceedings dated Sep. 14, 2011, pp. 1-51.
Pleading notes Mr B.J. Berghuis van Woortman, in matter of *Apple Inc.* vs. *Samsung Electronics*, Case No. KG ZA 11-730 and KG ZA 11-731, Aug. 10-11, 2010, pp. 1-16.
Pleading notes Mr Kleemans, Mr Blomme and Mr Van Oorschot, in matter of *Apple Inc.* vs *Samsung Electronics*, Case No. KG ZA 11-730 and KG ZA 11-731, Aug. 10, 2011, 35 pages.
*Samsung Electronics GmbH* vs *Apple Inc.*, "List scrolling and document translation, scaling and rotation on a touch-screen display", Jan. 30, 2012, 27 pages.
*Samsung Electronics* vs *Apple Inc.*, Statement of Defense Also Counterclaim, Case No. KG ZA 2011-730, Jul. 20, 2011, 44 pages.
*Samsung Electronics* vs *Apple Inc.*, Statement of Defense Also Counterclaim, Case No. KG ZA 2011-731, Jul. 20, 2011, 48 pages.
International Preliminary Report on Patentability received for PCT Patent Application No. PCT/US2010/050057, issued on Oct. 9, 2012, 6 pages.
International Preliminary Report on Patentability received for PCT Patent Application No. PCT/US2010/062306, mailed on Jul. 19, 2012, 13 pages.
International Preliminary Report on Patentability received for PCT Patent Application No. PCT/US2010/062309, mailed on Jul. 19, 2012, 9 pages.
International Search Report and Written Opinion received for PCT Patent Application No. PCT/US2014/018724, mailed on Jul. 18, 2014, 13 pages.
Notice of Allowance Received for Korean Patent Application No. 10-2012-7020542, mailed on Nov. 28, 2014, 2 pages. (Official Copy only). (See Communication under 37 CFR § 1.98(a) (3)).

Office Action received for Korean Patent Application No. 10-2012-7020542, mailed on Jul. 29, 2014, 6 pages. (3 pages of English Translation and 3 pages of Official copy).
Office Action recieved for Korean Application No. 10-2012-7029281, mailed on Jan. 26, 2015., 7 pages (3 pages of English Translation and 4 pages of Official Copy).
Office Action received for Korean Patent Application No. 10-2012-7029281, mailed on Oct. 22, 2014, 6 pages (3 pages of English Translation and 3 pages Of Official Copy).
Notice of Allowance received for Korean Patent Application No. 10-2015-7001684, issued on Jul. 2, 2015, 3 pages (1 page of English Translation and 2 pages of Official Copy).
Office Action received for European Patent Application No. 10760867.1, mailed on May 28, 2015, 6 pages.
Extended European Search Report (includes Partial European Search Report and European Search Opinion) received for European Patent Application No. 11150188.8, mailed on Apr. 14, 2011, 7 pages.
Office Action Received for European Patent Application No. 11150188.8, mailed on Apr. 28, 2015, 4 pages.
Notice of Allowance received for U.S. Appl. No. 12/789,426, mailed on Feb. 20, 2014, 7 pages.
Notice of Allowance received for U.S. Appl. No. 12/888,381, mailed on Apr. 9, 2015, 2 pages.
Notice of Allowance received for U.S. Appl. No. 12/888,381, mailed on Feb. 17, 2015, 5 pages.
Notice of Allowance received for U.S. Appl. No. 12/888,381, mailed on Oct. 21, 2014, 10 pages.
Notice of Allowance received for U.S. Appl. No. 12/888,382, mailed on Feb. 13, 2015, 6 pages.
Notice of Allowance received for U.S. Appl. No. 12/888,382, mailed on Oct. 31, 2014, 5 pages.
Notice of Allowance received for U.S. Appl. No. 12/888,389, mailed on Feb. 11, 2015, 15 pages.
Notice of Allowance received for U.S. Appl. No. 12/888,389, mailed on Sep. 8, 2014, 13 pages.
Notice of Allowance received for U.S. Appl. No. 13/333,909, mailed on Mar. 31, 2014, 20 pages.
Office Action received for European Patent Application No. 13175232.1, mailed on Nov. 21, 2014, 5 pages.
Non-Final Office Action received for U.S. Appl. No. 14/183,347, mailed on Jul. 7, 2015, 14 pages.
Non Final Office Action received for U.S. Appl. No. 14/456,852, mailed on Jul. 1, 2015, 19 pages.
Notice of Allowance received for U.S. Appl. No. 14/456,852, mailed on Jul. 31, 2015, 8 pages.
Office Action received for Chinese Patent Application No. 201010602688.2, mailed on Jan. 14, 2014, 16 pages (8 pages of English Translation and 8 pages of Official copy).
Office Action received for Chinese Patent Application No. 201010602688.2, mailed on Sep. 19, 2014, 13 pages (6 pages of English Translation and 7 pages of Official Copy).
Notice of Acceptance received for Australian Patent Application No. 2010339633, mailed on Feb. 20, 2015, 2 pages.
Office Action received for Australian Patent Application No. 2010339633, issued on Jun. 25, 2014, 6 pages.
Notice of Acceptance Received for Australian Patent Application No. 2010339698, mailed on Dec. 8, 2014, 2 pages.
Office Action Received for Australian Patent Application No. 2010339698, issued on Aug. 8, 2014, 3 pages.
Notice of Acceptance received for Australian Patent Application No. 2010350740, mailed on Jan. 30, 2015, 3 pages.
Notice of Allowance received for Chinese Patent Application No. 201080063701.X, issued on Jul. 14, 2015, 4 pages. (2 pages of English Translation and 2 pages of Official Copy).
Office Action received for Chinese Patent Application No. 201080063701.X, mailed on Dec. 31, 2014, 4 pages (Official Copy only). (See Communication under 37 CFR § 1.98(a) (3)).
Office Action received for Chinese Patent Application No. 201080063701.X, mailed on Jun. 27, 2014, 24 pages (12 pages of English Translation and 12 pages of Official Copy).
Office Action received for Chinese Patent Application No. 201080063864.8, mailed on Sep. 2, 2014, 31 pages (17 pages of English Translation and 14 pages of Official copy).

(56) References Cited

OTHER PUBLICATIONS

Notice of Allowance received for Japanese Patent Application No. 2012-548042, mailed on Nov. 7, 2014, 3 pages (Official Copy only). (See Communication under 37 CFR § 1.98(a) (3)).
Office Action received from Japanese Patent Application No. 2013-262976, mailed on Feb. 20, 2015, 2 pages (Official Copy only). (See Communication under 37 CFR § 1.98(a) (3)).
Notice of Allowance received for Japanese Patent Application No. 2013-503722, mailed on Dec. 8, 2014, 3 pages (Official Copy only). (See Communication under 37 CFR § 1.98(a) (3)).
Mick, Jason, Iphone OS 4.0 Will Bring True Multitasking This Summer, DailyTech, Available at <http://www.dailytech.com/report+iphone+os+40+will+bring+true+multitasking+this+summer/article17878.htm>, Mar. 11, 2010, 3 pages.
Dilger, Daniel E., Inside Apple's iPad: Multitasking, Appleinsider.com, Available at <http:/www.appleinsider.com/articles/10/02/18/inside_apples_ipad_multitasking.html>, Feb. 17, 2010, 4 pages.
IPhone, iPhone People Autumn—Winter, Oct. 29, 2010, 3 pages.
Lemay, et al., U.S. Appl. No. 60/936,562, filed Jun. 20, 2007, titled Portable Multifunction Device, Method, and Graphical User Interface for Playing Online Videos.
Shaw, et al., U.S. Appl. No. 61/832,939, filed Jun. 9, 2013, titled Device, Method, and Graphical User Interface for Sharing Content from a Respective Application (copy not attached).

* cited by examiner

700

702 Display a first application view on a touch-sensitive display that corresponds to a first application in a plurality of concurrently open applications. The first application view is displayed without concurrently displaying an application view for any other application in the plurality of concurrently open applications.

704 While displaying the first application view, detect a first predefined input

706 In response to detecting the first predefined input:

708 Enter an application view selection mode for selecting one of the concurrently open applications for display of a corresponding application view

710 Display in a first predefined area of the touch-sensitive display a group of open application icons that correspond to at least some of the plurality of concurrently open applications. The open application icons in the group are displayed in accordance with a predetermined sequence of the open applications.

712 Concurrently display at least a portion of the first application view with the first predefined area

714 While displaying the group of open application icons in the first predefined area, detect a gesture on a respective open application icon in the first predefined area.
In response to detecting the gesture on the respective open application icon, update the predetermined sequence of the open application icons, display a respective application view on the touch-sensitive display for a corresponding application in the plurality of concurrently open applications, cease to display open application icons in the first predefined area, and exit the application view selection mode. The respective application view is displayed without concurrently displaying an application view for any other application in the plurality of concurrently open applications.

```
┌─────────────────────────────────────────────────────────────────────┐
│ While displaying the second application view on the touch-sensitive display
│ without concurrently displaying an application view for any other application    ─ 726
│    in the plurality of concurrently open applications, detect an input for the
│                  second application on the touch-sensitive display.
│  In response to detecting the input for the second application on the touch-
│          sensitive display, update the predetermined sequence of the open
│                                      applications.
└─────────────────────────────────────────────────────────────────────┘

┌─────────────────────────────────────────────────────────────────────┐
│ While displaying the second application view on the touch-sensitive display
│ without concurrently displaying an application view for any other application    ─ 728
│    in the plurality of concurrently open applications, determine a duration for
│                    which the second application view is displayed.
│       In response to determining that the duration exceeds a predefined time,
│            update the predetermined sequence of the open applications.
└─────────────────────────────────────────────────────────────────────┘

┌─────────────────────────────────────────────────────────────────────┐
│ While displaying the first application view without concurrently displaying an
│    application view for any other application in the plurality of concurrently   ─ 730
│    open applications, detect a third gesture of a second gesture type on the
│    touch-sensitive display. The second gesture type is distinct from the first
│                                  gesture type.
│           In response to detecting the third gesture of the second gesture type,
│              display a fourth application view on the touch-sensitive display that
│              corresponds to a fourth application in the plurality of concurrently open
│     applications. The fourth application is adjacent to the first application in the
│           predetermined sequence, and the fourth application is distinct from the
│           second application. The fourth application view is displayed without
│    concurrently displaying an application view for any other application in the
│                        plurality of concurrently open applications.
└─────────────────────────────────────────────────────────────────────┘

┌─────────────────────────────────────────────────────────────────────┐
│   Detect a multi-finger gesture on the touch-sensitive display that is distinct
│                from the first predefined input and the first gesture.             ─ 732
│        In response to detecting the multi-finger gesture on the touch-sensitive
│                              display, display a home screen.
└─────────────────────────────────────────────────────────────────────┘
```

Figure 7C

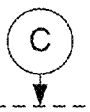

Detect a multi-finger gesture on the touch-sensitive display that is distinct from the first predefined input and the first gesture.
While detecting the multi-finger gesture on the touch-sensitive display, concurrently display the first application view in a first reduced scale and at least a portion of a home screen, and adjust the first reduced scale in accordance with the multi-finger gesture.
In response to ceasing to detect the multi-finger gesture, cease to display the first application view, and display the entire home screen. — 734

The first application view is displayed at a first position on the touch-sensitive display, and the first application is at one end of the predetermined sequence of the open applications.
While displaying the first application view without concurrently displaying an application view for any other application in the plurality of concurrently open applications, detect a respective gesture of a second gesture type on the touch-sensitive display. The second gesture type is distinct from the first gesture type.
In response to detecting the respective gesture of the second gesture type, move the first application view from the first position to a second position in accordance with the respective gesture of the second gesture type such that at least a portion of the first application view moves off the touch-sensitive display.
In response to ceasing to detect the respective gesture of the second gesture type on the touch-sensitive display, move the first application view in a damped vibration motion with respect to the first position until a predefined oscillation condition is satisfied. — 736

The damped vibration motion is modeled by a function of a mass, a spring constant, and a damping coefficient. The mass decreases as a function of time. — 738

Figure 7D

DEVICE, METHOD, AND GRAPHICAL USER INTERFACE FOR NAVIGATION OF CONCURRENTLY OPEN SOFTWARE APPLICATIONS

RELATED APPLICATIONS

This application claims priority to U.S. Provisional Application Ser. No. 61/425,207, filed Dec. 20, 2010, entitled "Device, Method, and Graphical User Interface for Navigation of Concurrently Open Software Applications," which is incorporated by reference herein in its entirety.

This application is related to the following applications: (1) U.S. application Ser. No. 12/888,381, filed Sep. 22, 2010, entitled "Device, Method, and Graphical User Interface for Managing Concurrently Open Software Applications"; (2) U.S. application Ser. No. 12/888,382, filed Sep. 22, 2010, entitled "Device, Method, and Graphical User Interface for Managing Concurrently Open Software Applications"; (3) U.S. application Ser. No. 12/888,384, filed Sep. 22, 2010, entitled "Device, Method, and Graphical User Interface for Managing Concurrently Open Software Applications"; (4) U.S. application Ser. No. 12/888,386, filed Sep. 22, 2010, entitled "Device, Method, and Graphical User Interface for Managing Concurrently Open Software Applications"; (5) U.S. application Ser. No. 12/888,389, filed Sep. 22, 2010, entitled "Device, Method, and Graphical User Interface for Managing Concurrently Open Software Applications"; and (6) U.S. application Ser. No. 12/888,391, filed Sep. 22, 2010, entitled "Device, Method, and Graphical User Interface for Managing Concurrently Open Software Applications". All of these applications are incorporated by reference herein in their entirety.

TECHNICAL FIELD

This relates generally to electronic devices with touch-sensitive displays, including but not limited to portable electronic devices with touch-sensitive displays that are configured to have multiple open software applications.

BACKGROUND

The use of touch-sensitive surfaces as input devices for computers and other electronic computing devices has increased significantly in recent years. Exemplary touch-sensitive surfaces include touch pads and touch screen displays. Such surfaces are widely used to select, launch, and manage software applications.

For electronic devices with touch-sensitive displays, existing methods for navigating through concurrently open applications are cumbersome and inefficient. For example, portable devices with small screens (e.g., smart phones and tablets) typically display a single application at a time, even though multiple applications may be running on the device. With such devices, a user may have difficulty navigating through the currently open applications. This situation creates a significant cognitive burden on a user. In addition, existing methods for navigating through currently open applications take longer than necessary, thereby wasting energy. This latter consideration is particularly important in battery-operated devices.

SUMMARY

Accordingly, there is a need for computing devices with faster, more efficient methods and interfaces for navigating through concurrently open applications. Such methods and interfaces may complement or replace conventional methods for navigating through concurrently open applications. Such methods and interfaces reduce the cognitive burden on a user and produce a more efficient human-machine interface. For battery-operated computing devices, such methods and interfaces conserve power and increase the time between battery charges.

The above deficiencies and other problems associated with user interfaces for electronic devices with touch-sensitive surfaces are reduced or eliminated by the disclosed devices. In some embodiments, the device is a desktop computer. In some embodiments, the device is portable (e.g., a notebook computer, tablet computer, or handheld device). In some embodiments, the device has a touchpad. In some embodiments, the device has a touch-sensitive display (also known as a "touch screen" or "touch screen display"). In some embodiments, the device has a graphical user interface (GUI), one or more processors, memory and one or more modules, programs or sets of instructions stored in the memory for performing multiple functions. In some embodiments, the user interacts with the GUI primarily through finger contacts and gestures on the touch-sensitive surface. In some embodiments, the functions may include image editing, drawing, presenting, word processing, website creating, disk authoring, spreadsheet making, game playing, telephoning, video conferencing, e-mailing, instant messaging, workout support, digital photographing, digital videoing, web browsing, digital music playing, and/or digital video playing. Executable instructions for performing these functions may be included in a non-transitory computer readable storage medium or other computer program product configured for execution by one or more processors.

In accordance with some embodiments, a multifunction device includes a touch-sensitive display, one or more processors, memory, and one or more programs. The one or more programs are stored in the memory and configured to be executed by the one or more processors. The one or more programs include instructions for displaying a first application view on the touch-sensitive display that corresponds to a first application in a plurality of concurrently open applications. The first application view is displayed without concurrently displaying an application view for any other application in the plurality of concurrently open applications. The one or more programs also include instructions for, while displaying the first application view, detecting a first predefined input. The one or more programs include instructions for, in response to detecting the first predefined input, entering an application view selection mode for selecting one of the concurrently open applications for display of a corresponding application view, displaying in a first predefined area of the touch-sensitive display a group of open application icons that correspond to at least some of the plurality of concurrently open applications, and concurrently displaying at least a portion of the first application view with the first predefined area. The open application icons in the group are displayed in accordance with a predetermined sequence of the open applications. The one or more programs include instructions for, while displaying the first application view without concurrently displaying an application view for any other application in the plurality of concurrently open applications, detecting a first gesture of a first gesture type on the touch-sensitive display. The first gesture is distinct from the first predefined input. The one or more programs include instructions for, in response to detecting the first gesture of the first gesture type, displaying a second application view on the touch-sensitive display that corresponds to a second application in the plurality of concurrently open applications. The second application is adjacent to the first application in the predetermined sequence. The second application view is displayed without concurrently displaying an application view for any other application in the plurality of concurrently open applications.

In accordance with some embodiments, a method is performed at a multifunction device with a touch-sensitive display. The method includes displaying a first application view on the touch-sensitive display that corresponds to a first application in a plurality of concurrently open applications. The first application view is displayed without concurrently displaying an application view for any other application in the plurality of concurrently open applications. The method also includes, while displaying the first application view, detecting a first predefined input. The method includes, in response to detecting the first predefined input, entering an application view selection mode for selecting one of the concurrently open applications for display of a corresponding application view, displaying in a first predefined area of the touch-sensitive display a group of open application icons that correspond to at least some of the plurality of concurrently open applications, and concurrently displaying at least a portion of the first application view with the first predefined area. The open application icons in the group are displayed in accordance with a predetermined sequence of the open applications. The method includes, while displaying the first application view without concurrently displaying an application view for any other application in the plurality of concurrently open applications, detecting a first gesture of a first gesture type on the touch-sensitive display. The first gesture is distinct from the first predefined input. The method includes, in response to detecting the first gesture of the first gesture type, displaying a second application view on the touch-sensitive display that corresponds to a second application in the plurality of concurrently open applications. The second application is adjacent to the first application in the predetermined sequence. The second application view is displayed without concurrently displaying an application view for any other application in the plurality of concurrently open applications.

In accordance with some embodiments, a computer readable storage medium has stored therein one or more programs. The one or more programs include instructions which when executed by a multifunction device with a touch-sensitive display, cause the device to display a first application view on the touch-sensitive display that corresponds to a first application in a plurality of concurrently open applications. The first application view is displayed without concurrently displaying an application view for any other application in the plurality of concurrently open applications. The instructions also cause the device to, while displaying the first application view, detect a first predefined input. The instructions cause the device to, in response to detecting the first predefined input, enter an application view selection mode for selecting one of the concurrently open applications for display of a corresponding application view, display in a first predefined area of the touch-sensitive display a group of open application icons that correspond to at least some of the plurality of concurrently open applications, and concurrently display at least a portion of the first application view with the first predefined area. The open application icons in the group are displayed in accordance with a predetermined sequence of the open applications. The instructions cause the device to, while displaying the first application view without concurrently displaying an application view for any other application in the plurality of concurrently open applications, detect a first gesture of a first gesture type on the touch-sensitive display. The first gesture is distinct from the first predefined input. The instructions cause the device to, in response to detecting the first gesture of the first gesture type, display a second application view on the touch-sensitive display that corresponds to a second application in the plurality of concurrently open applications. The second application is adjacent to the first application in the predetermined sequence. The second application view is displayed without concurrently displaying an application view for any other application in the plurality of concurrently open applications.

In accordance with some embodiments, a graphical user interface on a multifunction device with a touch-sensitive display, a memory, and one or more processors to execute one or more programs stored in the memory includes a first application view that corresponds to a first application in a plurality of concurrently open applications. The first application view is displayed without concurrently displaying an application view for any other application in the plurality of concurrently open applications. While displaying the first application view, a first predefined input is detected. In response to detecting the first predefined input, an application view selection mode for selecting one of the concurrently open applications for display of a corresponding application view is entered, a group of open application icons that correspond to at least some of the plurality of concurrently open applications is displayed in a first predefined area of the touch-sensitive display, and at least a portion of the first application view is concurrently displayed with the first predefined area. The open application icons in the group are displayed in accordance with a predetermined sequence of the open applications. While displaying the first application view without concurrently displaying an application view for any other application in the plurality of concurrently open applications, a first gesture of a first gesture type is detected on the touch-sensitive display. The first gesture is distinct from the first predefined input. In response to detecting the first gesture of the first gesture type, a second application view is displayed on the touch-sensitive display that corresponds to a second application in the plurality of concurrently open applications. The second application is adjacent to the first application in the predetermined sequence. The second application view is displayed without concurrently displaying an application view for any other application in the plurality of concurrently open applications.

In accordance with some embodiments, a multifunction device includes a touch-sensitive display and means for displaying a first application view on the touch-sensitive display that corresponds to a first application in a plurality of concurrently open applications. The first application view is displayed without concurrently displaying an application view for any other application in the plurality of concurrently open applications. The multifunction device also includes means, enabled while displaying the first application view, for detecting a first predefined input; and means, enabled in response to detecting the first predefined input, including: means for entering an application view selection mode for selecting one of the concurrently open applications for display of a corresponding application view, means for displaying in a first predefined area of the touch-sensitive display a group of open application icons that correspond to at least some of the plurality of concurrently open applications, and means for concurrently displaying at least a portion of the first application view with the first predefined area. The open application icons in the group are displayed in accordance with a predetermined sequence of the open applications. The multifunction device includes means, enabled while displaying the first application view without concurrently displaying an application view for any other application in the plurality of concurrently open applications, for detecting a first gesture of a first gesture type on the touch-sensitive display. The first gesture is distinct from the first predefined input. The multifunction device includes means, enabled in response to detecting the first gesture of the first gesture type, for displaying a second application view on the touch-sensitive display that corresponds to a second application in the plurality of concurrently open applications. The second application is adjacent to the first application in the predetermined sequence. The second application view is displayed without concurrently displaying an application view for any other application in the plurality of concurrently open applications.

In accordance with some embodiments, an information processing apparatus for use in a multifunction device with a touch-sensitive display includes means for means for displaying a first application view on the touch-sensitive display that corresponds to a first application in a plurality of concurrently open applications. The first application view is displayed without concurrently displaying an application view for any other application in the plurality of concurrently open applications. The information processing apparatus includes means, enabled while displaying the first application view, for detecting a first predefined input; and means, enabled in response to detecting the first predefined input, including: means for entering an application view selection mode for selecting one of the concurrently open applications for display of a corresponding application view, means for displaying in a first predefined area of the touch-sensitive display a group of open application icons that correspond to at least some of the plurality of concurrently open applications, and means for concurrently displaying at least a portion of the first application view with the first predefined area. The open application icons in the group are displayed in accordance with a predetermined sequence of the open applications. The information processing apparatus includes means, enabled while displaying the first application view without concurrently displaying an application view for any other application in the plurality of concurrently open applications, for detecting a first gesture of a first gesture type on the touch-sensitive display. The first gesture is distinct from the first predefined input. The information processing apparatus includes means, enabled in response to detecting the first gesture of the first gesture type, for displaying a second application view on the touch-sensitive display that corresponds to a second application in the plurality of concurrently open applications. The second application is adjacent to the first application in the predetermined sequence. The second application view is displayed without concurrently displaying an application view for any other application in the plurality of concurrently open applications.

In accordance with some embodiments, an electronic device includes a touch-sensitive display unit configured to display a first application view that corresponds to a first application in a plurality of concurrently open applications executable by a processing unit. The first application view is displayed without concurrently displaying an application view for any other application in the plurality of concurrently open applications. The electronic device also includes a processing unit coupled to the touch-sensitive display unit. The processing unit is configured to: while the touch-sensitive display unit displays the first application view, detect a first predefined input; in response to detecting the first predefined input: enter an application view selection mode for selecting one of the concurrently open applications for display of a corresponding application view with the touch-sensitive display unit; enable display in a first predefined area of the touch-sensitive display unit of a group of open application icons that correspond to at least some of the plurality of concurrently open applications, the open application icons in the group being displayed in accordance with a predetermined sequence of the open applications; and enable concurrent display of at least a portion of the first application view with the first predefined area with the touch-sensitive display unit; while the touch-sensitive display unit displays the first application view without concurrently displaying an application view for any other application in the plurality of concurrently open applications, detect a first gesture of a first gesture type on the touch-sensitive display unit, the first gesture being distinct from the first predefined input; and, in response to detecting the first gesture of the first gesture type, enable display of a second application view on the touch-sensitive display unit that corresponds to a second application in the plurality of concurrently open applications, the second application being adjacent to the first application in the predetermined sequence, wherein the second application view is displayed without concurrently displaying an application view for any other application in the plurality of concurrently open applications.

Thus, multifunction devices with touch-sensitive displays are provided with faster, more efficient methods and interfaces for navigating through concurrently open software applications, thereby increasing the effectiveness, efficiency, and user satisfaction with such devices. Such methods and interfaces may complement or replace conventional methods for navigating through concurrently open software applications.

BRIEF DESCRIPTION OF THE DRAWINGS

For a better understanding of the aforementioned embodiments of the invention as well as additional embodiments thereof, reference should be made to the Description of Embodiments below, in conjunction with the following drawings in which like reference numerals refer to corresponding parts throughout the figures.

FIGS. 7A-7D are flow diagrams illustrating a method of navigating through concurrently open applications in accordance with some embodiments.

DESCRIPTION OF EMBODIMENTS

Electronic devices with small screens (e.g., smart phones and tablets) typically display a single application at a time, even though multiple applications may be running on the device. With such devices, a user may have difficulty navigating through the currently open applications. The embodiments described below address this navigation problem by providing both a modeless transition between applications and a separate mode for navigating between open applications. For the modeless transition, in response to a particular gesture on a touch-sensitive display (e.g., a multi-finger swipe gesture), the displayed application changes to an adjacent application in a current sequence of open applications. This modeless transition is very quick and simple for transitioning between adjacent applications in the current sequence, but by itself the modeless transition does not provide an indication to the user of the current sequence of open applications. If this modeless transition was the only way to change applications, a user could become confused about what application would appear next in response to each successive detection of the particular gesture. To avoid this confusion, a separate mode for navigating between open applications is also provided. The separate mode shows open application icons that represent at least a portion of the current sequence of open applications. The sequence of open applications updates as the user interacts with the device, and the sequence of open application icons that are shown in the separate navigation mode update accordingly. In addition, the separate mode makes it easier to navigate between two open applications that are not near each other in the current sequence of open applications. Providing two complementary ways to select open applications, one via a separate navigation mode and the other modeless, makes navigation of concurrently open applications faster and more efficient than either way by itself.

Figure 5A:
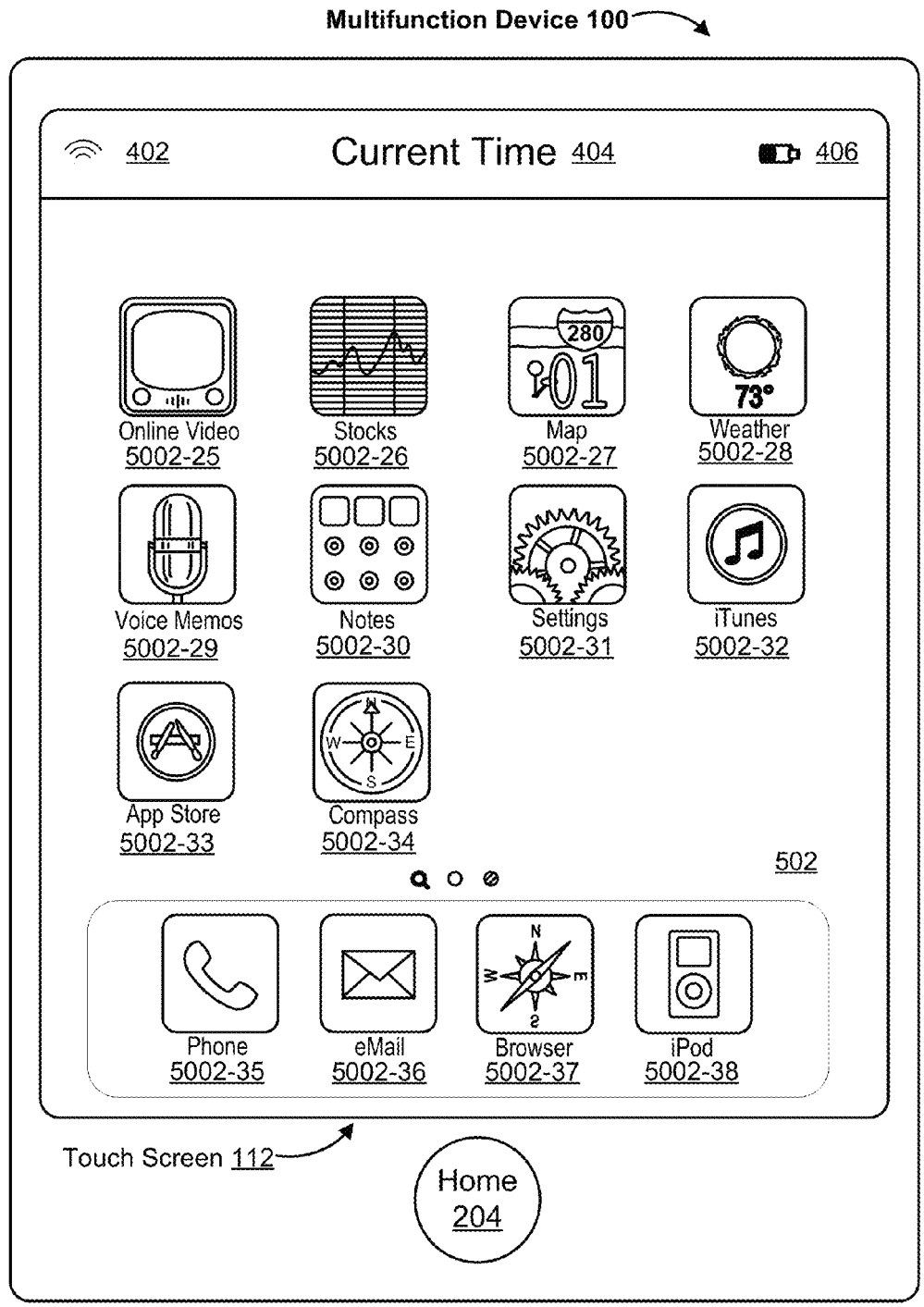
FIGS. 5A-5X illustrate exemplary user interfaces for navigating through concurrently open applications in accordance with some embodiments.
Figure 5X:
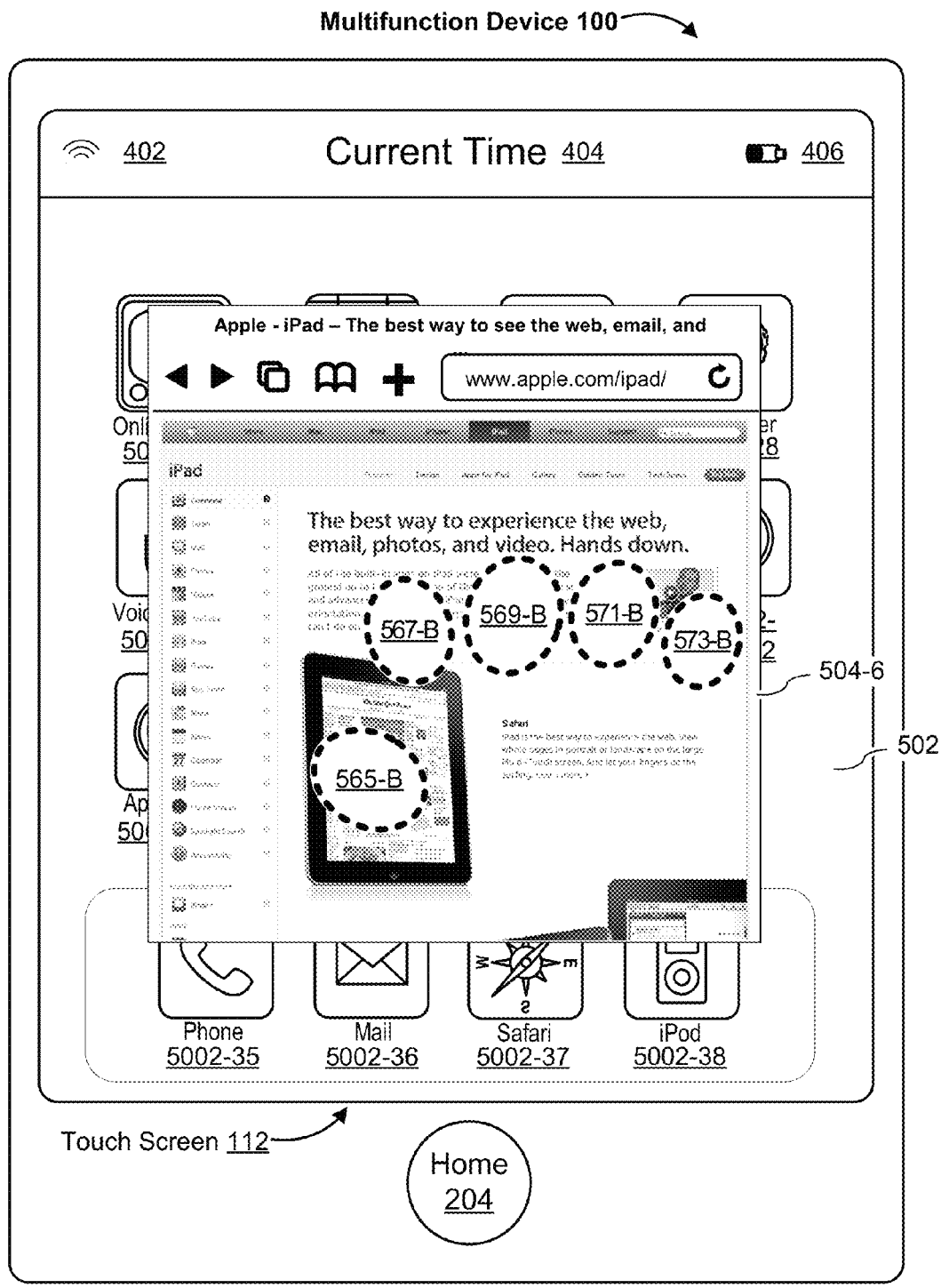
Figure 6:
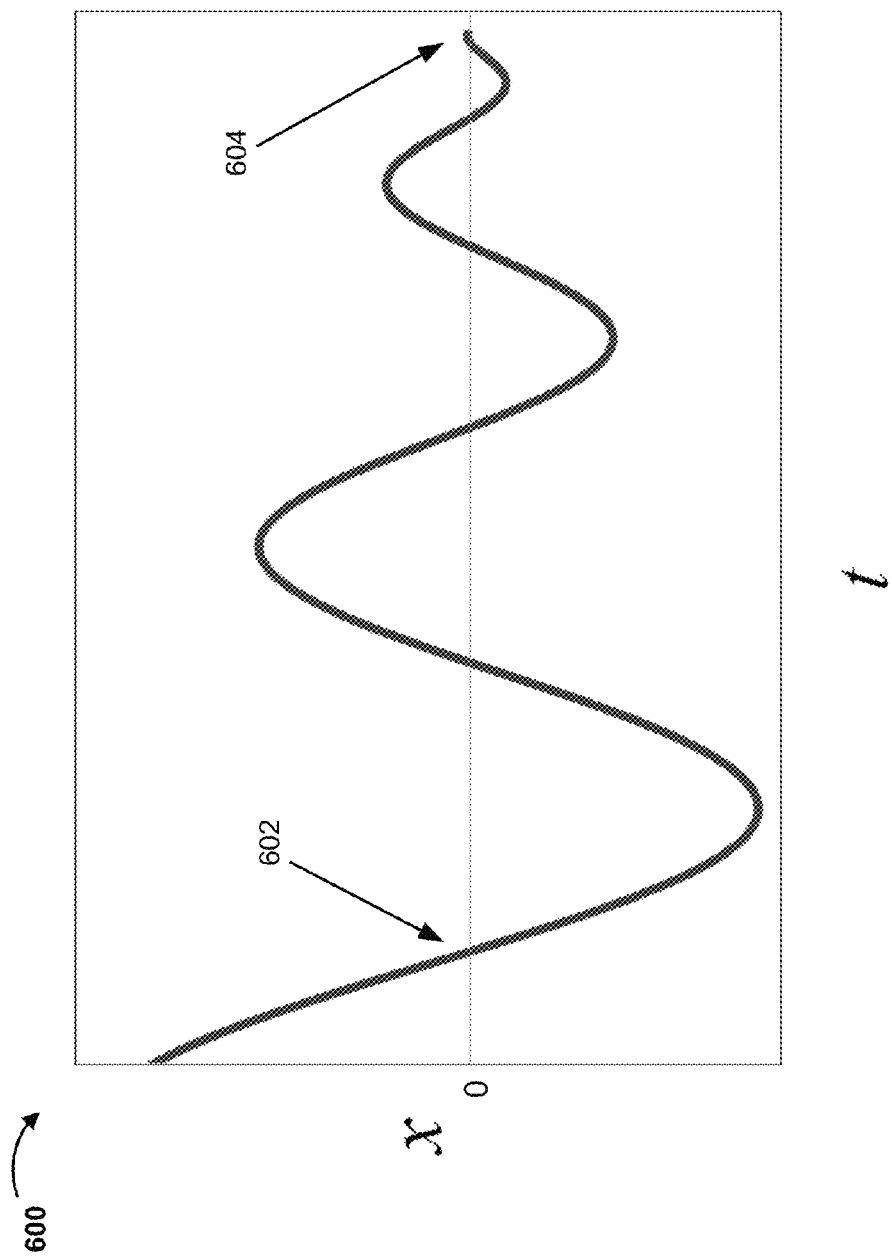
FIG. 6 illustrates an exemplary function representing a damped vibration motion in accordance with some embodiments.
Figure 7B:
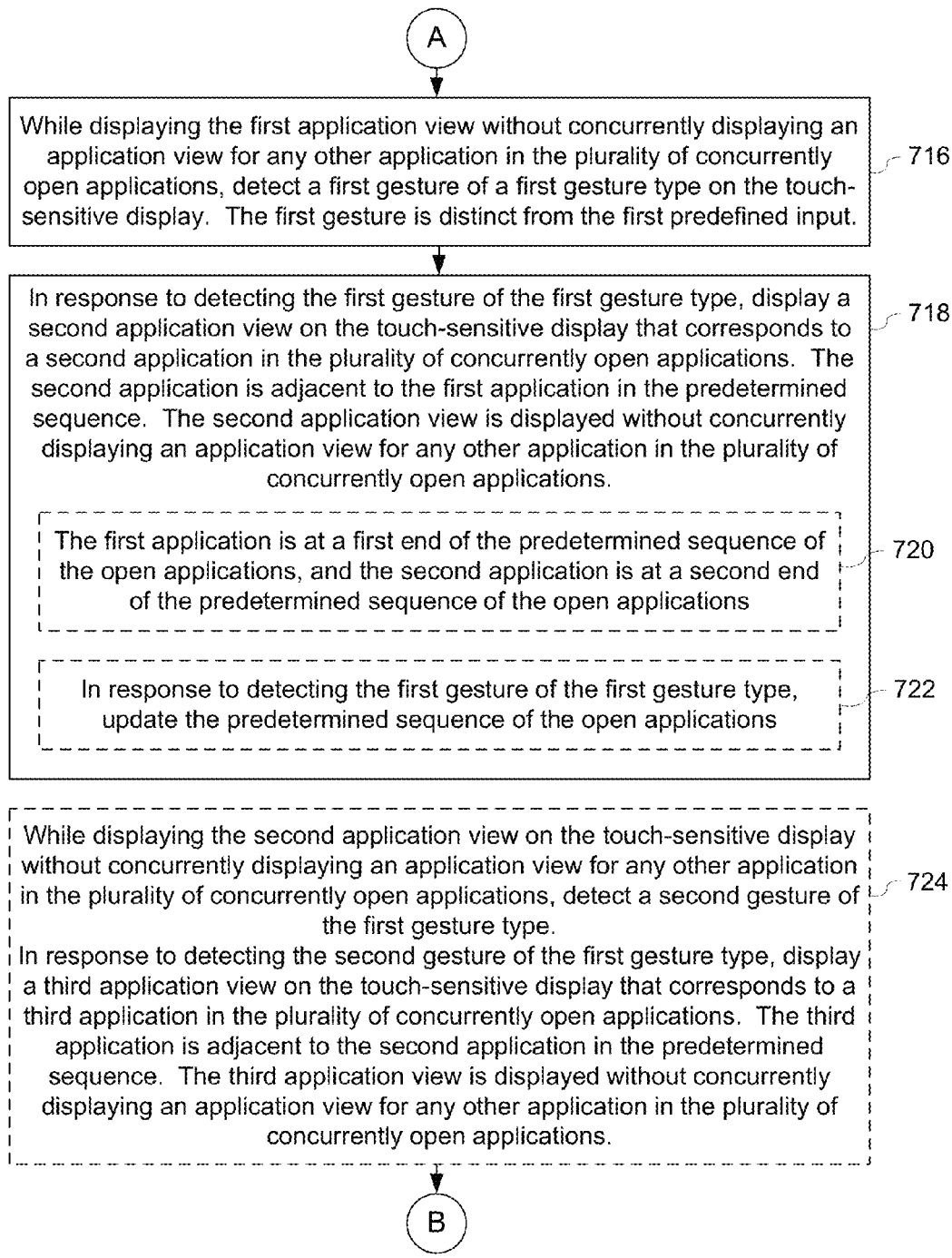

Below, FIGS. 1A-1B, 2, 3, and 8 provide a description of exemplary devices. FIGS. 4A-4B and 5A-5X illustrate exemplary user interfaces for navigating through concurrently open applications. FIG. 6 is a plot of a mathematical function used to describe an exemplary movement of an application view. FIGS. 7A-7D are flow diagrams illustrating a method of navigating through concurrently open applications. The user interfaces in FIGS. 5A-5X are used to illustrate the processes in FIGS. 7A-7D.

Exemplary Devices

Reference will now be made in detail to embodiments, examples of which are illustrated in the accompanying drawings. In the following detailed description, numerous specific details are set forth in order to provide a thorough understanding of the present invention. However, it will be apparent to one of ordinary skill in the art that the present invention may be practiced without these specific details. In other instances, well-known methods, procedures, components, circuits, and networks have not been described in detail so as not to unnecessarily obscure aspects of the embodiments.

It will also be understood that, although the terms first, second, etc. may be used herein to describe various elements, these elements should not be limited by these terms. These terms are only used to distinguish one element from another. For example, a first contact could be termed a second contact, and, similarly, a second contact could be termed a first contact, without departing from the scope of the present invention. The first contact and the second contact are both contacts, but they are not the same contact.

The terminology used in the description of the invention herein is for the purpose of describing particular embodiments only and is not intended to be limiting of the invention. As used in the description of the invention and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in response to detecting," depending on the context. Similarly, the phrase "if it is determined" or "if [a stated condition or event] is detected" may be construed to mean "upon determining" or "in response to determining" or "upon detecting [the stated condition or event]" or "in response to detecting [the stated condition or event]," depending on the context.

Embodiments of electronic devices, user interfaces for such devices, and associated processes for using such devices are described. In some embodiments, the device is a portable communications device, such as a mobile telephone, that also contains other functions, such as PDA and/or music player functions. Exemplary embodiments of portable multifunction devices include, without limitation, the iPhone®, iPod Touch®, and iPad® devices from Apple Inc. of Cupertino, Calif. Other portable electronic devices, such as laptops or tablet computers with touch-sensitive surfaces (e.g., touch screen displays and/or touch pads), may also be used. It should also be understood that, in some embodiments, the device is not a portable communications device, but is a desktop computer with a touch-sensitive surface (e.g., a touch screen display and/or a touch pad).

In the discussion that follows, an electronic device that includes a display and a touch-sensitive surface is described. It should be understood, however, that the electronic device may include one or more other physical user-interface devices, such as a physical keyboard, a mouse and/or a joystick.

The device typically supports a variety of applications, such as one or more of the following: a drawing application, a presentation application, a word processing application, a website creation application, a disk authoring application, a spreadsheet application, a gaming application, a telephone application, a video conferencing application, an e-mail application, an instant messaging application, a workout support application, a photo management application, a digital camera application, a digital video camera application, a web browsing application, a digital music player application, and/or a digital video player application.

The various applications that may be executed on the device may use at least one common physical user-interface device, such as the touch-sensitive surface. One or more functions of the touch-sensitive surface as well as corresponding information displayed on the device may be adjusted and/or varied from one application to the next and/or within a respective application. In this way, a common physical architecture (such as the touch-sensitive surface) of the device may support the variety of applications with user interfaces that are intuitive and transparent to the user.

Figure 1A:
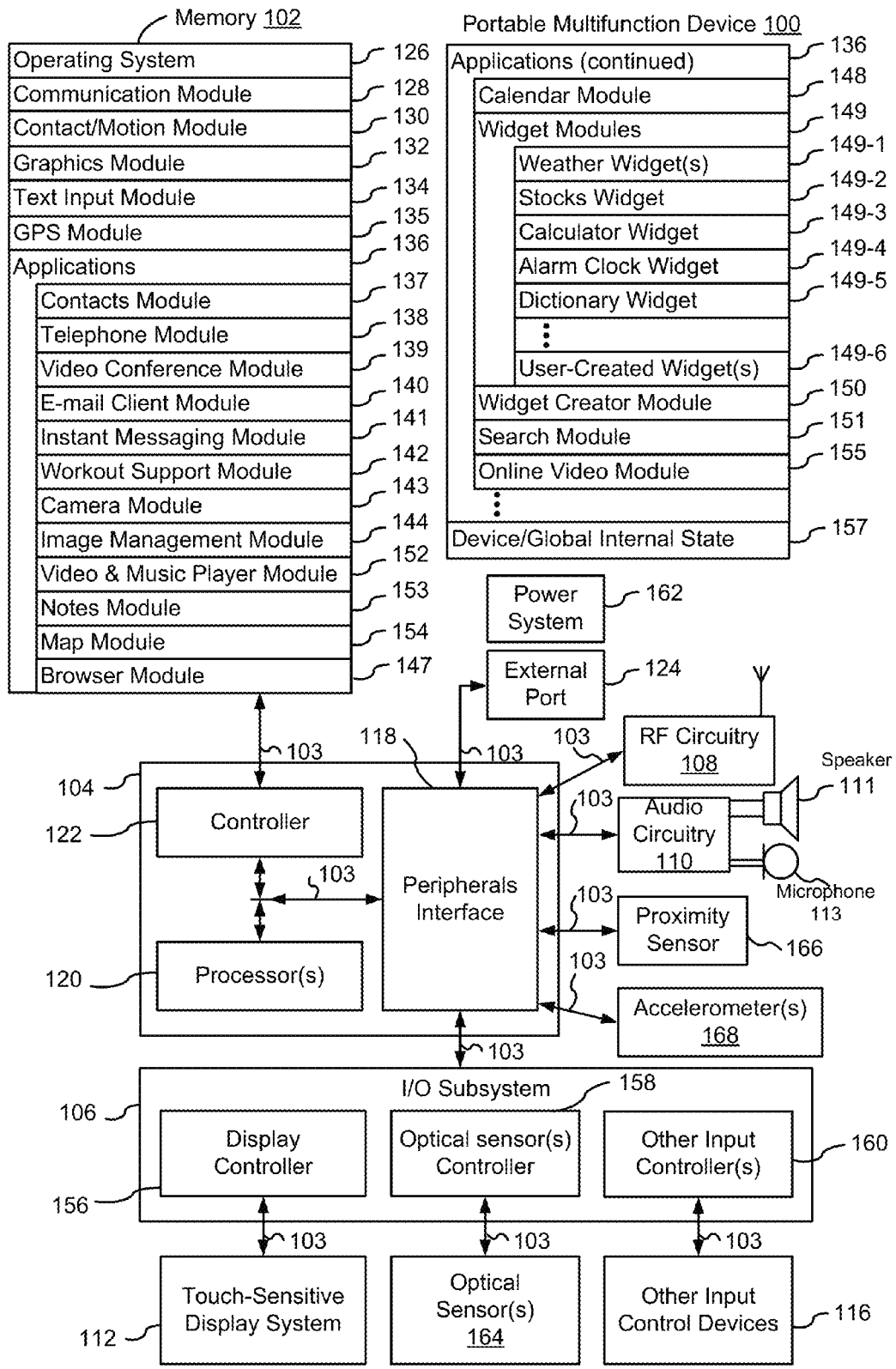
FIG. 1A is a block diagram illustrating a portable multifunction device with a touch-sensitive display in accordance with some embodiments.

Attention is now directed toward embodiments of portable devices with touch-sensitive displays. FIG. 1A is a block diagram illustrating portable multifunction device 100 with touch-sensitive displays 112 in accordance with some embodiments. Touch-sensitive display 112 is sometimes called a "touch screen" for convenience, and may also be known as or called a touch-sensitive display system. Device 100 may include memory 102 (which may include one or more computer readable storage mediums), memory controller 122, one or more processing units (CPU's) 120, peripherals interface 118, RF circuitry 108, audio circuitry 110, speaker 111, microphone 113, input/output (I/O) subsystem 106, other input or control devices 116, and external port 124. Device 100 may include one or more optical sensors 164. These components may communicate over one or more communication buses or signal lines 103.

It should be appreciated that device 100 is only one example of a portable multifunction device, and that device 100 may have more or fewer components than shown, may combine two or more components, or may have a different configuration or arrangement of the components. The various components shown in FIG. 1A may be implemented in hardware, software, or a combination of both hardware and software, including one or more signal processing and/or application specific integrated circuits.

Memory 102 may include high-speed random access memory and may also include non-volatile memory, such as one or more magnetic disk storage devices, flash memory devices, or other non-volatile solid-state memory devices. Access to memory 102 by other components of device 100, such as CPU 120 and the peripherals interface 118, may be controlled by memory controller 122.

Peripherals interface 118 can be used to couple input and output peripherals of the device to CPU 120 and memory 102. The one or more processors 120 run or execute various software programs and/or sets of instructions stored in memory 102 to perform various functions for device 100 and to process data.

In some embodiments, peripherals interface 118, CPU 120, and memory controller 122 may be implemented on a single chip, such as chip 104. In some other embodiments, they may be implemented on separate chips.

RF (radio frequency) circuitry 108 receives and sends RF signals, also called electromagnetic signals. RF circuitry 108 converts electrical signals to/from electromagnetic signals and communicates with communications networks and other communications devices via the electromagnetic signals. RF circuitry 108 may include well-known circuitry for performing these functions, including but not limited to an antenna system, an RF transceiver, one or more amplifiers, a tuner, one or more oscillators, a digital signal processor, a CODEC chipset, a subscriber identity module (SIM) card, memory, and so forth. RF circuitry 108 may communicate with networks, such as the Internet, also referred to as the World Wide Web (WWW), an intranet and/or a wireless network, such as a cellular telephone network, a wireless local area network (LAN) and/or a metropolitan area network (MAN), and other devices by wireless communication. The wireless communication may use any of a plurality of communications standards, protocols and technologies, including but not limited to Global System for Mobile Communications (GSM), Enhanced Data GSM Environment (EDGE), high-speed downlink packet access (HSDPA), high-speed uplink packet access (HSUPA), wideband code division multiple access (W-CDMA), code division multiple access (CDMA), time division multiple access (TDMA), Bluetooth, Wireless Fidelity (Wi-Fi) (e.g., IEEE 802.11a, IEEE 802.11b, IEEE 802.11g and/or IEEE 802.11n), voice over Internet Protocol (VoIP), Wi-MAX, a protocol for e-mail (e.g., Internet message access protocol (IMAP) and/or post office protocol (POP)), instant messaging (e.g., extensible messaging and presence protocol (XMPP), Session Initiation Protocol for Instant Messaging and Presence Leveraging Extensions (SIMPLE), Instant Messaging and Presence Service (IMPS)), and/or Short Message Service (SMS), or any other suitable communication protocol, including communication protocols not yet developed as of the filing date of this document.

Audio circuitry 110, speaker 111, and microphone 113 provide an audio interface between a user and device 100. Audio circuitry 110 receives audio data from peripherals interface 118, converts the audio data to an electrical signal, and transmits the electrical signal to speaker 111. Speaker 111 converts the electrical signal to human-audible sound waves. Audio circuitry 110 also receives electrical signals converted by microphone 113 from sound waves. Audio circuitry 110 converts the electrical signal to audio data and transmits the audio data to peripherals interface 118 for processing. Audio data may be retrieved from and/or transmitted to memory 102 and/or RF circuitry 108 by peripherals interface 118. In some embodiments, audio circuitry 110 also includes a headset jack (e.g., 212, FIG. 2). The headset jack provides an interface between audio circuitry 110 and removable audio input/output peripherals, such as output-only headphones or a headset with both output (e.g., a headphone for one or both ears) and input (e.g., a microphone).

I/O subsystem 106 couples input/output peripherals on device 100, such as touch screen 112 and other input control devices 116, to peripherals interface 118. I/O subsystem 106 may include display controller 156 and one or more input controllers 160 for other input or control devices. The one or more input controllers 160 receive/send electrical signals from/to other input or control devices 116. The other input control devices 116 may include physical buttons (e.g., push buttons, rocker buttons, etc.), dials, slider switches, joysticks, click wheels, and so forth. In some alternate embodiments, input controller(s) 160 may be coupled to any (or none) of the following: a keyboard, infrared port, USB port, and a pointer device such as a mouse. The one or more buttons (e.g., 208, FIG. 2) may include an up/down button for volume control of speaker 111 and/or microphone 113. The one or more buttons may include a push button (e.g., 206, FIG. 2).

Touch-sensitive display 112 provides an input interface and an output interface between the device and a user. Display controller 156 receives and/or sends electrical signals from/to touch screen 112. Touch screen 112 displays visual output to the user. The visual output may include graphics, text, icons, video, and any combination thereof (collectively termed "graphics"). In some embodiments, some or all of the visual output may correspond to user-interface objects.

Touch screen 112 has a touch-sensitive surface, sensor or set of sensors that accepts input from the user based on haptic and/or tactile contact. Touch screen 112 and display controller 156 (along with any associated modules and/or sets of instructions in memory 102) detect contact (and any movement or breaking of the contact) on touch screen 112 and converts the detected contact into interaction with user-interface objects (e.g., one or more soft keys, icons, web pages or images) that are displayed on touch screen 112. In an exemplary embodiment, a point of contact between touch screen 112 and the user corresponds to a finger of the user.

Touch screen 112 may use LCD (liquid crystal display) technology, LPD (light emitting polymer display) technology, or LED (light emitting diode) technology, although other display technologies may be used in other embodiments. Touch screen 112 and display controller 156 may detect contact and any movement or breaking thereof using any of a plurality of touch sensing technologies now known or later developed, including but not limited to capacitive, resistive, infrared, and surface acoustic wave technologies, as well as other proximity sensor arrays or other elements for determining one or more points of contact with touch screen 112. In an exemplary embodiment, projected mutual capacitance sensing technology is used, such as that found in the iPhone®, iPod Touch®, and iPad® from Apple Inc. of Cupertino, Calif.

Touch screen 112 may have a video resolution in excess of 100 dpi. In some embodiments, the touch screen has a video resolution of approximately 160 dpi. The user may make contact with touch screen 112 using any suitable object or appendage, such as a stylus, a finger, and so forth. In some embodiments, the user interface is designed to work primarily with finger-based contacts and gestures, which can be less precise than stylus-based input due to the larger area of contact of a finger on the touch screen. In some embodiments, the device translates the rough finger-based input into a precise pointer/cursor position or command for performing the actions desired by the user.

In some embodiments, in addition to the touch screen, device 100 may include a touchpad (not shown) for activating or deactivating particular functions. In some embodiments, the touchpad is a touch-sensitive area of the device that, unlike the touch screen, does not display visual output. The touchpad may be a touch-sensitive surface that is separate from touch screen 112 or an extension of the touch-sensitive surface formed by the touch screen.

Device 100 also includes power system 162 for powering the various components. Power system 162 may include a power management system, one or more power sources (e.g., battery, alternating current (AC)), a recharging system, a power failure detection circuit, a power converter or inverter, a power status indicator (e.g., a light-emitting diode (LED)) and any other components associated with the generation, management and distribution of power in portable devices.

Device 100 may also include one or more optical sensors 164. FIG. 1A shows an optical sensor coupled to optical sensor controller 158 in I/O subsystem 106. Optical sensor 164 may include charge-coupled device (CCD) or complementary metal-oxide semiconductor (CMOS) phototransistors. Optical sensor 164 receives light from the environment, projected through one or more lens, and converts the light to data representing an image. In conjunction with imaging module 143 (also called a camera module), optical sensor 164 may capture still images or video. In some embodiments, an optical sensor is located on the back of device 100, opposite touch screen display 112 on the front of the device, so that the touch screen display may be used as a viewfinder for still and/or video image acquisition. In some embodiments, another optical sensor is located on the front of the device so that the user's image may be obtained for videoconferencing while the user views the other video conference participants on the touch screen display.

Device 100 may also include one or more proximity sensors 166. FIG. 1A shows proximity sensor 166 coupled to peripherals interface 118. Alternately, proximity sensor 166 may be coupled to input controller 160 in I/O subsystem 106. In some embodiments, the proximity sensor turns off and disables touch screen 112 when the multifunction device is placed near the user's ear (e.g., when the user is making a phone call).

Device 100 may also include one or more accelerometers 168. FIG. 1A shows accelerometer 168 coupled to peripherals interface 118. Alternately, accelerometer 168 may be coupled to an input controller 160 in I/O subsystem 106. In some embodiments, information is displayed on the touch screen display in a portrait view or a landscape view based on an analysis of data received from the one or more accelerometers. Device 100 optionally includes, in addition to accelerometer(s) 168, a magnetometer (not shown) and a GPS (or GLONASS or other global navigation system) receiver (not shown) for obtaining information concerning the location and orientation (e.g., portrait or landscape) of device 100.

Figure 3:
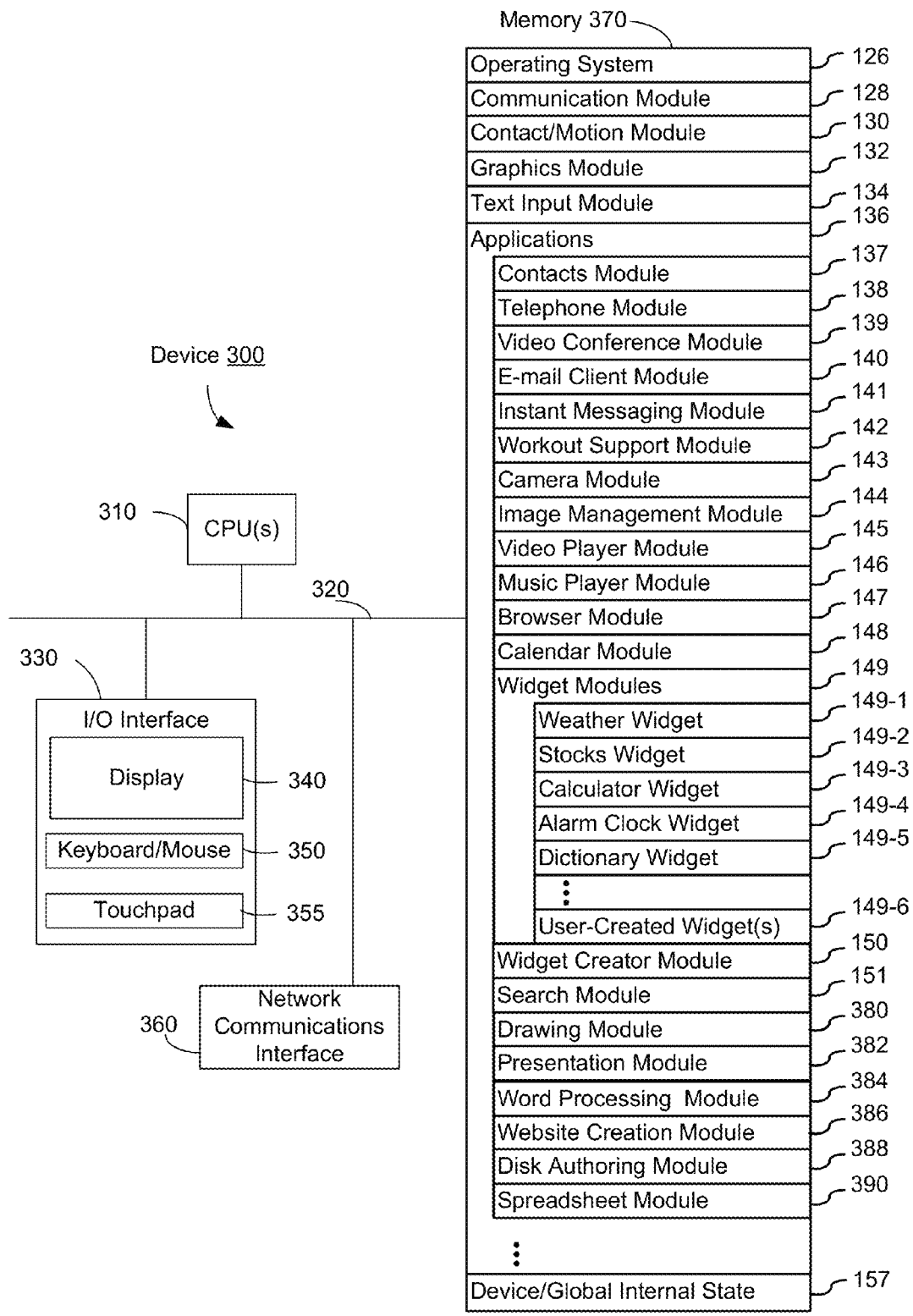
FIG. 3 is a block diagram of an exemplary multifunction device with a display and a touch-sensitive surface in accordance with some embodiments.

In some embodiments, the software components stored in memory 102 include operating system 126, communication module (or set of instructions) 128, contact/motion module (or set of instructions) 130, graphics module (or set of instructions) 132, text input module (or set of instructions) 134, Global Positioning System (GPS) module (or set of instructions) 135, and applications (or sets of instructions) 136. Furthermore, in some embodiments memory 102 stores device/global internal state 157, as shown in FIGS. 1A and 3. Device/global internal state 157 includes one or more of: active application state, indicating which applications, if any, are currently active; display state, indicating what applications, views or other information occupy various regions of touch screen display 112; sensor state, including information obtained from the device's various sensors and input control devices 116; and location information concerning the device's location and/or attitude.

Operating system 126 (e.g., Darwin, RTXC, LINUX, UNIX, OS X, WINDOWS, or an embedded operating system such as VxWorks) includes various software components and/or drivers for controlling and managing general system tasks (e.g., memory management, storage device control, power management, etc.) and facilitates communication between various hardware and software components.

Communication module 128 facilitates communication with other devices over one or more external ports 124 and also includes various software components for handling data received by RF circuitry 108 and/or external port 124. External port 124 (e.g., Universal Serial Bus (USB), FIREWIRE, etc.) is adapted for coupling directly to other devices or indirectly over a network (e.g., the Internet, wireless LAN, etc.). In some embodiments, the external port is a multi-pin (e.g., 30-pin) connector that is the same as, or similar to and/or compatible with the 30-pin connector used on iPod (trademark of Apple Inc.) devices.

Contact/motion module 130 may detect contact with touch screen 112 (in conjunction with display controller 156) and other touch sensitive devices (e.g., a touchpad or physical click wheel). Contact/motion module 130 includes various software components for performing various operations related to detection of contact, such as determining if contact has occurred (e.g., detecting a finger-down event), determining if there is movement of the contact and tracking the movement across the touch-sensitive surface (e.g., detecting one or more finger-dragging events), and determining if the contact has ceased (e.g., detecting a finger-up event or a break in contact). Contact/motion module 130 receives contact data from the touch-sensitive surface. Determining movement of the point of contact, which is represented by a series of contact data, may include determining speed (magnitude), velocity (magnitude and direction), and/or an acceleration (a change in magnitude and/or direction) of the point of contact. These operations may be applied to single contacts (e.g., one finger contacts) or to multiple simultaneous contacts (e.g., "multitouch"/multiple finger contacts). In some embodiments, contact/motion module 130 and display controller 156 detect contact on a touchpad.

Contact/motion module 130 may detect a gesture input by a user. Different gestures on the touch-sensitive surface have different contact patterns. Thus, a gesture may be detected by detecting a particular contact pattern. For example, detecting a finger tap gesture includes detecting a finger-down event followed by detecting a finger-up (lift off) event at the same position (or substantially the same position) as the finger-down event (e.g., at the position of an icon). As another example, detecting a finger swipe gesture on the touch-sensitive surface includes detecting a finger-down event followed by detecting one or more finger-dragging events, and subsequently followed by detecting a finger-up (lift off) event.

Graphics module 132 includes various known software components for rendering and displaying graphics on touch screen 112 or other display, including components for changing the intensity of graphics that are displayed. As used herein, the term "graphics" includes any object that can be displayed to a user, including without limitation text, web pages, icons (such as user-interface objects including soft keys), digital images, videos, animations and the like.

In some embodiments, graphics module 132 stores data representing graphics to be used. Each graphic may be assigned a corresponding code. Graphics module 132 receives, from applications etc., one or more codes specifying graphics to be displayed along with, if necessary, coordinate data and other graphic property data, and then generates screen image data to output to display controller 156.

Text input module 134, which may be a component of graphics module 132, provides soft keyboards for entering text in various applications (e.g., contacts 137, e-mail 140, IM 141, browser 147, and any other application that needs text input).

GPS module 135 determines the location of the device and provides this information for use in various applications (e.g., to telephone 138 for use in location-based dialing, to camera 143 as picture/video metadata, and to applications that provide location-based services such as weather widgets, local yellow page widgets, and map/navigation widgets).

Applications 136 may include the following modules (or sets of instructions), or a subset or superset thereof:
  contacts module 137 (sometimes called an address book or contact list);
  telephone module 138;
  video conferencing module 139;
  e-mail client module 140;
  instant messaging (IM) module 141;
  workout support module 142;
  camera module 143 for still and/or video images;
  image management module 144;
  browser module 147;
  calendar module 148;
  widget modules 149, which may include one or more of: weather widget 149-1, stocks widget 149-2, calculator widget 149-3, alarm clock widget 149-4, dictionary widget 149-5, and other widgets obtained by the user, as well as user-created widgets 149-6;
  widget creator module 150 for making user-created widgets 149-6;
  search module 151;
  video and music player module 152, which may be made up of a video player module and a music player module;
  notes module 153;
  map module 154; and/or
  online video module 155.

Examples of other applications 136 that may be stored in memory 102 include other word processing applications, other image editing applications, drawing applications, presentation applications, JAVA-enabled applications, encryption, digital rights management, voice recognition, and voice replication.

In conjunction with touch screen 112, display controller 156, contact module 130, graphics module 132, and text input module 134, contacts module 137 may be used to manage an address book or contact list (e.g., stored in application internal state 192 of contacts module 137 in memory 102 or memory 370), including: adding name(s) to the address book; deleting name(s) from the address book; associating telephone number(s), e-mail address(es), physical address(es) or other information with a name; associating an image with a name; categorizing and sorting names; providing telephone numbers or e-mail addresses to initiate and/or facilitate communications by telephone 138, video conference 139, e-mail 140, or IM 141; and so forth.

In conjunction with RF circuitry 108, audio circuitry 110, speaker 111, microphone 113, touch screen 112, display controller 156, contact module 130, graphics module 132, and text input module 134, telephone module 138 may be used to enter a sequence of characters corresponding to a telephone number, access one or more telephone numbers in address book 137, modify a telephone number that has been entered, dial a respective telephone number, conduct a conversation and disconnect or hang up when the conversation is completed. As noted above, the wireless communication may use any of a plurality of communications standards, protocols and technologies.

In conjunction with RF circuitry 108, audio circuitry 110, speaker 111, microphone 113, touch screen 112, display controller 156, optical sensor 164, optical sensor controller 158, contact module 130, graphics module 132, text input module 134, contact list 137, and telephone module 138, videoconferencing module 139 includes executable instructions to initiate, conduct, and terminate a video conference between a user and one or more other participants in accordance with user instructions.

In conjunction with RF circuitry 108, touch screen 112, display controller 156, contact module 130, graphics module 132, and text input module 134, e-mail client module 140 includes executable instructions to create, send, receive, and manage e-mail in response to user instructions. In conjunction with image management module 144, e-mail client module 140 makes it very easy to create and send e-mails with still or video images taken with camera module 143.

In conjunction with RF circuitry 108, touch screen 112, display controller 156, contact module 130, graphics module 132, and text input module 134, the instant messaging module 141 includes executable instructions to enter a sequence of characters corresponding to an instant message, to modify previously entered characters, to transmit a respective instant message (for example, using a Short Message Service (SMS) or Multimedia Message Service (MMS) protocol for telephony-based instant messages or using XMPP, SIMPLE, or IMPS for Internet-based instant messages), to receive instant messages and to view received instant messages. In some embodiments, transmitted and/or received instant messages may include graphics, photos, audio files, video files and/or other attachments as are supported in a MMS and/or an Enhanced Messaging Service (EMS). As used herein, "instant messaging" refers to both telephony-based messages (e.g., messages sent using SMS or MMS) and Internet-based messages (e.g., messages sent using XMPP, SIMPLE, or IMPS).

In conjunction with RF circuitry 108, touch screen 112, display controller 156, contact module 130, graphics module 132, text input module 134, GPS module 135, map module 154, and music player module 146, workout support module 142 includes executable instructions to create workouts (e.g., with time, distance, and/or calorie burning goals); communicate with workout sensors (sports devices); receive workout sensor data; calibrate sensors used to monitor a workout; select and play music for a workout; and display, store and transmit workout data.

In conjunction with touch screen 112, display controller 156, optical sensor(s) 164, optical sensor controller 158, contact module 130, graphics module 132, and image management module 144, camera module 143 includes executable instructions to capture still images or video (including a video stream) and store them into memory 102, modify characteristics of a still image or video, or delete a still image or video from memory 102.

In conjunction with touch screen 112, display controller 156, contact module 130, graphics module 132, text input module 134, and camera module 143, image management module 144 includes executable instructions to arrange, modify (e.g., edit), or otherwise manipulate, label, delete, present (e.g., in a digital slide show or album), and store still and/or video images.

In conjunction with RF circuitry 108, touch screen 112, display system controller 156, contact module 130, graphics module 132, and text input module 134, browser module 147 includes executable instructions to browse the Internet in accordance with user instructions, including searching, linking to, receiving, and displaying web pages or portions thereof, as well as attachments and other files linked to web pages.

In conjunction with RF circuitry 108, touch screen 112, display system controller 156, contact module 130, graphics module 132, text input module 134, e-mail client module 140, and browser module 147, calendar module 148 includes executable instructions to create, display, modify, and store calendars and data associated with calendars (e.g., calendar entries, to do lists, etc.) in accordance with user instructions.

In conjunction with RF circuitry 108, touch screen 112, display system controller 156, contact module 130, graphics module 132, text input module 134, and browser module 147, widget modules 149 are mini-applications that may be downloaded and used by a user (e.g., weather widget 149-1, stocks widget 149-2, calculator widget 149-3, alarm clock widget 149-4, and dictionary widget 149-5) or created by the user (e.g., user-created widget 149-6). In some embodiments, a widget includes an HTML (Hypertext Markup Language) file, a CSS (Cascading Style Sheets) file, and a JavaScript file. In some embodiments, a widget includes an XML (Extensible Markup Language) file and a JavaScript file (e.g., Yahoo! Widgets).

In conjunction with RF circuitry 108, touch screen 112, display system controller 156, contact module 130, graphics module 132, text input module 134, and browser module 147, the widget creator module 150 may be used by a user to create widgets (e.g., turning a user-specified portion of a web page into a widget).

In conjunction with touch screen 112, display system controller 156, contact module 130, graphics module 132, and text input module 134, search module 151 includes executable instructions to search for text, music, sound, image, video, and/or other files in memory 102 that match one or more search criteria (e.g., one or more user-specified search terms) in accordance with user instructions.

In conjunction with touch screen 112, display system controller 156, contact module 130, graphics module 132, audio circuitry 110, speaker 111, RF circuitry 108, and browser module 147, video and music player module 152 includes executable instructions that allow the user to download and play back recorded music and other sound files stored in one or more file formats, such as MP3 or AAC files, and executable instructions to display, present or otherwise play back videos (e.g., on touch screen 112 or on an external, connected display via external port 124). In some embodiments, device 100 may include the functionality of an MP3 player, such as an iPod (trademark of Apple Inc.).

In conjunction with touch screen 112, display controller 156, contact module 130, graphics module 132, and text input module 134, notes module 153 includes executable instructions to create and manage notes, to do lists, and the like in accordance with user instructions.

In conjunction with RF circuitry 108, touch screen 112, display system controller 156, contact module 130, graphics module 132, text input module 134, GPS module 135, and browser module 147, map module 154 may be used to receive, display, modify, and store maps and data associated with maps (e.g., driving directions; data on stores and other points of interest at or near a particular location; and other location-based data) in accordance with user instructions.

In conjunction with touch screen 112, display system controller 156, contact module 130, graphics module 132, audio circuitry 110, speaker 111, RF circuitry 108, text input module 134, e-mail client module 140, and browser module 147, online video module 155 includes instructions that allow the user to access, browse, receive (e.g., by streaming and/or download), play back (e.g., on the touch screen or on an external, connected display via external port 124), send an e-mail with a link to a particular online video, and otherwise manage online videos in one or more file formats, such as H.264. In some embodiments, instant messaging module 141, rather than e-mail client module 140, is used to send a link to a particular online video.

Each of the above identified modules and applications correspond to a set of executable instructions for performing one or more functions described above and the methods described in this application (e.g., the computer-implemented methods and other information processing methods described herein). These modules (i.e., sets of instructions) need not be implemented as separate software programs, procedures or modules, and thus various subsets of these modules may be combined or otherwise re-arranged in various embodiments. In some embodiments, memory 102 may store a subset of the modules and data structures identified above. Furthermore, memory 102 may store additional modules and data structures not described above.

In some embodiments, device 100 is a device where operation of a predefined set of functions on the device is performed exclusively through a touch screen and/or a touchpad. By using a touch screen and/or a touchpad as the primary input control device for operation of device 100, the number of physical input control devices (such as push buttons, dials, and the like) on device 100 may be reduced.

The predefined set of functions that may be performed exclusively through a touch screen and/or a touchpad include navigation between user interfaces. In some embodiments, the touchpad, when touched by the user, navigates device 100 to a main, home, or root menu from any user interface that may be displayed on device 100. In such embodiments, the touchpad may be referred to as a "menu button." In some other embodiments, the menu button may be a physical push button or other physical input control device instead of a touchpad.

Figure 1B:
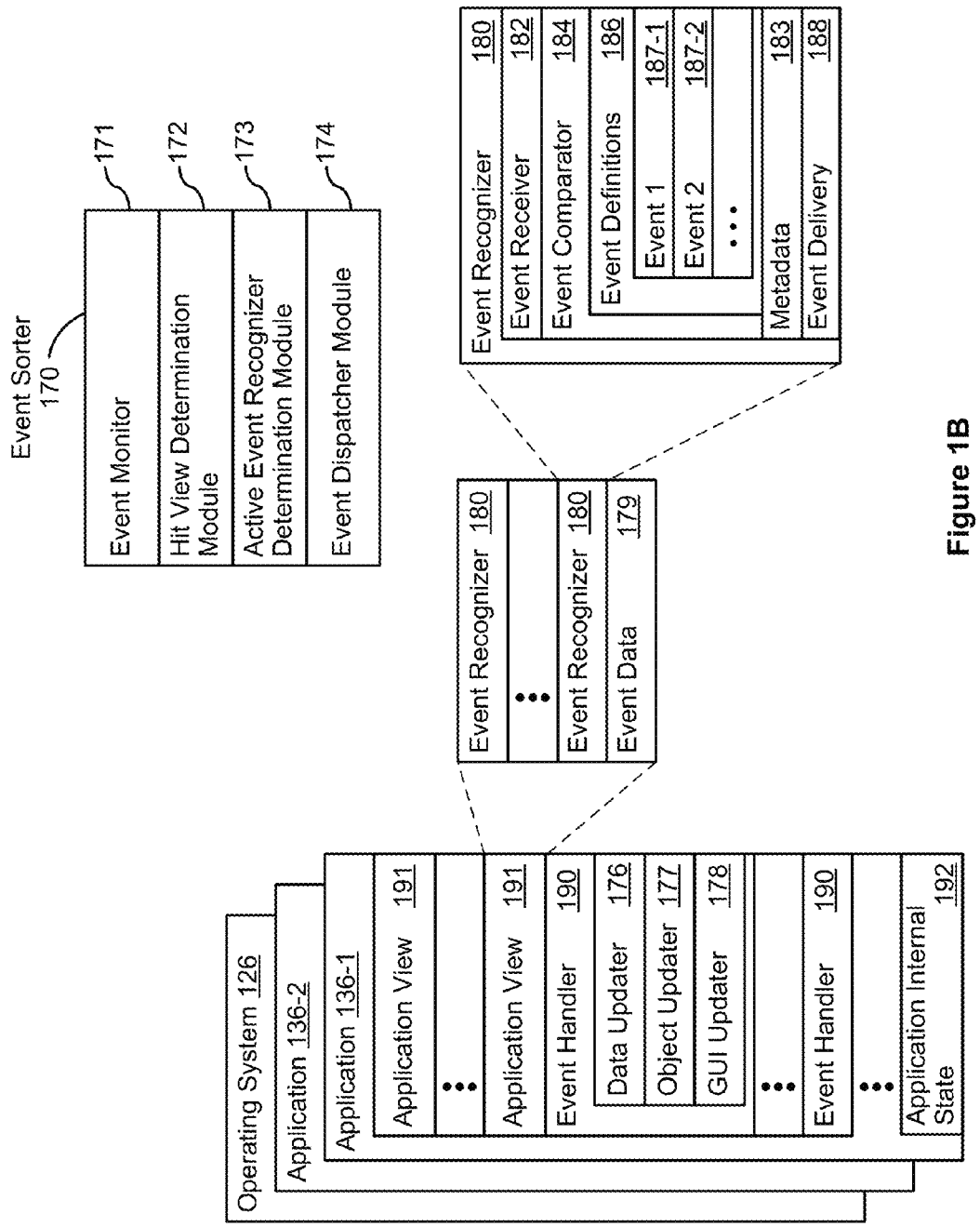
FIG. 1B is a block diagram illustrating exemplary components for event handling in accordance with some embodiments.

FIG. 1B is a block diagram illustrating exemplary components for event handling in accordance with some embodiments. In some embodiments, memory 102 (in FIG. 1A) or 370 (FIG. 3) includes event sorter 170 (e.g., in operating system 126), operating system 126, one or more applications (e.g., 136-1 and 136-2, which can be any of the aforementioned applications 137-151, 155, 380-390).

Event sorter 170 receives event information and determines the application 136-1 and application view 191 of application 136-1 to which to deliver the event information. Event sorter 170 includes event monitor 171 and event dispatcher module 174. In some embodiments, application 136-1 includes application internal state 192, which indicates the current application view(s) displayed on touch sensitive display 112 when the application is active or executing. In some embodiments, device/global internal state 157 is used by event sorter 170 to determine which application(s) is (are) currently active, and application internal state 192 is used by event sorter 170 to determine application views 191 to which to deliver event information.

In some embodiments, application internal state 192 includes additional information, such as one or more of: resume information to be used when application 136-1 resumes execution, user interface state information that indicates information being displayed or that is ready for display by application 136-1, a state queue for enabling the user to go back to a prior state or view of application 136-1, and a redo/undo queue of previous actions taken by the user.

Event monitor 171 receives event information from peripherals interface 118. Event information includes information about a sub-event (e.g., a user touch on touch-sensitive display 112, as part of a multi-touch gesture). Peripherals interface 118 transmits information it receives from I/O subsystem 106 or a sensor, such as proximity sensor 166, accelerometer(s) 168, and/or microphone 113 (through audio circuitry 110). Information that peripherals interface 118 receives from I/O subsystem 106 includes information from touch-sensitive display 112 or a touch-sensitive surface.

In some embodiments, event monitor 171 sends requests to the peripherals interface 118 at predetermined intervals. In response, peripherals interface 118 transmits event information. In other embodiments, peripheral interface 118 transmits event information only when there is a significant event (e.g., receiving an input above a predetermined noise threshold and/or for more than a predetermined duration).

In some embodiments, event sorter 170 also includes a hit view determination module 172 and/or an active event recognizer determination module 173.

Hit view determination module 172 provides software procedures for determining where a sub-event has taken place within one or more views, when touch sensitive display 112 displays more than one view. Views are made up of controls and other elements that a user can see on the display.

Another aspect of the user interface associated with an application is a set of views, sometimes herein called application views or user interface windows, in which information is displayed and touch-based gestures occur. The application views (of a respective application) in which a touch is detected may correspond to programmatic levels within a programmatic or view hierarchy of the application. For example, the lowest level view in which a touch is detected may be called the hit view, and the set of events that are recognized as proper inputs may be determined based, at least in part, on the hit view of the initial touch that begins a touch-based gesture.

Hit view determination module 172 receives information related to sub-events of a touch-based gesture. When an application has multiple views organized in a hierarchy, hit view determination module 172 identifies a hit view as the lowest view in the hierarchy which should handle the sub-event. In most circumstances, the hit view is the lowest level view in which an initiating sub-event occurs (i.e., the first sub-event in the sequence of sub-events that form an event or potential event). Once the hit view is identified by the hit view determination module, the hit view typically receives all sub-events related to the same touch or input source for which it was identified as the hit view.

Active event recognizer determination module 173 determines which view or views within a view hierarchy should receive a particular sequence of sub-events. In some embodiments, active event recognizer determination module 173 determines that only the hit view should receive a particular sequence of sub-events. In other embodiments, active event recognizer determination module 173 determines that all views that include the physical location of a sub-event are actively involved views, and therefore determines that all actively involved views should receive a particular sequence of sub-events. In other embodiments, even if touch sub-events were entirely confined to the area associated with one particular view, views higher in the hierarchy would still remain as actively involved views.

Event dispatcher module 174 dispatches the event information to one or more event recognizers (e.g., event recognizer 180). In some embodiments, event dispatcher module 174 dispatches the event information to one or more event recognizers in a single application. In other embodiments, event dispatcher module 174 dispatches the event information to event recognizers in a plurality of applications 136, or the operating system 126 and at least one application. In embodiments including active event recognizer determination module 173, event dispatcher module 174 delivers the event information to one or more event recognizers including an event recognizer determined by active event recognizer determination module 173. In some embodiments, event dispatcher module 174 stores in an event queue the event information, which is retrieved by a respective event receiver module 182.

In some embodiments, operating system 126 includes event sorter 170. Alternatively, application 136-1 includes event sorter 170. In yet other embodiments, event sorter 170 is a stand-alone module, or a part of another module stored in memory 102, such as contact/motion module 130.

In some embodiments, respective applications (e.g., 136-1 and 136-2) include a plurality of event handlers 190 and one or more application views 191, each of which includes instructions for handling touch events that occur within a respective view of the application's user interface. Each application view 191 of the application 136-1 includes one or more event recognizers 180. Typically, a respective application view 191 includes a plurality of event recognizers 180. In some embodiments, the operating system 126 includes one or more event recognizers 180. In some embodiments, the event sorter 170 includes one or more event recognizers 180. In other embodiments, one or more of event recognizers 180 are part of a separate module, such as a user interface kit (not shown) or a higher level object from which application 136-1 inherits methods and other properties. In some embodiments, a respective event handler 190 includes one or more of: data updater 176, object updater 177, GUI updater 178, and/or event data 179 received from event sorter 170. Event handler 190 may utilize or call data updater 176, object updater 177 or GUI updater 178 to update the application internal state 192. Alternatively, one or more of the application views 191 include one or more respective event handlers 190. Also, in some embodiments, one or more of data updater 176, object updater 177, and GUI updater 178 are included in a respective application view 191.

A respective event recognizer 180 receives event information (e.g., event data 179) from event sorter 170, and identifies an event from the event information. Event recognizer 180 includes event receiver 182 and event comparator 184. In some embodiments, event recognizer 180 also includes at least a subset of: metadata 183, and event delivery instructions 188 (which may include sub-event delivery instructions).

Event receiver 182 receives event information from event sorter 170. The event information includes information about a sub-event, for example, a touch or a touch movement. Depending on the sub-event, the event information also includes additional information, such as location of the sub-event. When the sub-event concerns motion of a touch the event information may also include speed and direction of the sub-event. In some embodiments, events include rotation of the device from one orientation to another (e.g., from a portrait orientation to a landscape orientation, or vice versa), and the event information includes corresponding information about the current orientation (also called device attitude) of the device.

Event comparator 184 compares the event information to predefined event or sub-event definitions and, based on the comparison, determines an event or sub-event, or determines or updates the state of an event or sub-event. In some embodiments, event comparator 184 includes event definitions 186. Event definitions 186 contain definitions of events (e.g., predefined sequences of sub-events), for example, event 1 (187-1), event 2 (187-2), and others. In some embodiments, sub-events in an event 187 include, for example, touch begin, touch end, touch movement, touch cancellation, and multiple touching. In one example, the definition for event 1 (187-1) is a double tap on a displayed object. The double tap, for example, comprises a first touch (touch begin) on the displayed object for a predetermined phase, a first lift-off (touch end) for a predetermined phase, a second touch (touch begin) on the displayed object for a predetermined phase, and a second lift-off (touch end) for a predetermined phase. In another example, the definition for event 2 (187-2) is a dragging on a displayed object. The dragging, for example, comprises a touch (or contact) on the displayed object for a predetermined phase, a movement of the touch across touch-sensitive display 112, and lift-off of the touch (touch end). In some embodiments, the event also includes information for one or more associated event handlers 190.

In some embodiments, event definition 187 includes a definition of an event for a respective user-interface object. In some embodiments, event comparator 184 performs a hit test to determine which user-interface object is associated with a sub-event. For example, in an application view in which three user-interface objects are displayed on touch-sensitive display 112, when a touch is detected on touch-sensitive display 112, event comparator 184 performs a hit test to determine which of the three user-interface objects is associated with the touch (sub-event). If each displayed object is associated with a respective event handler 190, the event comparator uses the result of the hit test to determine which event handler 190 should be activated. For example, event comparator 184 selects an event handler associated with the sub-event and the object triggering the hit test.

In some embodiments, the definition for a respective event 187 also includes delayed actions that delay delivery of the event information until after it has been determined whether the sequence of sub-events does or does not correspond to the event recognizer's event type.

When a respective event recognizer 180 determines that the series of sub-events do not match any of the events in event definitions 186, the respective event recognizer 180 enters an event impossible, event failed, or event ended state, after which it disregards subsequent sub-events of the touch-based gesture. In this situation, other event recognizers, if any, that remain active continue to track and process sub-events of an ongoing touch-based gesture.

In some embodiments, a respective event recognizer 180 includes metadata 183 with configurable properties, flags, and/or lists that indicate how the event delivery system should perform sub-event delivery to actively involved event recognizers. In some embodiments, metadata 183 includes configurable properties, flags, and/or lists that indicate how event recognizers may interact with one another. In some embodiments, metadata 183 includes configurable properties, flags, and/or lists that indicate whether sub-events are delivered to varying levels in the view or programmatic hierarchy.

In some embodiments, a respective event recognizer 180 activates event handler 190 associated with an event when one or more particular sub-events of an event are recognized. In some embodiments, a respective event recognizer 180 delivers event information associated with the event to event handler 190. Activating an event handler 190 is distinct from sending (and deferred sending) sub-events to a respective hit view. In some embodiments, event recognizer 180 throws a flag associated with the recognized event, and event handler 190 associated with the flag catches the flag and performs a predefined process.

In some embodiments, event delivery instructions 188 include sub-event delivery instructions that deliver event information about a sub-event without activating an event handler. Instead, the sub-event delivery instructions deliver event information to event handlers associated with the series of sub-events or to actively involved views. Event handlers associated with the series of sub-events or with actively involved views receive the event information and perform a predetermined process.

In some embodiments, data updater 176 creates and updates data used in application 136-1. For example, data updater 176 updates the telephone number used in contacts module 137, or stores a video file used in video player module 145. In some embodiments, object updater 177 creates and updates objects used in application 136-1. For example, object updater 176 creates a new user-interface object or updates the position of a user-interface object. GUI updater 178 updates the GUI. For example, GUI updater 178 prepares display information and sends it to graphics module 132 for display on a touch-sensitive display.

In some embodiments, event handler(s) 190 includes or has access to data updater 176, object updater 177, and GUI updater 178. In some embodiments, data updater 176, object updater 177, and GUI updater 178 are included in a single module of a respective application 136-1 or application view 191. In other embodiments, they are included in two or more software modules.

It shall be understood that the foregoing discussion regarding event handling of user touches on touch-sensitive displays also applies to other forms of user inputs to operate multifunction devices 100 with input-devices, not all of which are initiated on touch screens, e.g., coordinating mouse movement and mouse button presses with or without single or multiple keyboard presses or holds, user movements taps, drags, scrolls, etc., on touch-pads, pen stylus inputs, movement of the device, oral instructions, detected eye movements, biometric inputs, and/or any combination thereof, which may be utilized as inputs corresponding to sub-events which define an event to be recognized.

Figure 2:
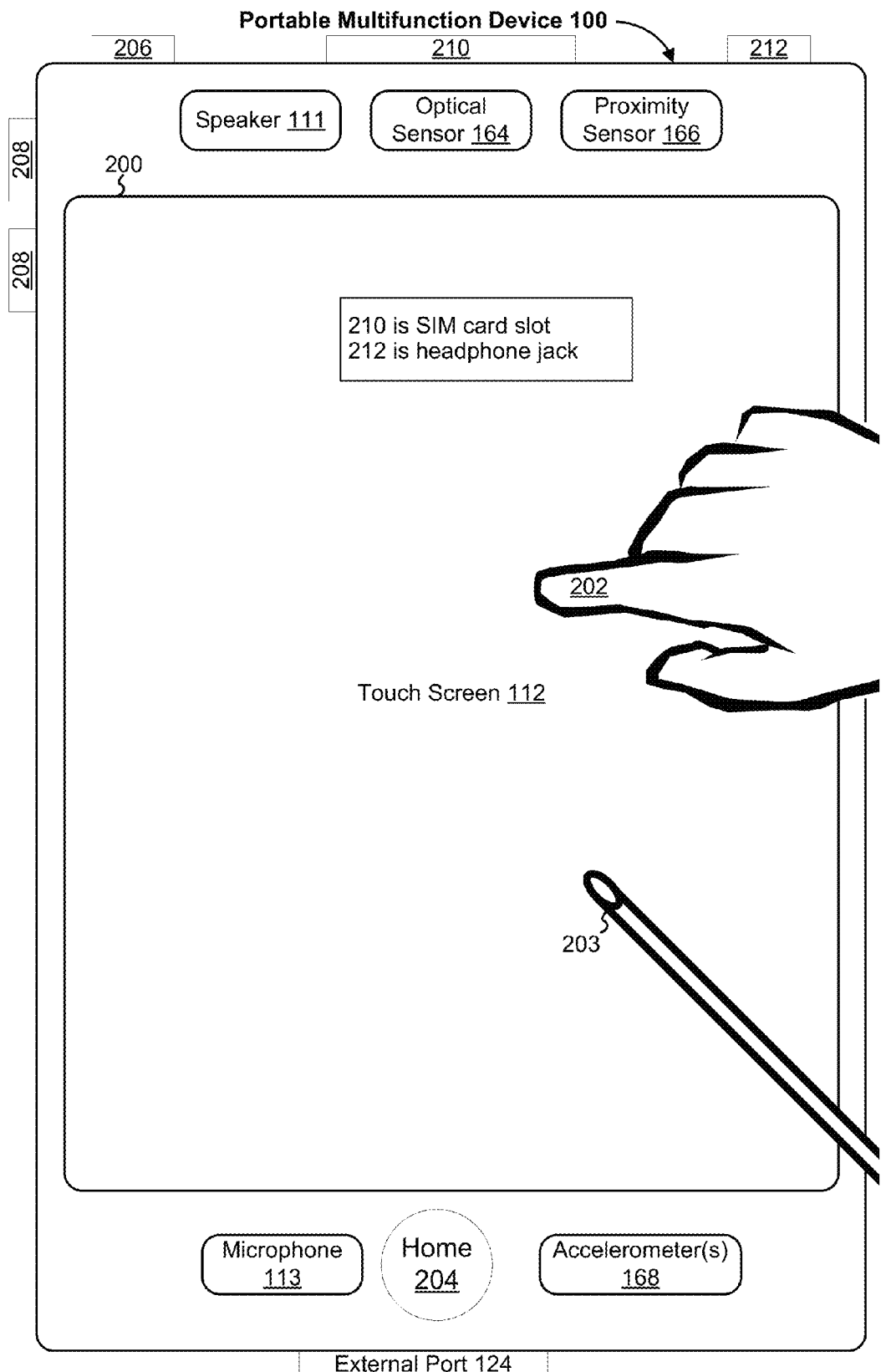
FIG. 2 illustrates a portable multifunction device having a touch screen in accordance with some embodiments.

FIG. 2 illustrates a portable multifunction device 100 having a touch screen 112 in accordance with some embodiments. The touch screen may display one or more graphics within user interface (UI) 200. In this embodiment, as well as others described below, a user may select one or more of the graphics by making a gesture on the graphics, for example, with one or more fingers 202 (not drawn to scale in the figure) or one or more styluses 203 (not drawn to scale in the figure). In some embodiments, selection of one or more graphics occurs when the user breaks contact with the one or more graphics. In some embodiments, the gesture may include one or more taps, one or more swipes (from left to right, right to left, upward and/or downward) and/or a rolling of a finger (from right to left, left to right, upward and/or downward) that has made contact with device 100. In some embodiments, inadvertent contact with a graphic may not select the graphic. For example, a swipe gesture that sweeps over an application icon may not select the corresponding application when the gesture corresponding to selection is a tap.

Device 100 may also include one or more physical buttons, such as "home" or menu button 204. As described previously, menu button 204 may be used to navigate to any application 136 in a set of applications that may be executed on device 100. Alternatively, in some embodiments, the menu button is implemented as a soft key in a GUI displayed on touch screen 112.

In one embodiment, device 100 includes touch screen 112, menu button 204, push button 206 for powering the device on/off and locking the device, volume adjustment button(s) 208, Subscriber Identity Module (SIM) card slot 210, head set jack 212, and docking/charging external port 124. Push button 206 may be used to turn the power on/off on the device by depressing the button and holding the button in the depressed state for a predefined time interval; to lock the device by depressing the button and releasing the button before the predefined time interval has elapsed; and/or to unlock the device or initiate an unlock process. In an alternative embodiment, device 100 also may accept verbal input for activation or deactivation of some functions through microphone 113.

FIG. 3 is a block diagram of an exemplary multifunction device with a display and a touch-sensitive surface in accordance with some embodiments. Device 300 need not be portable. In some embodiments, device 300 is a laptop computer, a desktop computer, a tablet computer, a multimedia player device, a navigation device, an educational device (such as a child's learning toy), a gaming system, or a control device (e.g., a home or industrial controller). Device 300 typically includes one or more processing units (CPU's) 310, one or more network or other communications interfaces 360, memory 370, and one or more communication buses 320 for interconnecting these components. Communication buses 320 may include circuitry (sometimes called a chipset) that interconnects and controls communications between system components. Device 300 includes input/output (I/O) interface 330 comprising display 340, which is typically a touch screen display. I/O interface 330 also may include a keyboard and/or mouse (or other pointing device) 350 and touchpad 355. Memory 370 includes high-speed random access memory, such as DRAM, SRAM, DDR RAM or other random access solid state memory devices; and may include non-volatile memory, such as one or more magnetic disk storage devices, optical disk storage devices, flash memory devices, or other non-volatile solid state storage devices. Memory 370 may optionally include one or more storage devices remotely located from CPU(s) 310. In some embodiments, memory 370 stores programs, modules, and data structures analogous to the programs, modules, and data structures stored in memory 102 of portable multifunction device 100 (FIG. 1), or a subset thereof. Furthermore, memory 370 may store additional programs, modules, and data structures not present in memory 102 of portable multifunction device 100. For example, memory 370 of device 300 may store drawing module 380, presentation module 382, word processing module 384, website creation module 386, disk authoring module 388, and/or spreadsheet module 390, while memory 102 of portable multifunction device 100 (FIG. 1) may not store these modules.

Each of the above identified elements in FIG. 3 may be stored in one or more of the previously mentioned memory devices. Each of the above identified modules corresponds to a set of instructions for performing a function described above. The above identified modules or programs (i.e., sets of instructions) need not be implemented as separate software programs, procedures or modules, and thus various subsets of these modules may be combined or otherwise re-arranged in various embodiments. In some embodiments, memory 370 may store a subset of the modules and data structures identified above. Furthermore, memory 370 may store additional modules and data structures not described above.

Attention is now directed towards embodiments of user interfaces ("UI") that may be implemented on portable multifunction device 100.

Figure 4A:
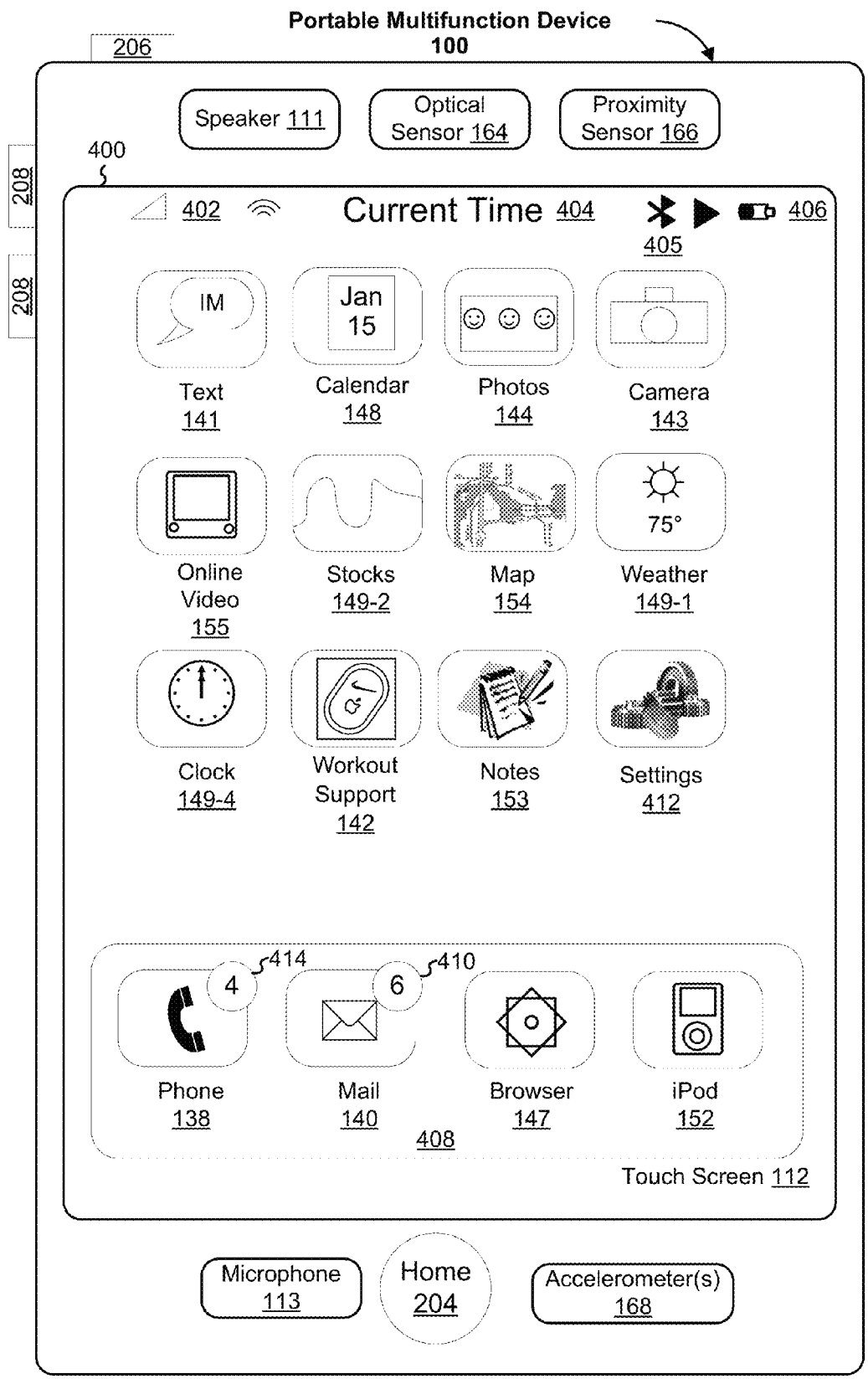
FIG. 4A illustrates an exemplary user interface for a menu of applications on a portable multifunction device in accordance with some embodiments.

FIG. 4A illustrates an exemplary user interface for a menu of applications on portable multifunction device 100 in accordance with some embodiments. Similar user interfaces may be implemented on device 300. In some embodiments, user interface 400 includes the following elements, or a subset or superset thereof:

Signal strength indicator(s) 402 for wireless communication(s), such as cellular and Wi-Fi signals;
Time 404;
Bluetooth indicator 405;
Battery status indicator 406;
Tray 408 with icons for frequently used applications, such as:
  Phone 138, which may include an indicator 414 of the number of missed calls or voicemail messages;
  E-mail client 140, which may include an indicator 410 of the number of unread e-mails;
  Browser 147; and
  Video and music player 152, also referred to as iPod (trademark of Apple Inc.) module 152; and
Icons for other applications, such as:
  IM 141;
  Image management 144;
  Camera 143;
  Weather 149-1;
  Stocks 149-2;
  Workout support 142;
  Calendar 148;
  Alarm clock 149-4;
  Map 154;
  Notes 153;
  Settings 412, which provides access to settings for device 100 and its various applications 136; and Online video module 155, also referred to as YouTube (trademark of Google Inc.) module 155.

Figure 4B:
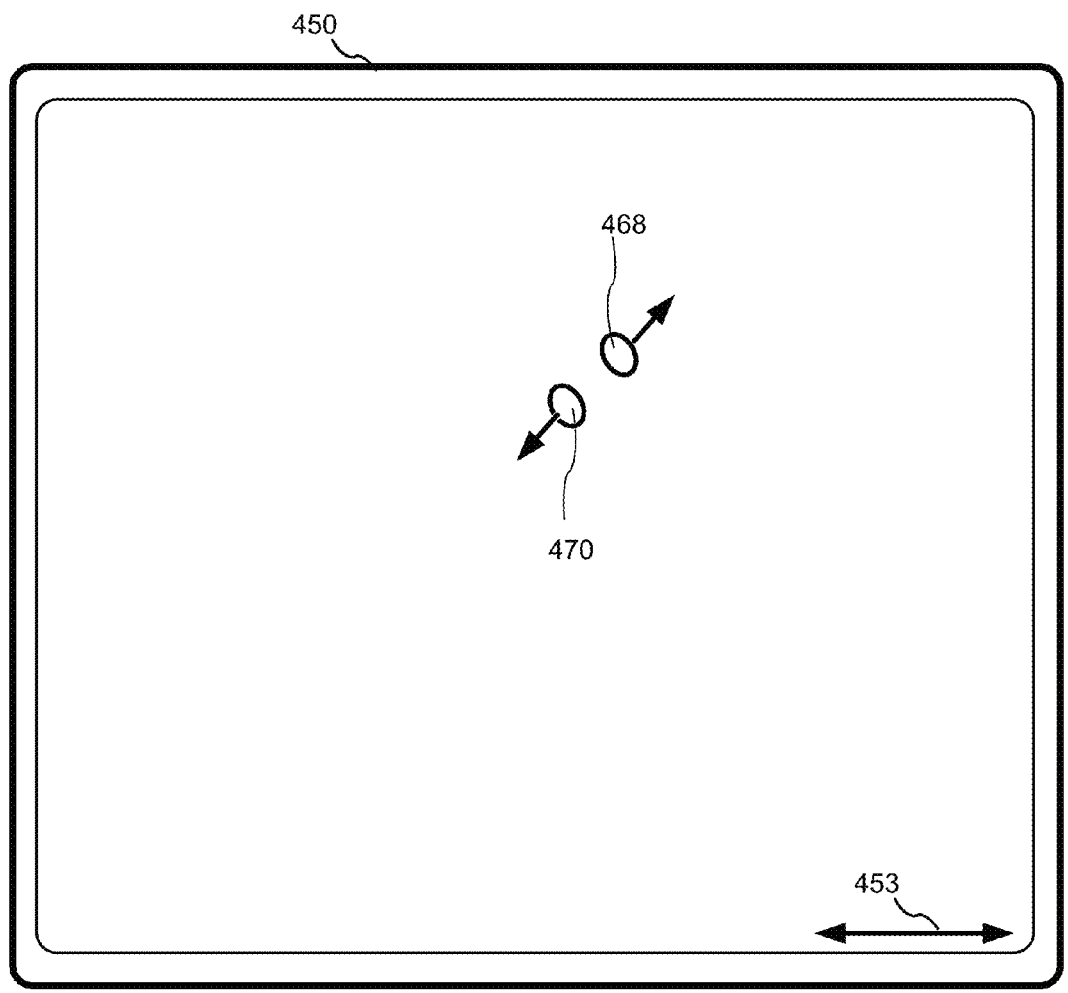
FIG. 4B illustrates an exemplary user interface for a multifunction device with a touch-sensitive surface that is separate from the display in accordance with some embodiments.
Figure 4B:
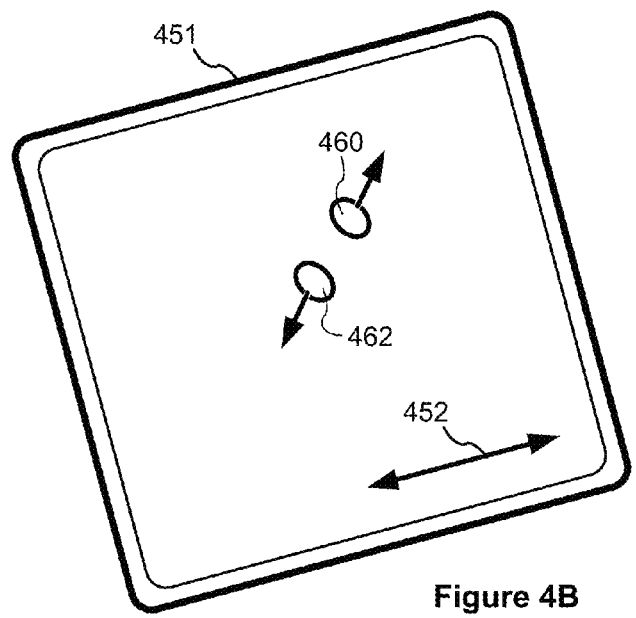

FIG. 4B illustrates an exemplary user interface on a device (e.g., device 300, FIG. 3) with a touch-sensitive surface 451 (e.g., a tablet or touchpad 355, FIG. 3) that is separate from the display 450 (e.g., touch screen display 112). Although many of the examples which follow will be given with reference to inputs on touch screen display 112 (where the touch sensitive surface and the display are combined), in some embodiments, the device detects inputs on a touch-sensitive surface that is separate from the display, as shown in FIG. 4B. In some embodiments the touch sensitive surface (e.g., 451 in FIG. 4B) has a primary axis (e.g., 452 in FIG. 4B) that corresponds to a primary axis (e.g., 453 in FIG. 4B) on the display (e.g., 450). In accordance with these embodiments, the device detects contacts (e.g., 460 and 462 in FIG. 4B) with the touch-sensitive surface 451 at locations that correspond to respective locations on the display (e.g., in FIG. 4B, 460 corresponds to 468 and 462 corresponds to 470). In this way, user inputs (e.g., contacts 460 and 462, and movements thereof) detected by the device on the touch-sensitive surface (e.g., 451 in FIG. 4B) are used by the device to manipulate the user interface on the display (e.g., 450 in FIG. 4B) of the multifunction device when the touch-sensitive surface is separate from the display. It should be understood that similar methods may be used for other user interfaces described herein.

User Interfaces and Associated Processes

Attention is now directed towards embodiments of user interfaces ("UI") and associated processes that may be implemented on an electronic device with a display and a touch-sensitive surface, such as device 300 or portable multifunction device 100.

As used in the specification and claims, the term "open application" refers to a software application with retained state information (e.g., as part of device/global internal state 157 and/or application internal state 192). An open application is any one of the following types of applications:

- an active application, which is currently displayed on display 112 (or a corresponding application view is currently displayed on the display);
- a background application (or background process), which is not currently displayed on display 112, but one or more application processes (e.g., instructions) for the corresponding application are being processed by one or more processors 120 (i.e., running);
- a suspended application, which is not currently running, and the application is stored in a volatile memory (e.g., DRAM, SRAM, DDR RAM, or other volatile random access solid state memory device of memory 102); and
- a hibernated application, which is not running, and the application is stored in a non-volatile memory (e.g., one or more magnetic disk storage devices, optical disk storage devices, flash memory devices, or other non-volatile solid state storage devices of memory 102).

As used herein, the term "closed application" refers to software applications without retained state information (e.g., state information for closed applications is not stored in a memory of the device). Accordingly, closing an application includes stopping and/or removing application processes for the application and removing state information for the application from the memory of the device. Generally, opening a second application while in a first application does not close the first application. When the second application is displayed and the first application ceases to be displayed, the first application, which was an active application when displayed, may become a background application, suspended application, or hibernated application, but the first application remains an open application while its state information is retained by the device.

FIGS. 5A-5X illustrate exemplary user interfaces for navigating through concurrently open applications in accordance with some embodiments. The user interfaces in these figures are used to illustrate the processes described below, including the processes in FIGS. 7A-7D.

FIG. 5A illustrates an exemplary user interface ("home screen" 502) displaying a plurality of application icons 5002 (e.g., 5002-25 through 38) on touch screen 112 of a portable electronic device (e.g., portable multifunction device 100). In FIG. 5A, a finger gesture can be used to launch an application. For example, a tap finger gesture at a location that corresponds to application icon 5002-36 initiates launching an email application.

Figure 5B:
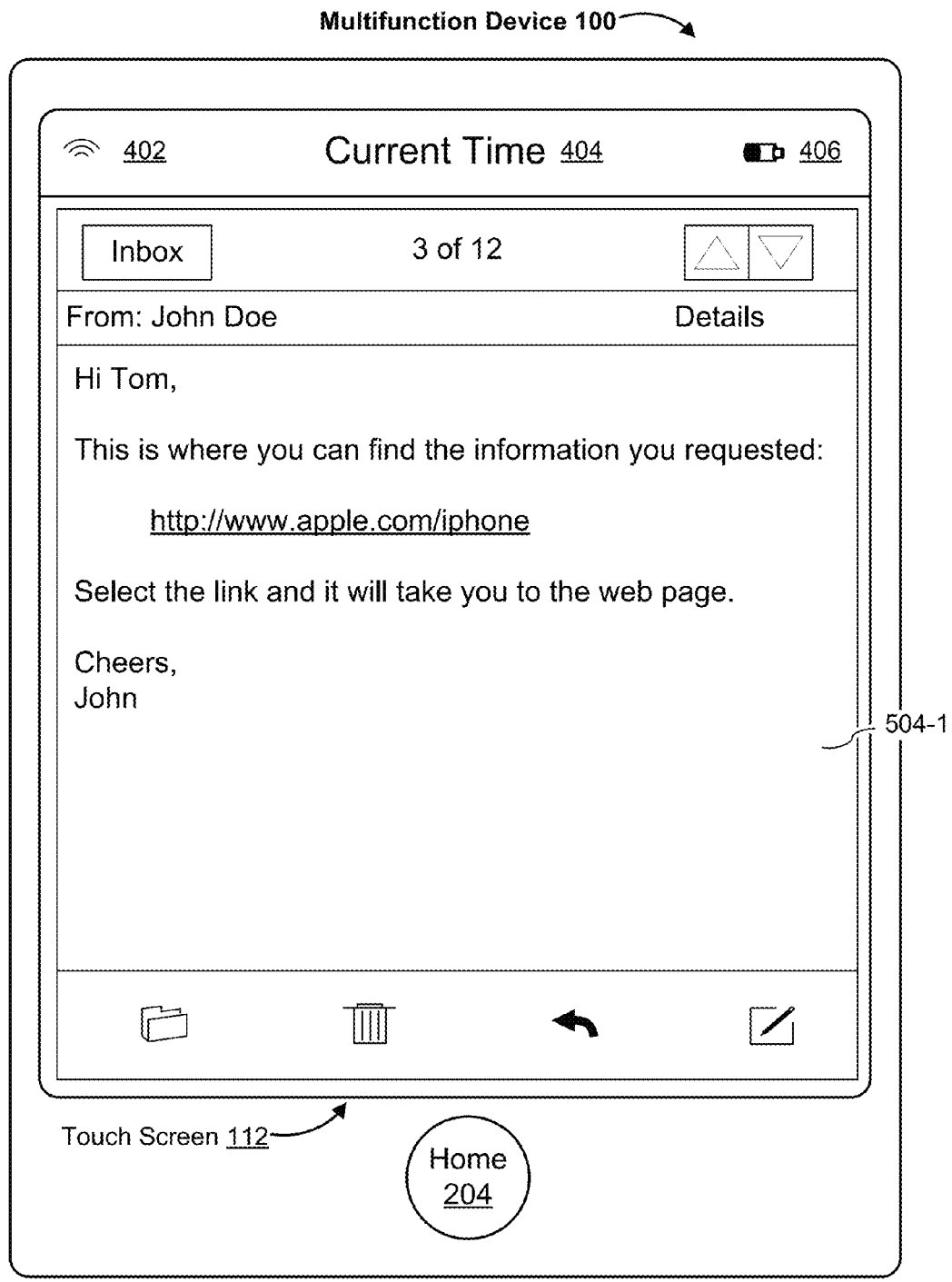

In FIG. 5B, in response to detecting the finger gesture on application icon 5002-36, the email application is launched and email application view 504-1 is displayed on touch screen 112. A predetermined sequence of open applications includes the email application as shown in the following exemplary sequences (the square brackets in an exemplary sequence indicate that an application view corresponding to the square-bracketed application is displayed):

| Exemplary Sequence #1 | |
| --- | --- |
| 1 | [email application] |

A user may launch other applications in a similar manner. For example, a user may press home button 204 from any application view to return to home screen 502 (FIG. 5A), and launch other applications with finger gestures on respective application icons 5002 on home screen 502. FIGS. 5C-5G illustrate that respective applications are sequentially launched in response to detecting respective finger gestures at locations corresponding to respective application icons 5002 on home screen 502, and that respective user interfaces (i.e., respective application views) are displayed in turn.

Figure 5C:
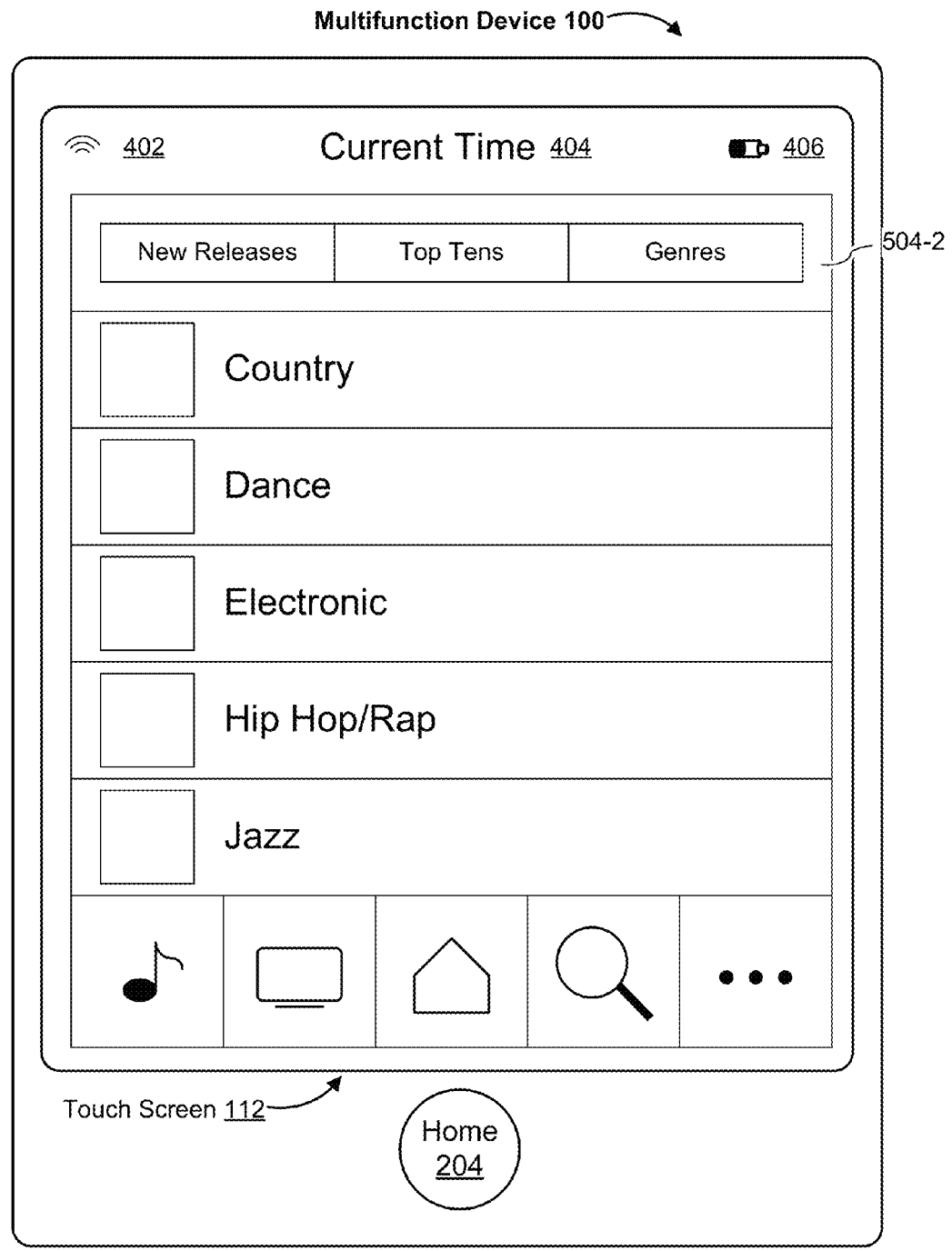

In particular, FIG. 5C illustrates that media store application view 504-2 is displayed in response to a finger gesture on application icon 5002-32. The predetermined sequence of open applications then includes the media store application (e.g., iTunes):

| Exemplary Sequence #2 | |
| --- | --- |
| 1 | [media store application] |
| 2 | email application |

Figure 5D:
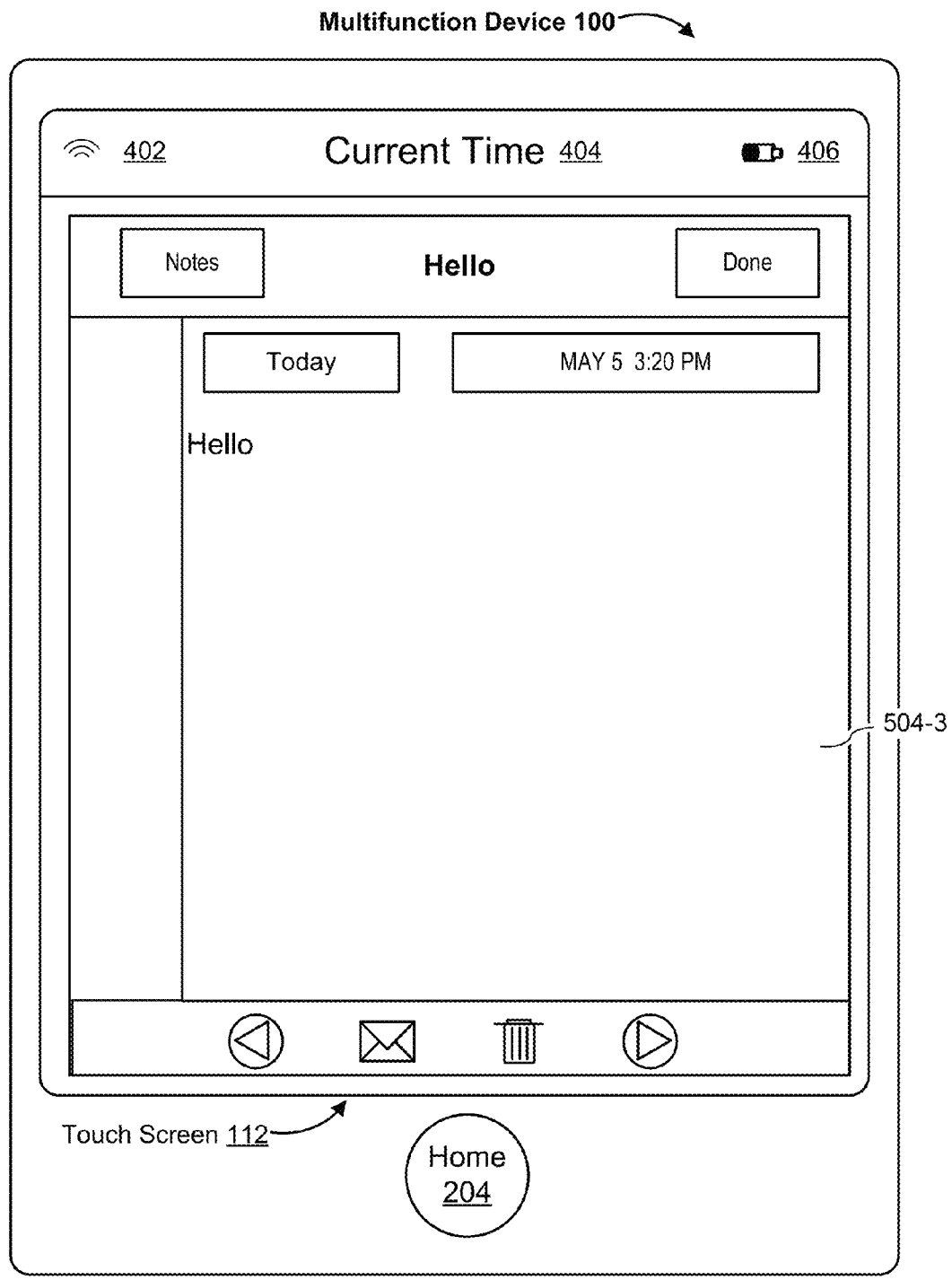

In FIG. 5D, notes application view 504-3 is displayed in response to a finger gesture on application icon 5002-30. The predetermined sequence of open applications then includes the notes application:

| Exemplary Sequence #3 | |
| --- | --- |
| 1 | [notes application] |
| 2 | media store application |
| 3 | email application |

Figure 5E:
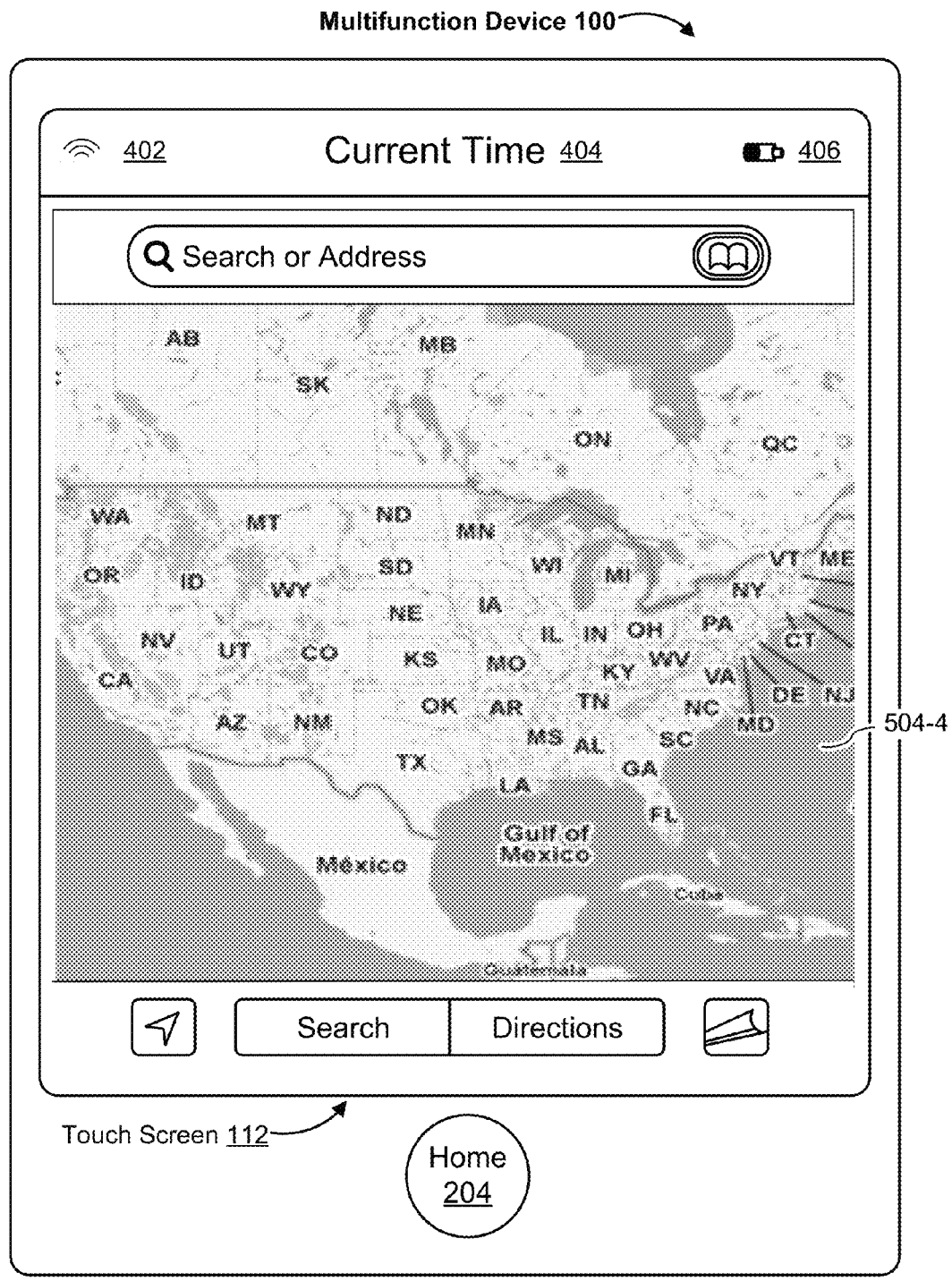

FIG. 5E illustrates that map application view 504-4 is displayed in response to a finger gesture on application icon 5002-27. The predetermined sequence of open applications then includes the map application:

| Exemplary Sequence #4 | |
|---|---|
| 1 | [map application] |
| 2 | notes application |
| 3 | media store application |
| 4 | email application |

Figure 5F:
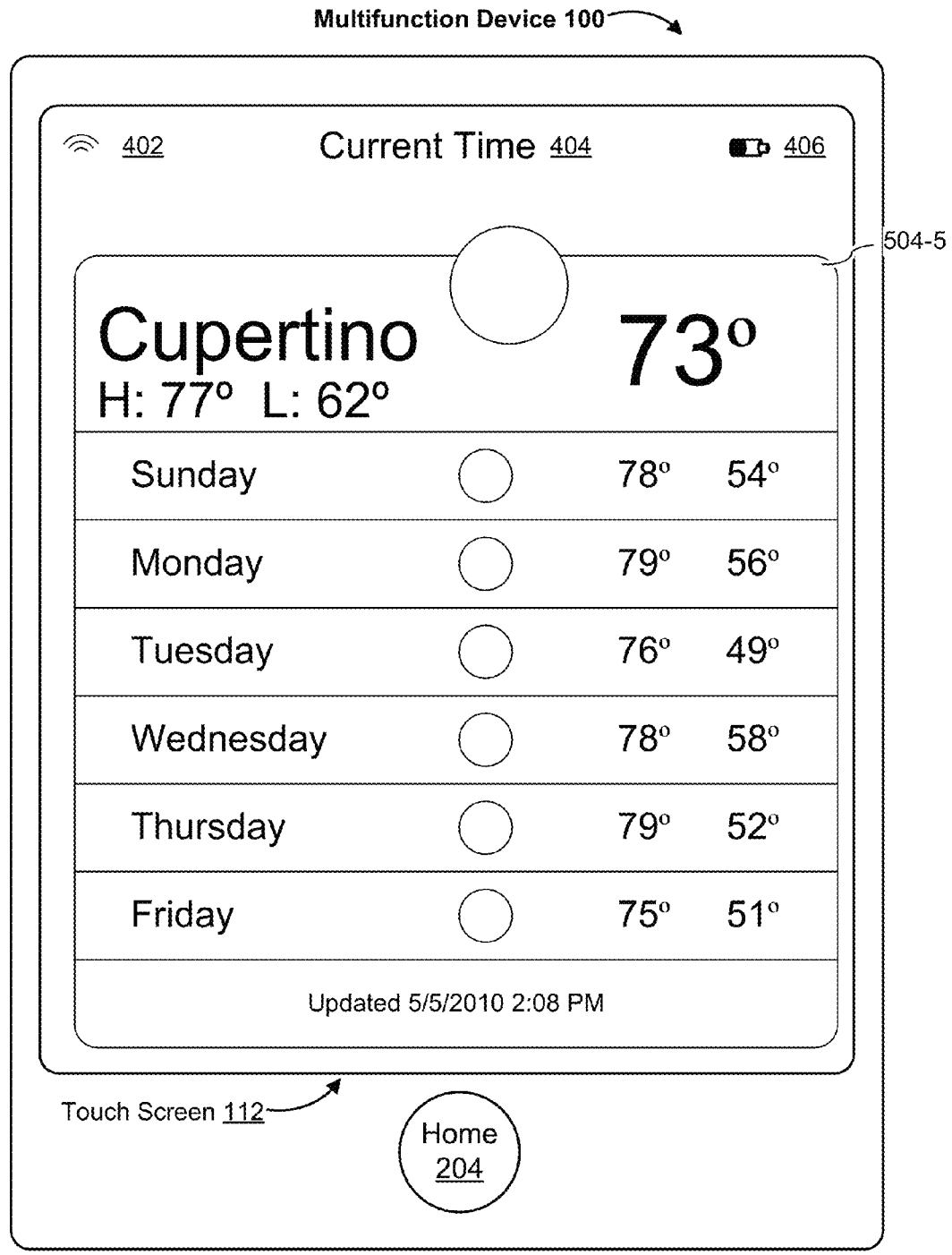

In FIG. 5F, weather application view 504-5 is displayed in response to a finger gesture on application icon 5002-28. The predetermined sequence of open applications then includes the weather application:

| Exemplary Sequence #5 | |
|---|---|
| 1 | [weather application] |
| 2 | map application |
| 3 | notes application |
| 4 | media store application |
| 5 | email application |

Figure 5G:
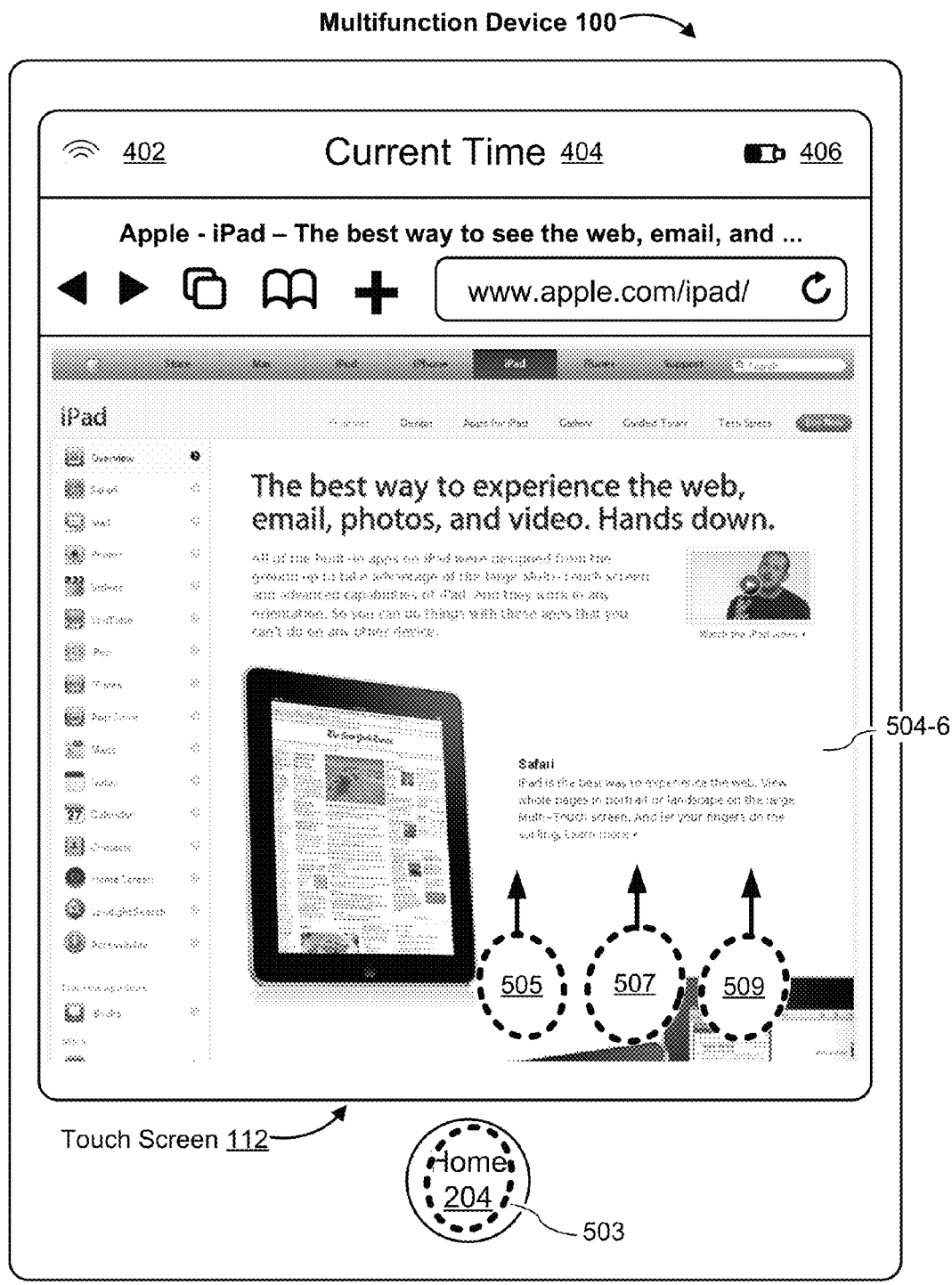

FIG. 5G illustrates that web browser application view 504-6 is displayed in response to a finger gesture on application icon 5002-37. The predetermined sequence of open applications then includes the web browser application:

| Exemplary Sequence #6 | |
|---|---|
| 1 | [web browser application] |
| 2 | weather application |
| 3 | map application |
| 4 | notes application |
| 5 | media store application |
| 6 | email application |

Exemplary sequence #6 corresponds to the launching of an email application, a media store application, a notes application, a map application, a weather application, and a web browser application in the sequence described above (FIGS. 5B-5G).

In FIG. 5G, a first predefined input (e.g., a double-click 503 on home button 204) is detected. Alternatively, a multi-finger swipe gesture (e.g., a three-finger swipe-up gesture as illustrated with movements of finger contacts 505, 507, and 509) is detected on touch screen 112.

Figure 5H:
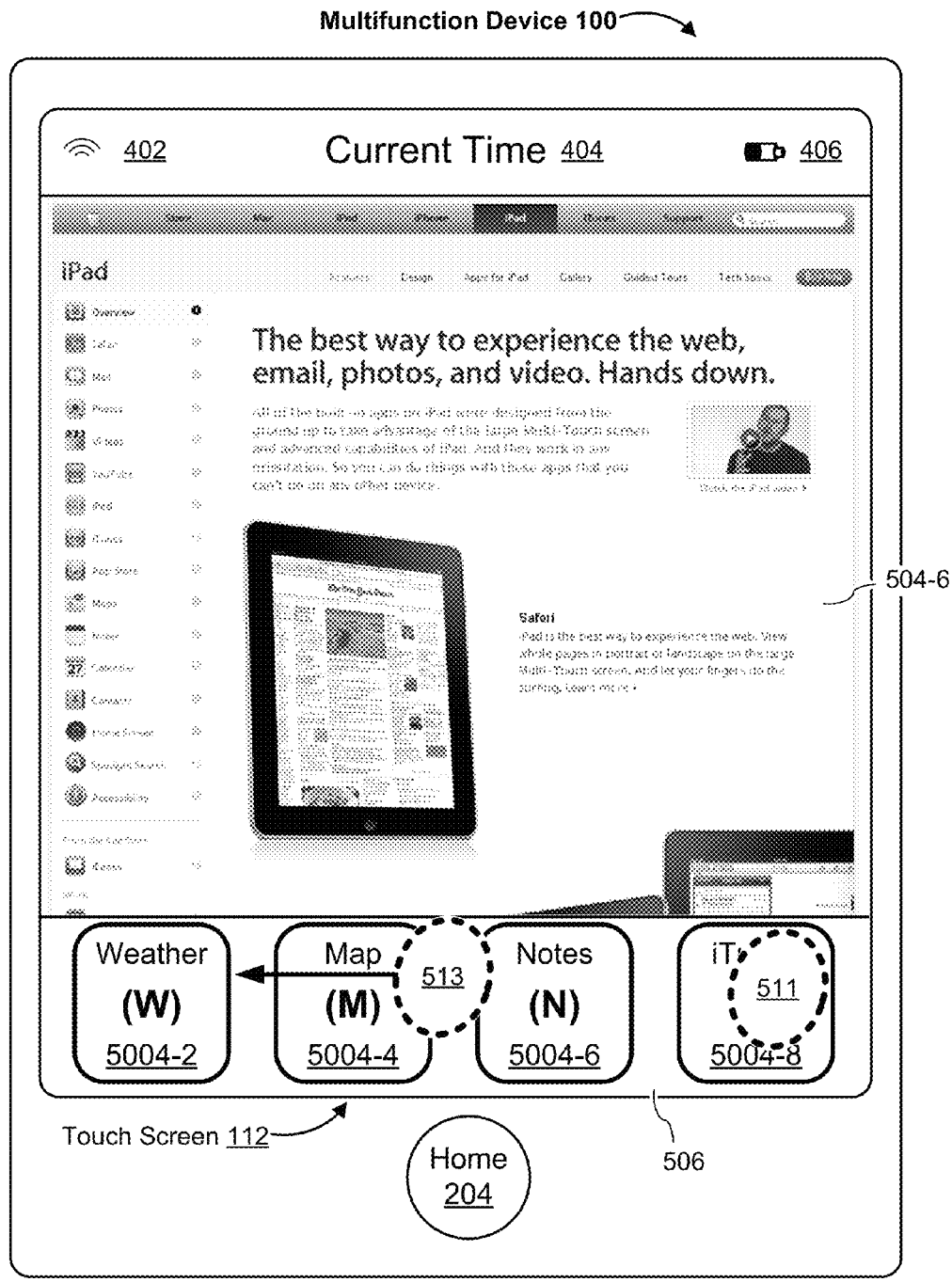

FIG. 5H illustrates that, in response to detecting the first predefined input (e.g., double-click 503 or the multi-finger swipe gesture including finger contacts 505, 507, and 509), a portion of web browser application view 504-6 and application icon area 506 are concurrently displayed. In some embodiments, in response to detecting the first predefined input, the device enters into an application view selection mode for selecting one of the concurrently open applications, and the portion of web browser application view 504-6 and application icon area 506 are concurrently displayed as part of the application view selection mode. Application icon area 506 includes a group of open application icons that correspond to at least some of the plurality of concurrently open applications. In this example, the portable electronic device has multiple applications that are concurrently open (e.g., the email application, the media store application, the notes application, the map application, the weather application, and the web browser application), although they are not all simultaneously displayed. As illustrated in FIG. 5H, application icon area 506 includes application icons (e.g., 5004-2, 5004-4, 5004-6, and 5004-8) for the weather application, the map application, the notes application, and the media store application (i.e., four applications that immediately follow the currently displayed application, the web browser application, in the predetermined sequence of open applications (exemplary sequence #6 above)). The applications for which the application icons are displayed in application icon area 506 are underlined in the following:

| Exemplary Sequence #7 | |
|---|---|
| 1 | [web browser application] |
| 2 | weather application |
| 3 | map application |
| 4 | notes application |
| 5 | media store application |
| 6 | email application |

It is noted that the sequence or order of open application icons displayed in application icon area 506 corresponds to the sequence of open applications in the predetermined sequence (e.g., weather, map, notes, and media store applications).

FIG. 5H also illustrates a gesture 511 (e.g., a tap gesture) detected on open application icon 5004-8. In some embodiments, in response to detecting gesture 511, a corresponding application view is displayed (e.g., media store application view 504-2, FIG. 5C).

Figure 5I:
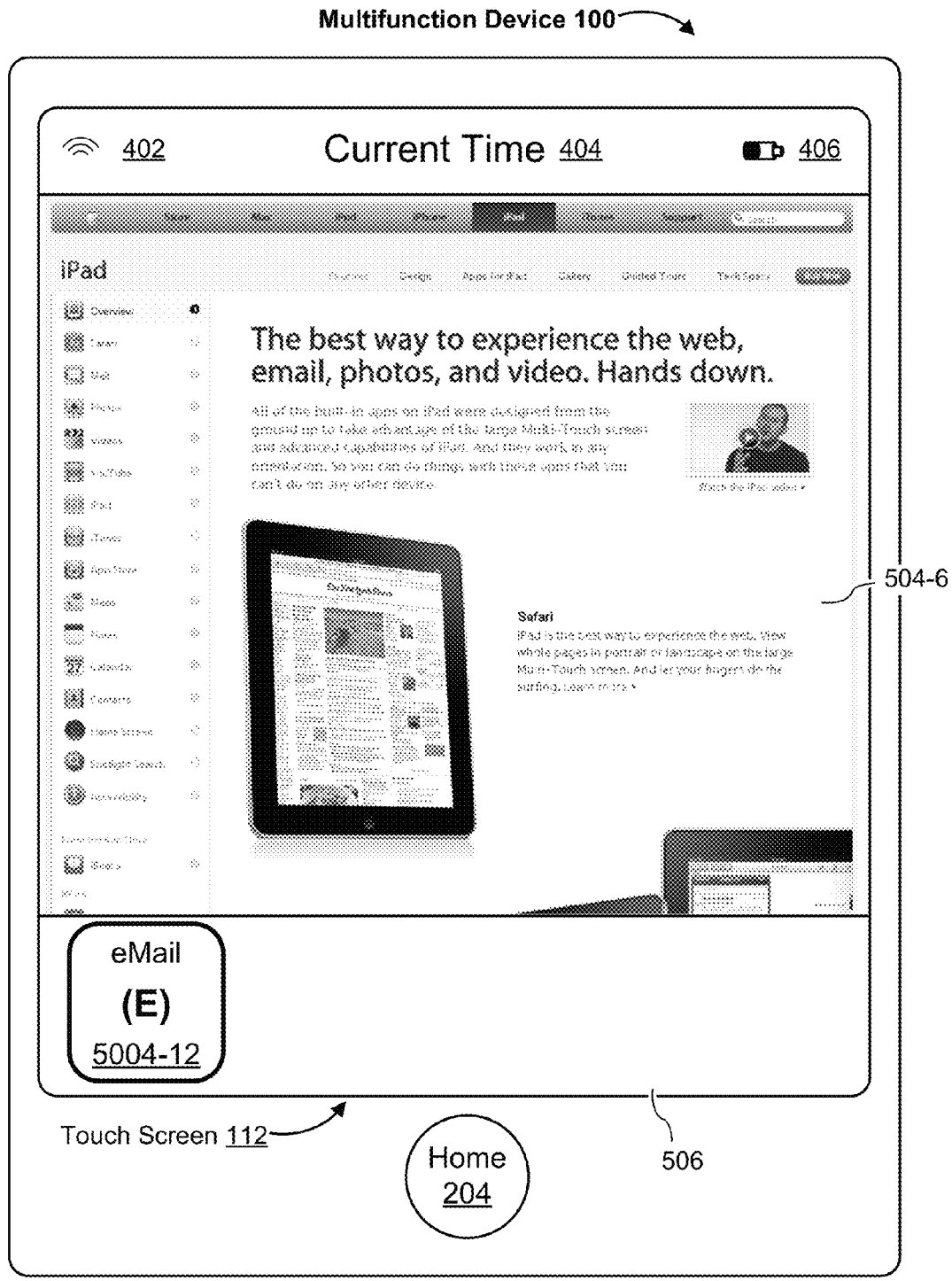

FIG. 5H also illustrates a left-swipe gesture 513 detected at a location corresponding to application icon area 506. In FIG. 5I, in response to detecting left-swipe gesture 513, the application icons (e.g., 5004-2, 5004-4, 5004-6, and 5004-8) in application icon area 506 are scrolled. As a result of scrolling, application icon 5004-12 for the email application is displayed in application icon area 506 instead of previously displayed application icons (e.g., 5004-2, 5004-4, 5004-6, and 5004-8). The predetermined sequence of open applications is then as follows:

| Exemplary Sequence #8 | |
|---|---|
| 1 | [web browser application] |
| 2 | weather application |
| 3 | map application |
| 4 | notes application |
| 5 | media store application |
| 6 | email application |

Figure 5J:
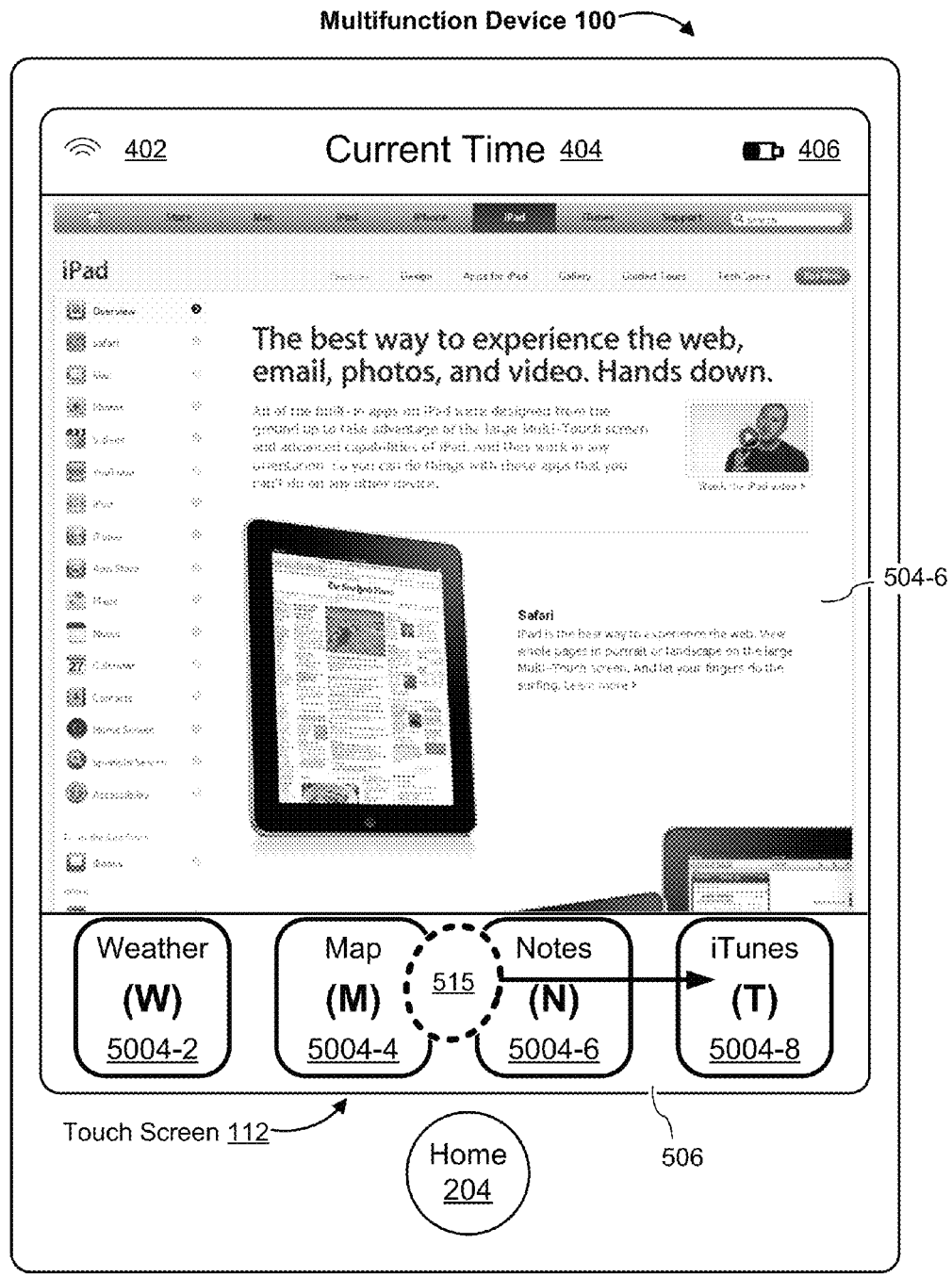
Figure 5K:
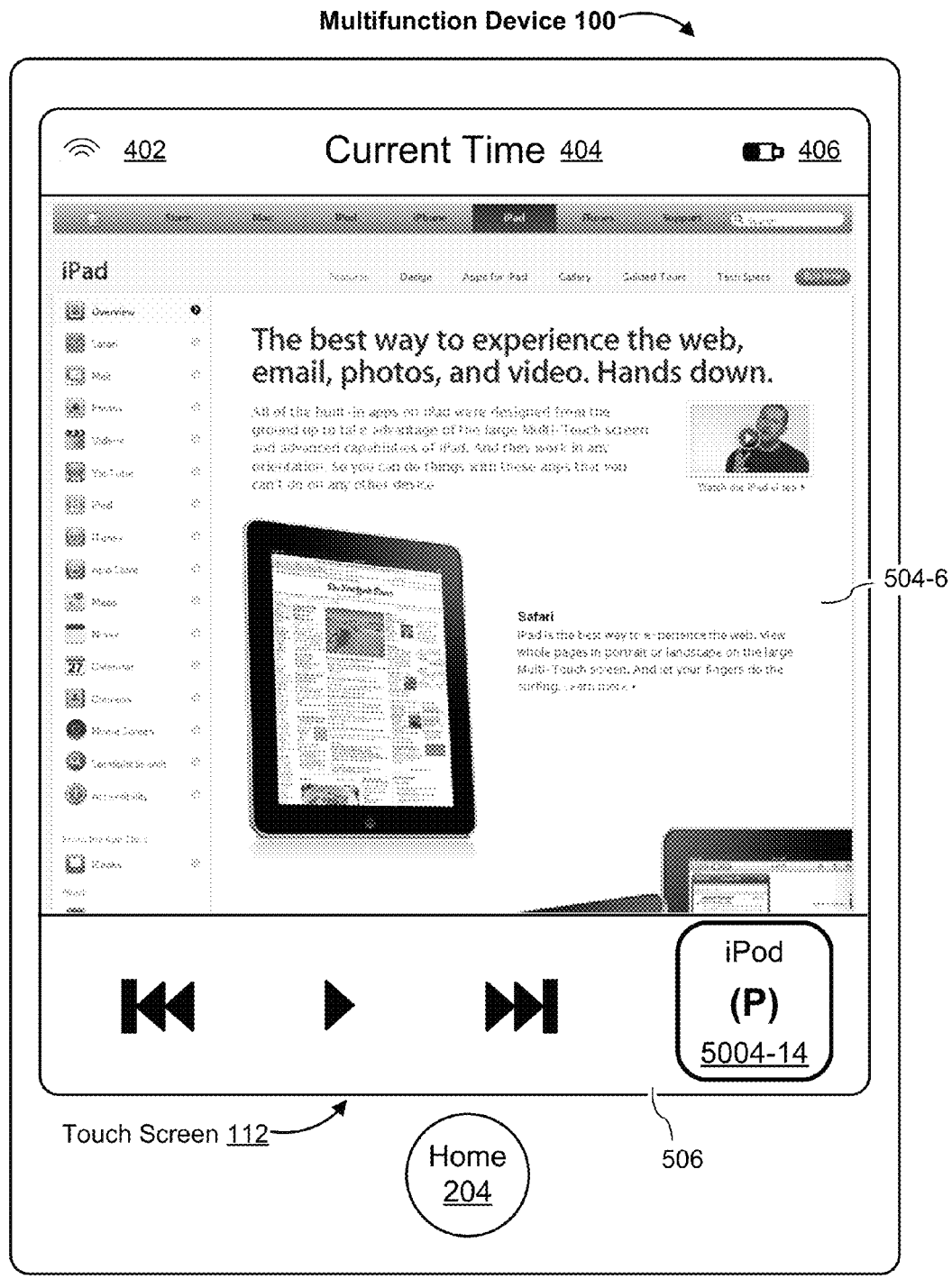

FIGS. 5J-5K illustrate exemplary user interfaces displayed in accordance with some embodiments. FIG. 5J illustrates that a right-swipe gesture 515 is detected at a location corresponding to application icon area 506. In response to detecting right-swipe gesture 515, the application icons (e.g., 5004-2, 5004-4, 5004-6, and 5004-8) in application icon area 506 are scrolled. In some embodiments, as a result of scrolling, application icon 5004-14 for a music application is displayed in application icon area 506 (FIG. 5K) instead of previously displayed application icons (e.g., 5004-2, 5004-4, 5004-6, and 5004-8). In addition, music control user interface objects (e.g., go to beginning of a track, play/pause toggle, and go to next track icons) are displayed in application icon area 506 (FIG. 5K). In some other embodiments, in response to detecting right-swipe gesture 515, application icon 5004-12 for the email application is displayed in application icon area 506, as illustrated in FIG. 5I.

Figure 5L:
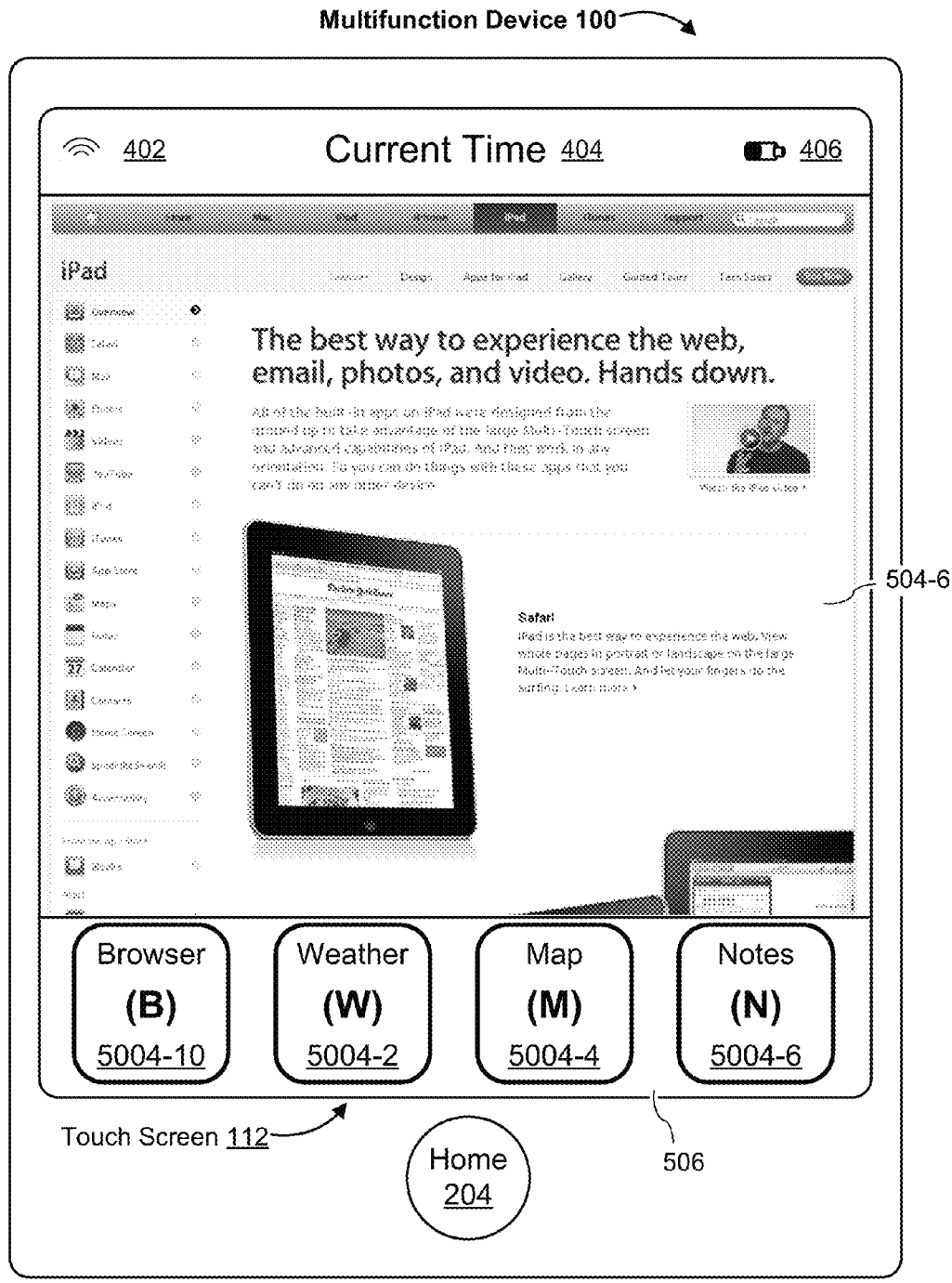

FIG. 5L illustrate an alternative user interface displayed in response to the first predefined input (e.g., a double-click 503 on home button 204 or the multi-finger swipe gesture including finger contacts 505, 507, and 509, FIG. 5G). Instead of displaying application icons for a predefined number of applications immediately following the currently displayed application in the predetermined sequence of open applications (as shown in FIG. 5H), application icons for a predefined number of applications, including the currently displayed application and applications immediately following the currently displayed application in the predetermined sequence of open applications, are displayed (e.g., web browser application icon 5004-10, weather application icon 5004-2, map application icon 5004-4, and notes application icon 5004-6). The predetermined sequence of open applications is as follows:

| Exemplary Sequence #9 | |
| --- | --- |
| 1 | [web browser application] |
| 2 | weather application |
| 3 | map application |
| 4 | notes application |
| 5 | media store application |
| 6 | email application |

Figure 5M:
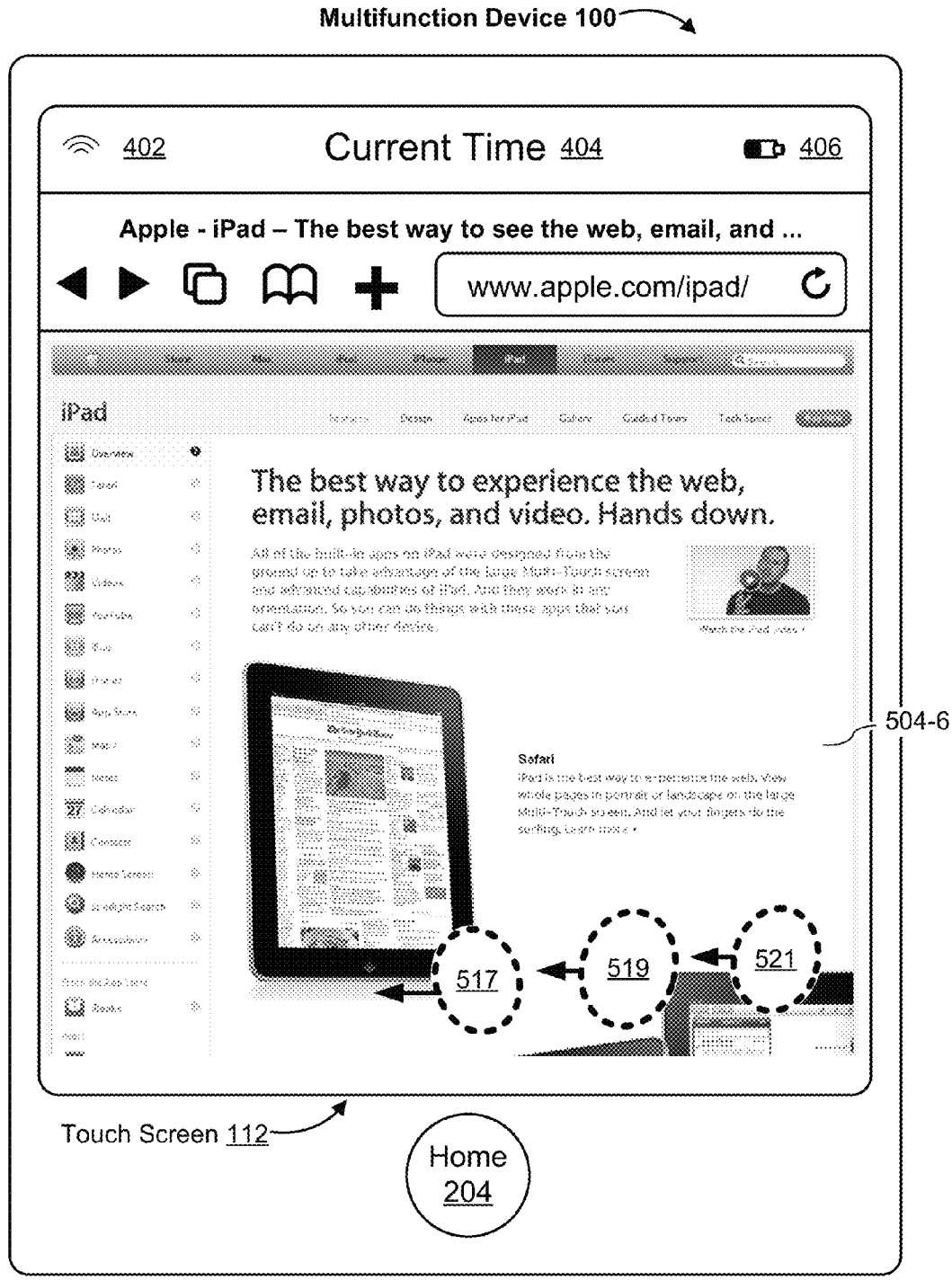
Figure 5N:
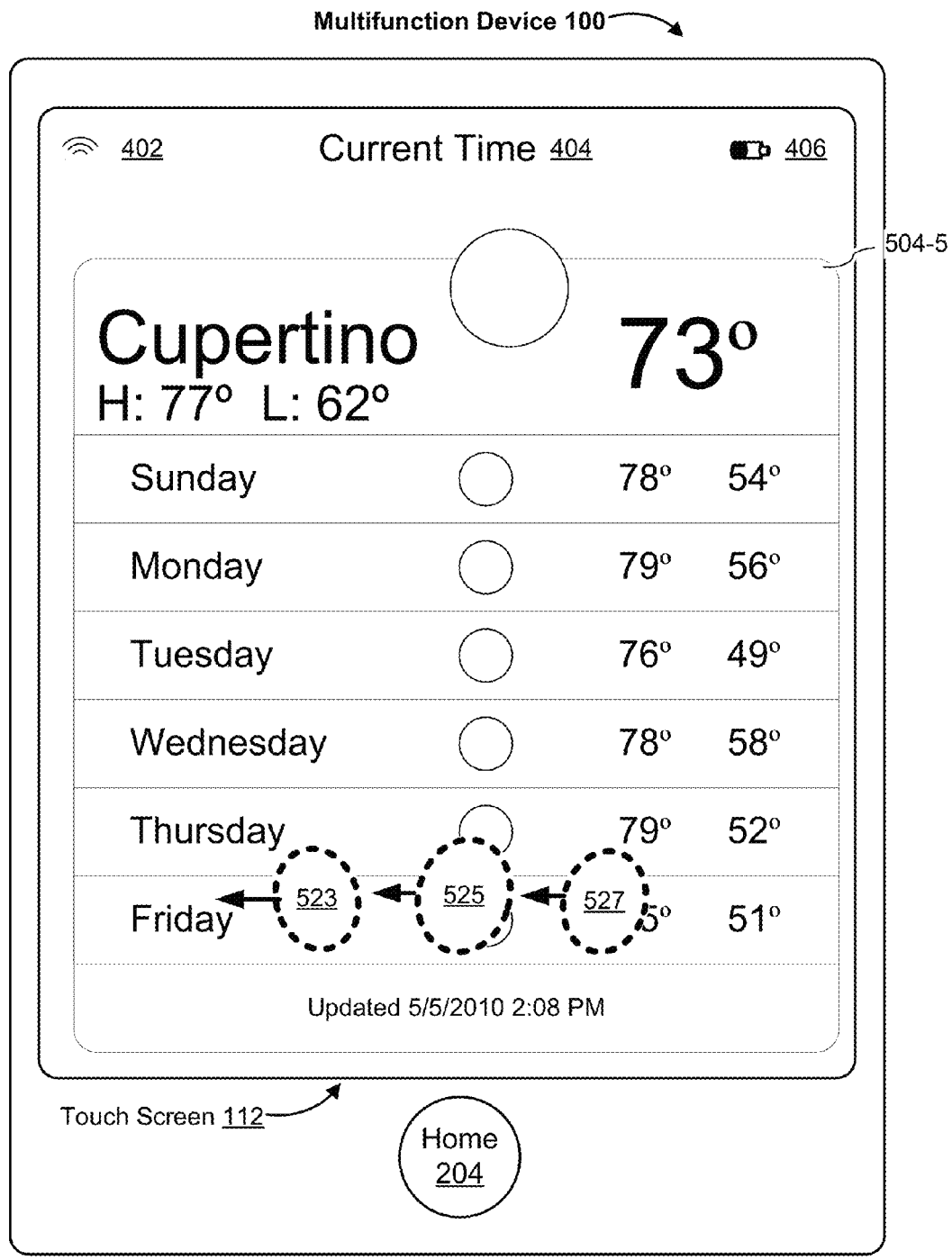

In FIG. 5M, a gesture of a first type (also called a first gesture type) (e.g., a multi-finger left-swipe gesture including movements of finger contacts 517, 519, and 521) is detected on web browser application view 504-6. FIG. 5N illustrates that, in response to detecting the gesture of the first type, weather application view 504-5 is displayed on touch screen 112. The predetermined sequence of open applications is then as follows:

| Exemplary Sequence #10 | |
| --- | --- |
| 1 | web browser application |
| 2 | [weather application] |
| 3 | map application |
| 4 | notes application |
| 5 | media store application |
| 6 | email application |

Figure 5O:
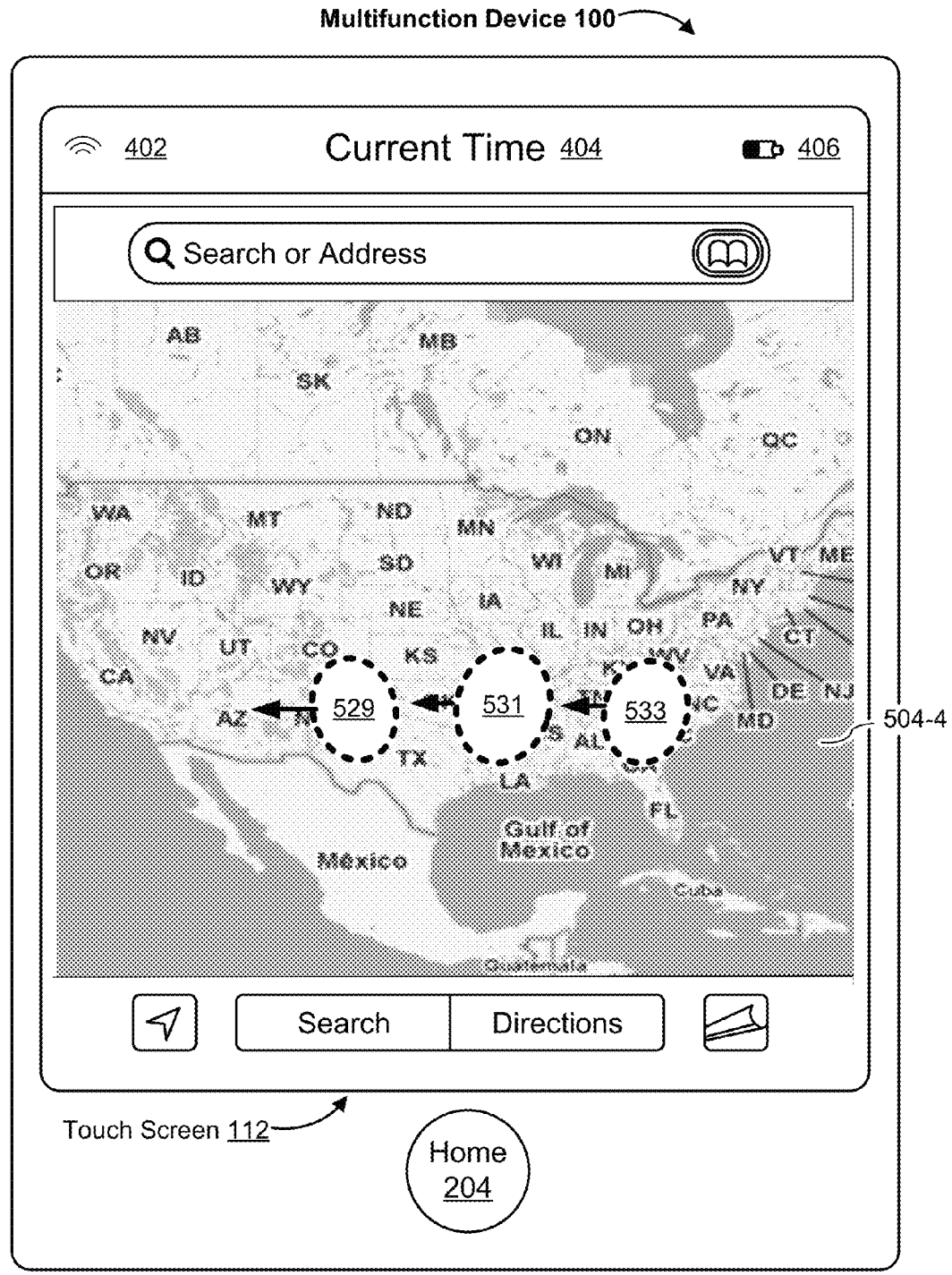

FIG. 5N also illustrates that a second gesture of the first type (e.g., a multi-finger left-swipe gesture including movements of finger contacts 523, 525, and 527) is detected on weather application view 504-5. FIG. 5O illustrates that, in response to detecting the second gesture of the first type, map application view 504-4 is displayed on touch screen 112. The predetermined sequence of open applications is then as follows:

| Exemplary Sequence #11 | |
| --- | --- |
| 1 | web browser application |
| 2 | weather application |
| 3 | [map application] |
| 4 | notes application |
| 5 | media store application |
| 6 | email application |

Figure 5P:
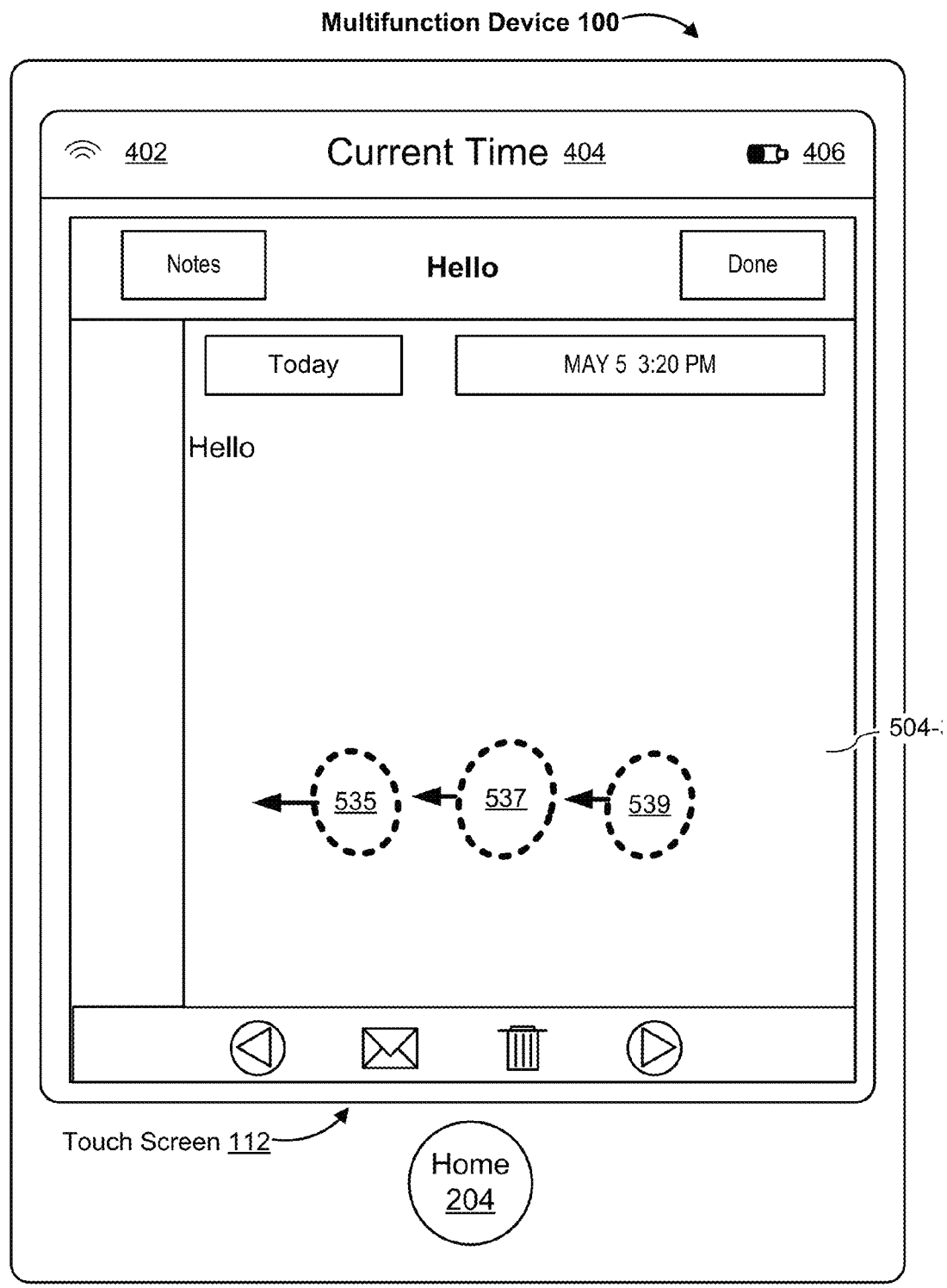

FIG. 5O also illustrates that a third gesture of the first type (e.g., a multi-finger left-swipe gesture including movements of finger contacts 529, 531, and 533) is detected on map application view 504-4. FIG. 5P illustrates that, in response to detecting the third gesture of the first type, notes application view 504-3 is displayed on touch screen 112. The predetermined sequence of open applications is then as follows:

| Exemplary Sequence #12 | |
| --- | --- |
| 1 | web browser application |
| 2 | weather application |
| 3 | map application |
| 4 | [notes application] |
| 5 | media store application |
| 6 | email application |

Figure 5Q:
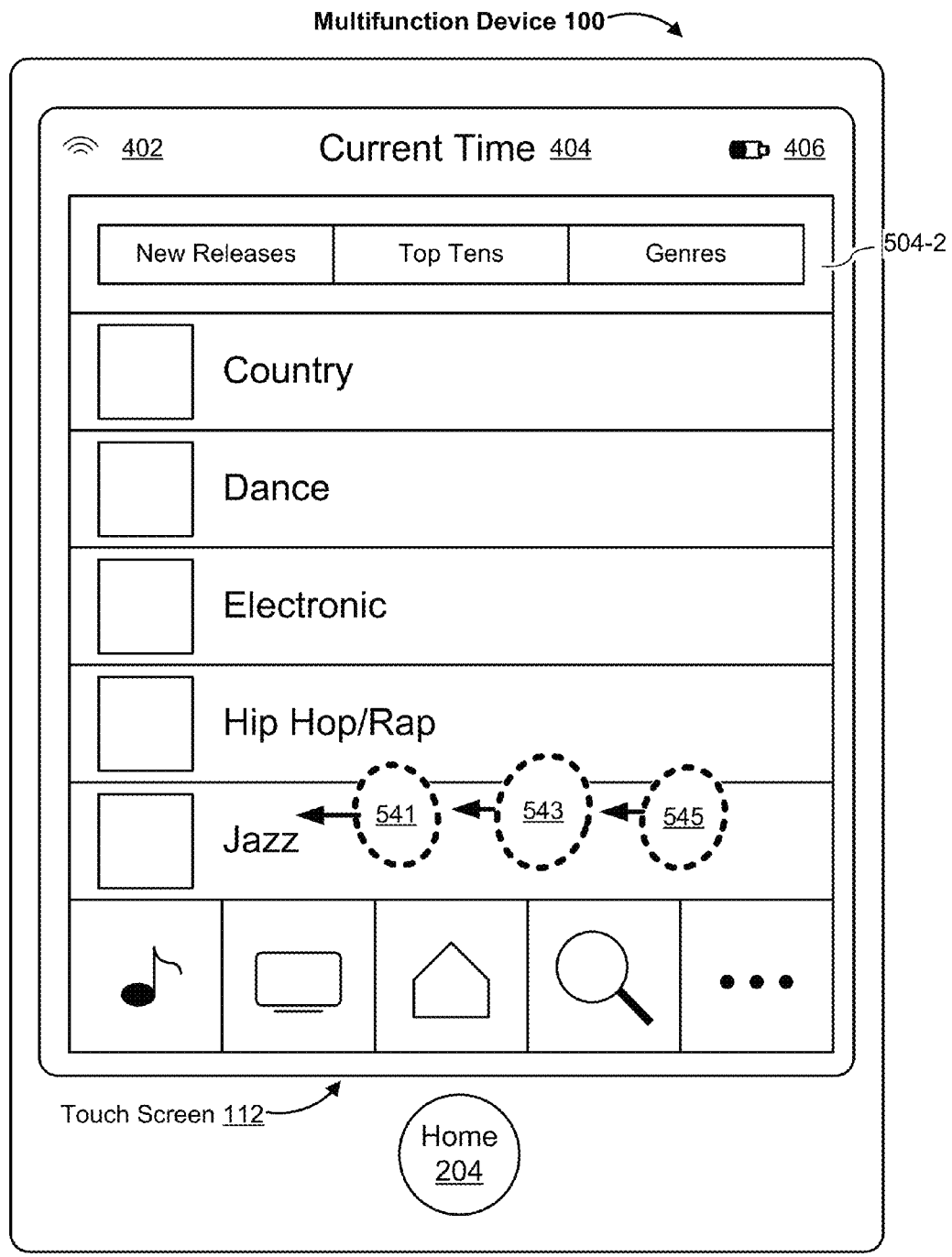

FIG. 5P also illustrates that a fourth gesture of the first type (e.g., a multi-finger left-swipe gesture including movements of finger contacts 535, 537, and 539) is detected on notes application view 504-3. FIG. 5Q illustrates that, in response to detecting the fourth gesture of the first type, media store application view 504-2 is displayed on touch screen 112. The predetermined sequence of open applications is then as follows:

| Exemplary Sequence #13 | |
| --- | --- |
| 1 | web browser application |
| 2 | weather application |
| 3 | map application |
| 4 | notes application |
| 5 | [media store application] |
| 6 | email application |

Figure 5R:
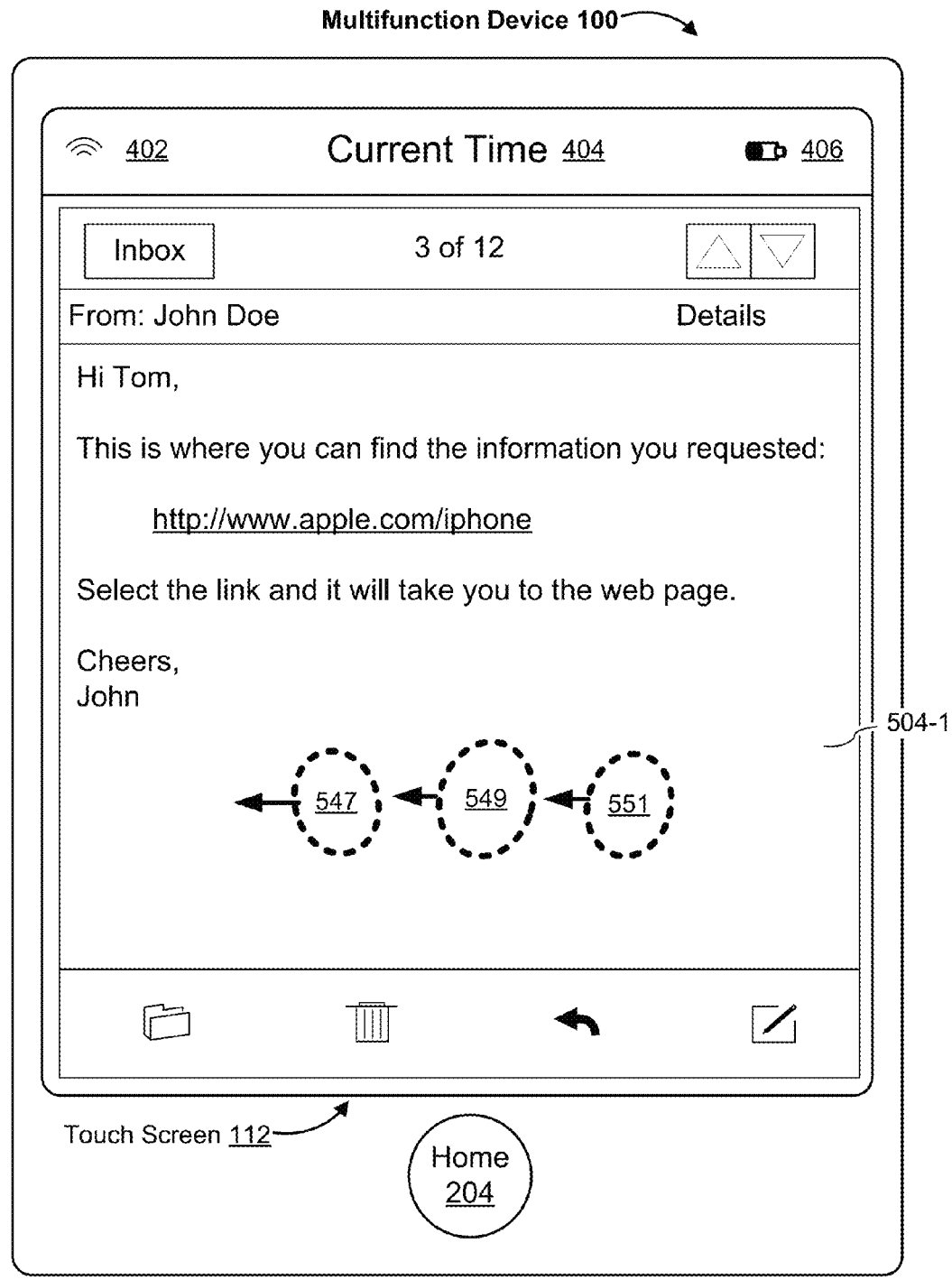

FIG. 5Q also illustrates that a fifth gesture of the first type (e.g., a multi-finger left-swipe gesture including movements of finger contacts 541, 543, and 545) is detected on media store application view 504-2. FIG. 5R illustrates that, in response to detecting the fifth gesture of the first type, email application view 504-1 is displayed on touch screen 112. The predetermined sequence of open applications is then as follows:

| Exemplary Sequence #14 | |
| --- | --- |
| 1 | web browser application |
| 2 | weather application |
| 3 | map application |
| 4 | notes application |
| 5 | media store application |
| 6 | [email application] |

Figure 5S:
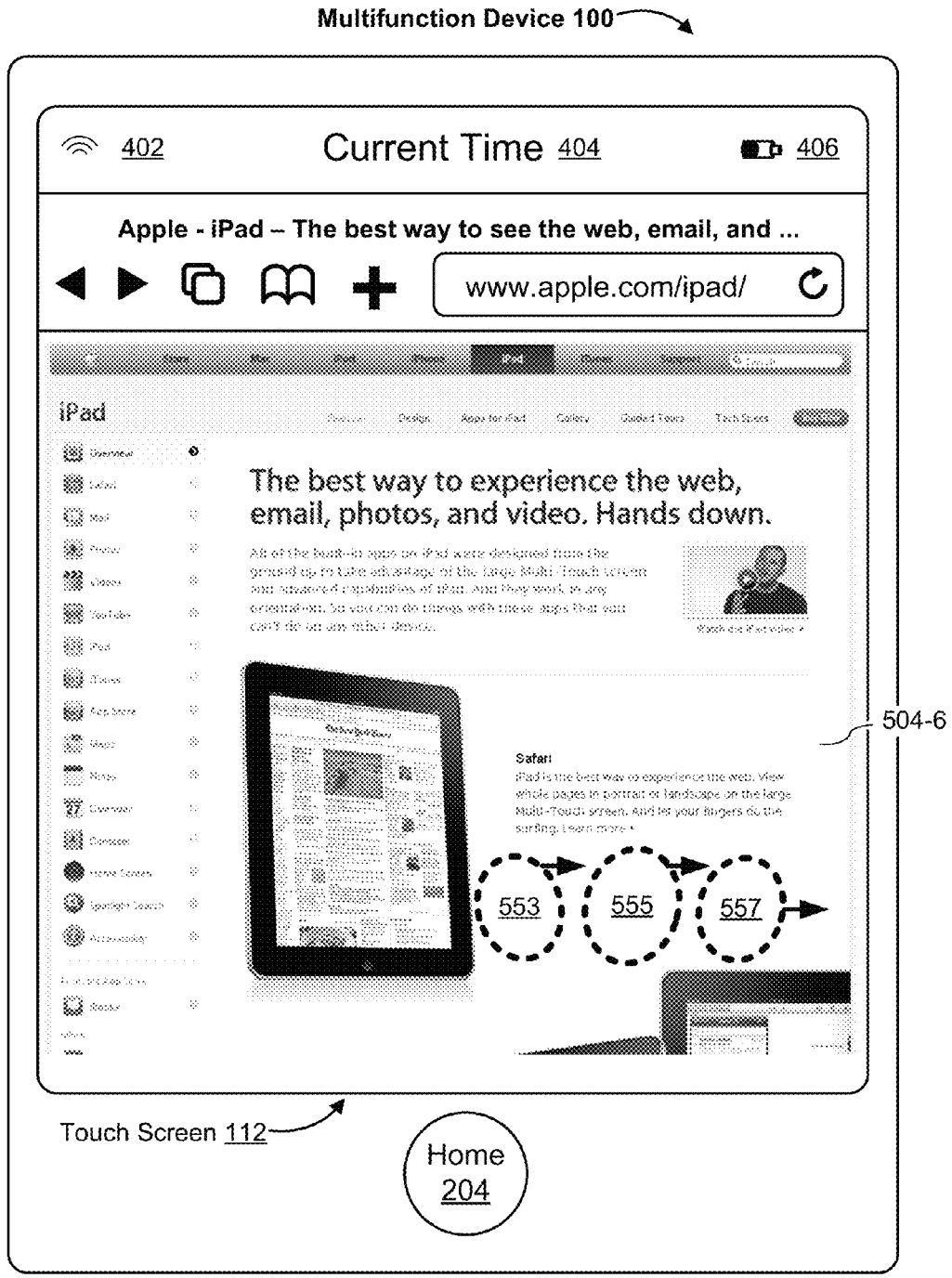
Figure 5T:
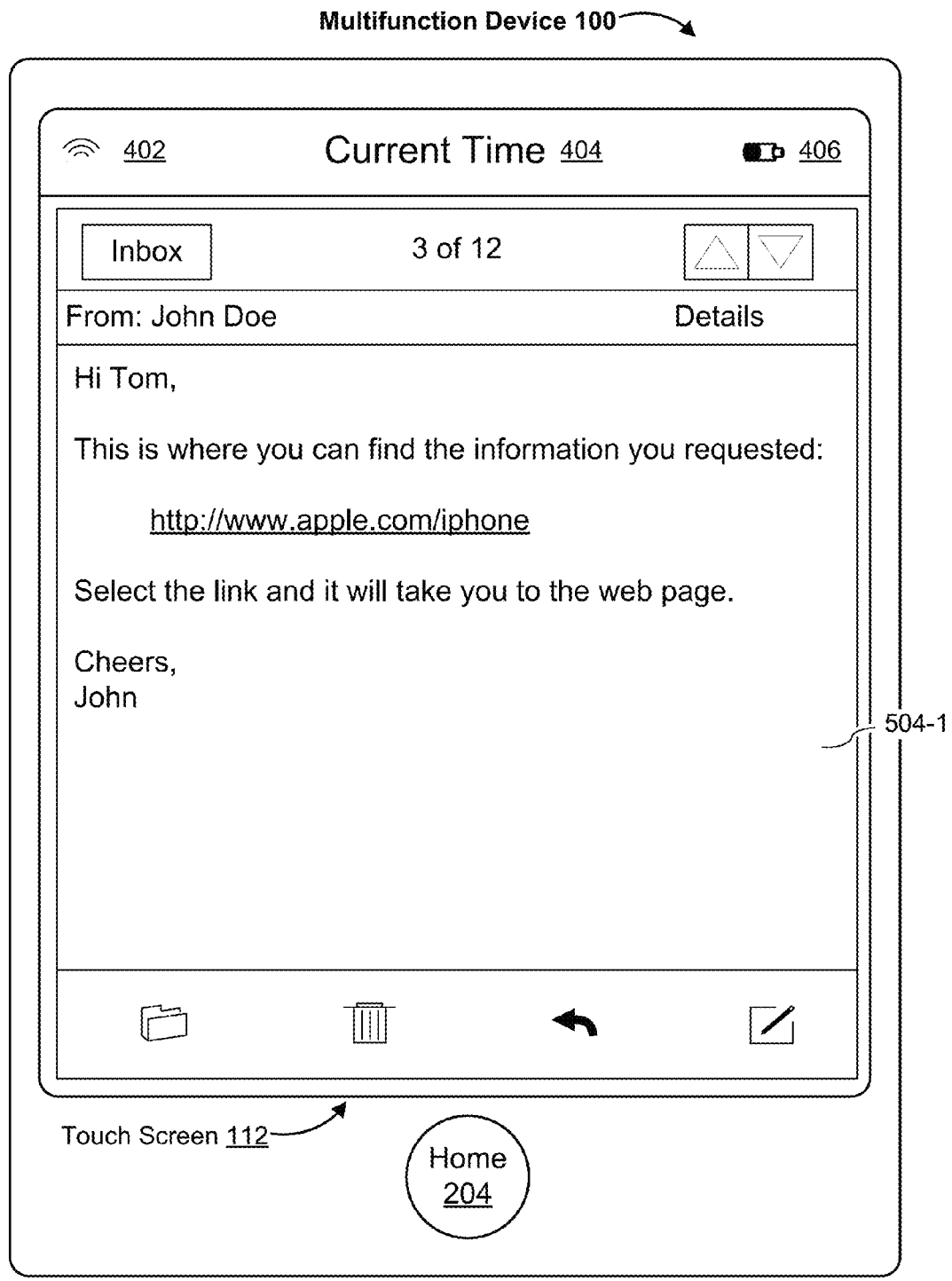

FIG. 5R also illustrates that a sixth gesture of the first type (e.g., a multi-finger left-swipe gesture including movements of finger contacts 547, 549, and 551) is detected on email application view 504-1. FIG. 5S illustrates that, in some embodiments, in response to detecting the sixth gesture of the first type, web browser application view 504-6 is displayed on touch screen 112. The predetermined sequence of open applications is then as follows:

| Exemplary Sequence #15 (identical to Exemplary Sequence #6) | |
| --- | --- |
| 1 | [web browser application] |
| 2 | weather application |
| 3 | map application |
| 4 | notes application |
| 5 | media store application |
| 6 | email application |

FIG. 5S also illustrates that a gesture of a second type (also called a second gesture type) (e.g., a multi-finger right-swipe gesture including movements of finger contacts 553, 555, and 557) is detected on web browser application view 504-6. FIG.

5T illustrates that, in some embodiments, in response to detecting the gesture of the second type, email application view 504-1 is displayed on touch screen 112.

| Exemplary Sequence #16 (identical to Exemplary Sequence 14) | |
|---|---|
| 1 | web browser application |
| 2 | weather application |
| 3 | map application |
| 4 | notes application |
| 5 | media store application |
| 6 | [email application] |

Figure 5U:
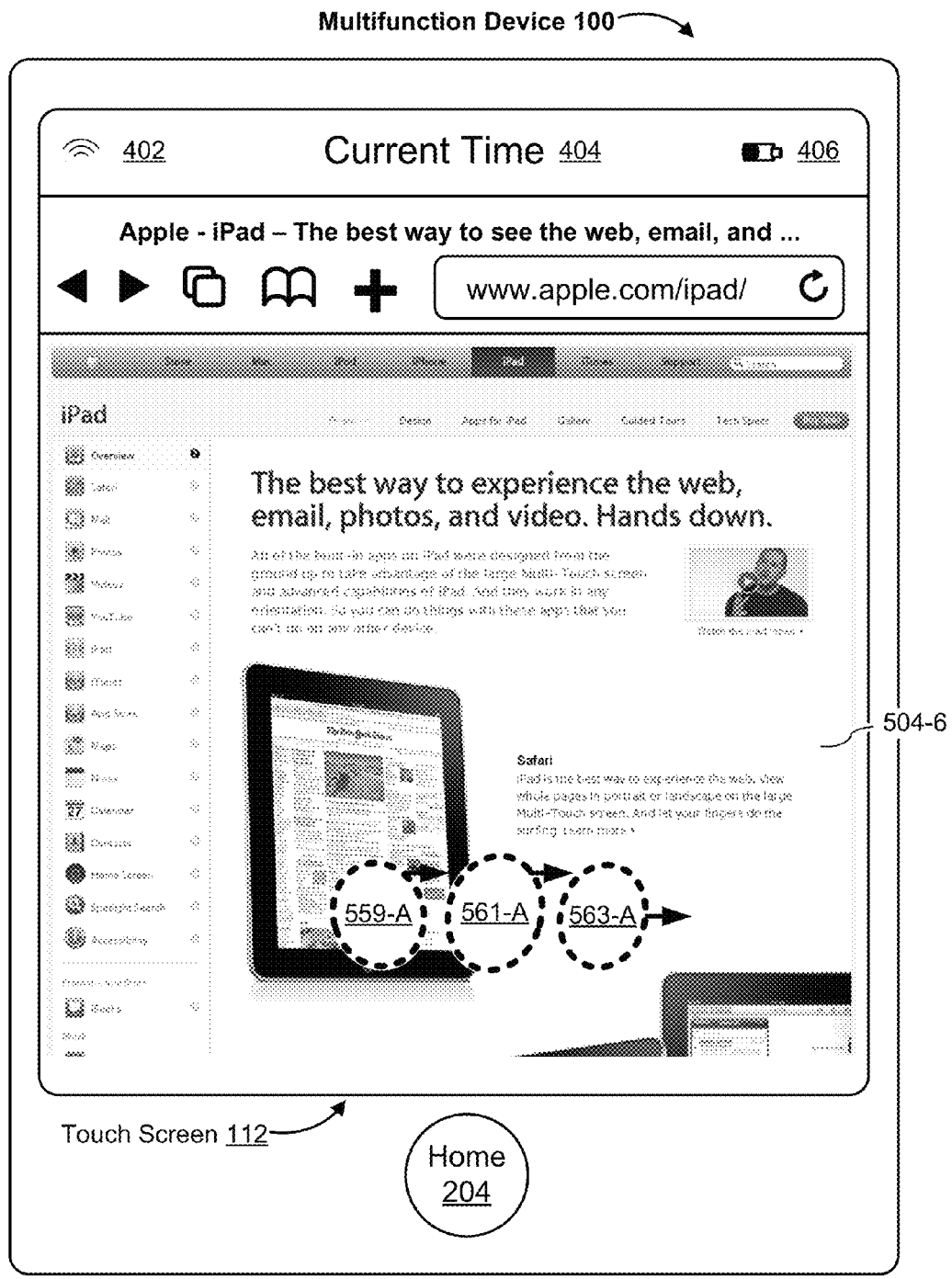
Figure 5V:
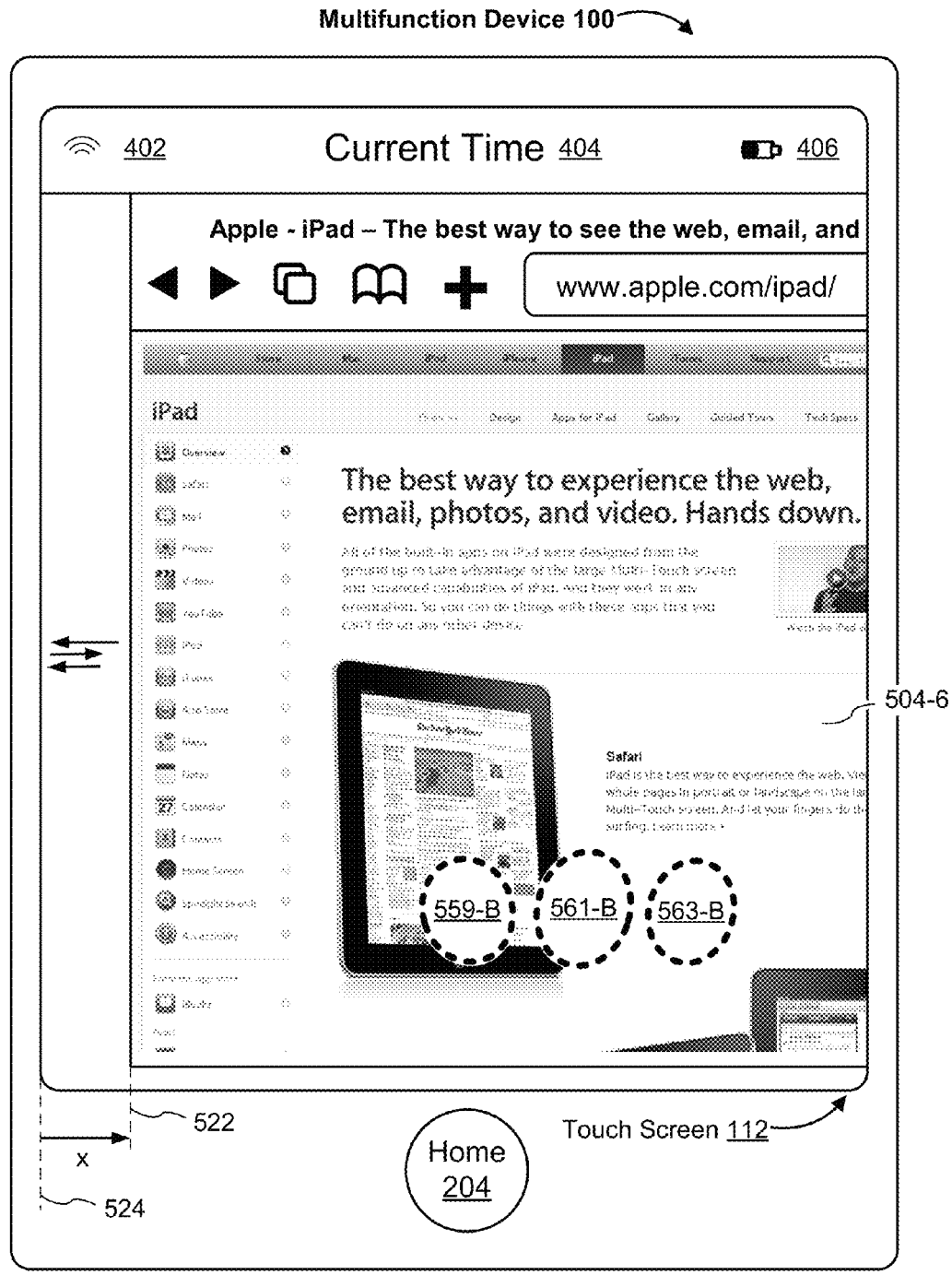

FIGS. 5U-5V illustrate exemplary user interfaces displayed in accordance with some embodiments. In FIG. 5U, a gesture of the second type (e.g., a multi-finger right-swipe gesture including movements of finger contacts 559, 561, and 563) is detected over web browser application view 504-6. It is noted that the web browser application is the first application in the predetermined sequence of open applications. FIG. 5V illustrates that, in response to detecting the gesture of the second type, web browser application view 504-6 is moved from its first (original) position (e.g., 524) to second position 522 that is determined in accordance with the gesture of the second type. As illustrated, when web browser application view 504-6 is at the second position, at least a portion of web browser application view 504-6 (e.g., the right side of web browser application view 504-6) is not displayed on touch screen 112. When the gesture of the second type is no longer detected on touch screen 122, web browser application view 504-6 is moved in a damped vibration motion with respect to the first (original) position.

In some embodiments, the damped vibration motion is described as a function of a distance between location 522 of an application view (e.g., web browser application view 504-6) and the first position 524 (FIG. 5V). As described herein, the distance between location 522 of the application view and the first position 524 is sometimes called a distance variable "x." When the value of the variable x is zero, the application view is located at the first position. In some embodiments, the variable x is a function of time. In some embodiments, web browser application view 504-6 is moved in a damped vibration motion until a predefined oscillation condition is satisfied (e.g., a magnitude of the oscillation is less than a predefined threshold or a predefined number of oscillations has occurred).

FIG. 6 illustrates an exemplary function representing a damped vibration motion in accordance with some embodiments. As illustrated, a value of the distance variable x changes over time, and ranges from a positive value (above the zero-line) to a negative value (below the zero-line). In the example described above, when the distance variable x has a positive value, the application view is located on the right side of first position 524, and when the distance variable x has a negative value, a portion of the application view is located on the left side of first position 524. The application view is located at the second position when the gesture ceases to be detected. In response to ceasing to detect the gesture, the application view moves toward the first position, reaches the first position (at 602) and passes the first position. Then the application view changes the direction and moves toward the first position, and repeats the back and forth oscillation in a similar manner. It is noted that the magnitude of oscillation decreases over time (and thus is called a damped vibration motion). In some embodiments, when the magnitude of oscillation is less than a predefined threshold (e.g., at 604), the oscillation terminates, and the application view is displayed without oscillation at the first position (x=0).

Figure 5W:
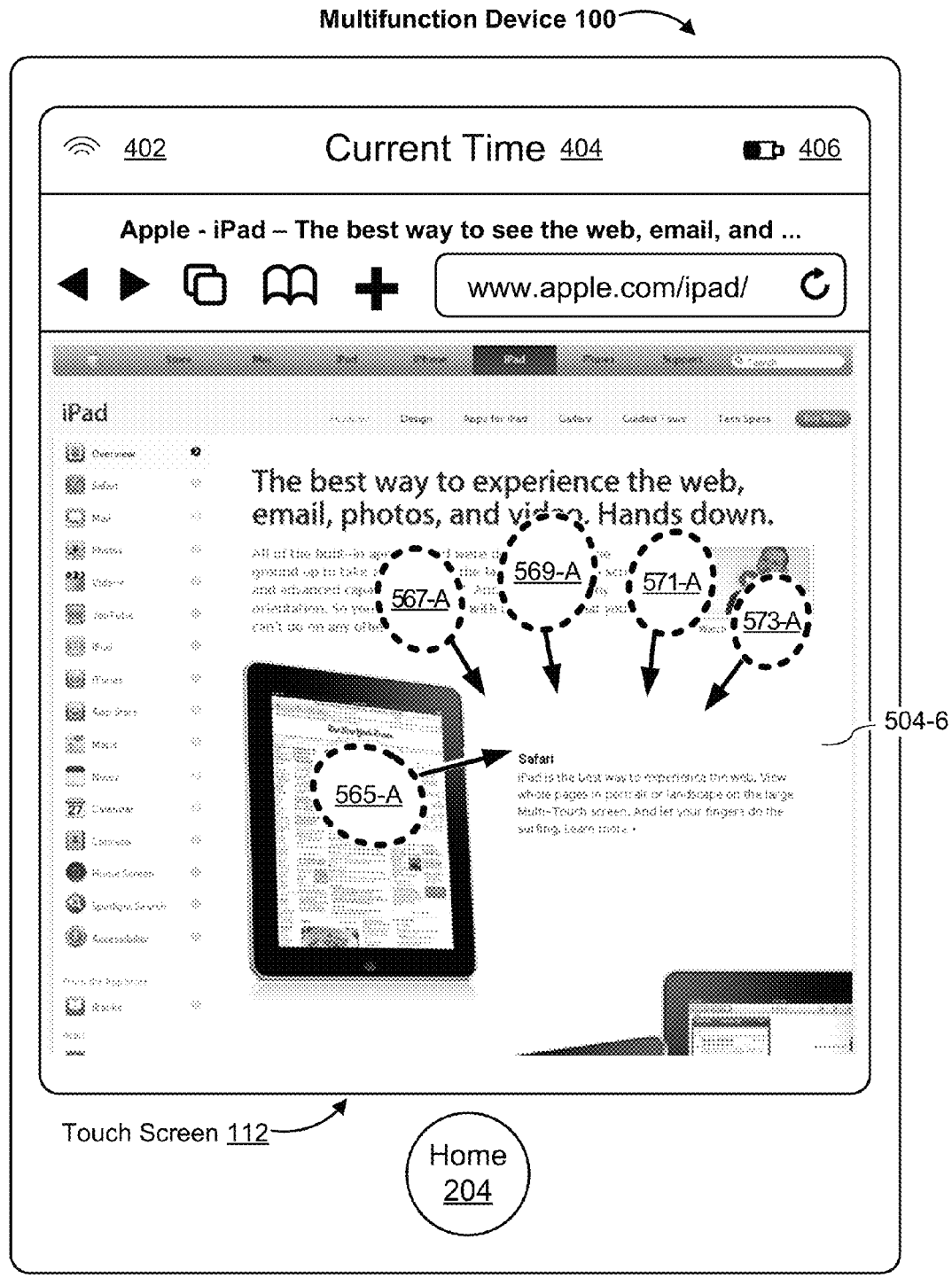

Referring to FIG. 5W, a multi-finger gesture (e.g., a five-finger pinch gesture including movements of finger contacts 565, 567, 569, 571, and 573) is detected on web browser application view 504-6. FIG. 5X illustrates that, while detecting the multi-finger gesture on touch screen 112, web browser application view 504-6 and at least a portion of home screen 502 are concurrently displayed. As illustrated, web browser application view 504-6 is displayed at a reduced scale. The reduced scale is adjusted in accordance with the multi-finger gesture, while the multi-finger gesture is detected on the touch screen 112. For example, the reduced scale decreases with further pinching of finger contacts 565, 567, 569, 571, and 573 (i.e., web browser application view 504-6 is displayed at a smaller scale). Alternatively, the reduced scale increases with depinching of finger contacts 565, 567, 569, 571, and 573 (i.e., web browser application view 504-6 is displayed at a larger scale than before).

In some embodiments, when the multi-finger gesture ceases to be detected, web browser application view 504-6 ceases to be displayed, and the entire home screen 502 is displayed. Alternatively, when the multi-finger gesture ceases to be detected, it is determined whether the entire home screen 502 is to be displayed or web browser application view 504-6 is to be displayed at a full-screen scale. In some embodiments, the determination is made based on the reduced scale when the multi-finger gesture ceases to be displayed (e.g., if the application view is displayed at a scale smaller than a predefined threshold when the multi-finger gesture ceases to be detected, the entire home screen 502 is displayed; if the application view is displayed at a scale larger than the predefined threshold when the multi-finger gesture ceases to be detected, the application view is displayed at a full-screen scale without a display of home screen 502). In some embodiments, the determination is made also based on the speed of the multi-finger gesture.

FIGS. 7A-7D are flow diagrams illustrating a method 700 of navigating through concurrently open applications in accordance with some embodiments. Method 700 is performed at an electronic device (e.g., device 300, FIG. 3, or portable multifunction device 100, FIG. 1) with a display and a touch-sensitive surface. In some embodiments, the display is a touch screen display and the touch-sensitive surface is on the display. In some embodiments, the display is separate from the touch-sensitive surface. Some operations in method 700 may be combined and/or the order of some operations may be changed.

As described below, method 700 provides an intuitive way to navigate through concurrently open applications. The method reduces the cognitive burden on a user when navigating through concurrently open applications, thereby creating a more efficient human-machine interface. For battery-operated electronic devices, enabling a user to navigate through concurrently open applications faster and more efficiently conserves power and increases the time between battery charges.

The device displays (702) a first application view on the touch-sensitive display that corresponds to a first application in a plurality of concurrently open applications (e.g., web browser application view 504-6, FIG. 5G). The first application view is displayed without concurrently displaying an application view for any other application in the plurality of concurrently open applications.

While displaying the first application view, the device detects (704) a first predefined input. In some embodiments, the first predefined input is one of: a double-click 503 on a system button (e.g., home button 204) and a multi-finger gesture, such as a three-finger (or an N-finger) swipe-up gesture including finger contacts 505, 507, and 509, as shown in FIG. 5G.

In response to detecting the first predefined input (706), the device enters (708) an application view selection mode for selecting one of the concurrently open applications for display of a corresponding application view, displays (710) in a first predefined area of the touch-sensitive display a group of open application icons that correspond to at least some of the plurality of concurrently open applications, and concurrently displays (712) at least a portion of the first application view with the first predefined area. The open application icons in the group are displayed in accordance with a predetermined sequence of the open applications. For example, FIG. 5H illustrates that at least a portion of web browser application view 504-6 is concurrently displayed with a first predefined area (e.g., application icon area 506). As illustrated in FIG. 5H, the first predefined area (e.g., application icon area 506) includes open application icons (e.g., 5004-2, 5004-4, 5004-6, and 5004-8), and the open application icons are displayed in accordance with a predetermined sequence of the open applications, such as exemplary sequence #7, which arises based on the sequence of user interactions with the device described above:

| Exemplary Sequence #7 | |
| --- | --- |
| 1 | [web browser application] |
| 2 | weather application |
| 3 | map application |
| 4 | notes application |
| 5 | media store application |
| 6 | email application |

As noted above, the application corresponding to the displayed application view is indicated with a square bracket in the sequence (e.g., web browser application view 504-6 is displayed in FIG. 5H). In addition, the applications for which the application icons are displayed in application icon area 506 (FIG. 5H) are underlined.

The group of open application icons displayed in the application view selection mode allows a user to select an open application from a set of open applications corresponding to the open application icons in application icon area 506. In addition, the group of open application icons provides the user a visual indication of at least a portion of the predetermined sequence of open applications. As illustrated above, the sequence is determined by the user's prior interactions with the device.

In some embodiments, while displaying the group of open application icons in the first predefined area, the device detects (714) a gesture on a respective open application icon in the first predefined area. In response to detecting the gesture on the respective open application icon, the device updates the predetermined sequence of the open application icons, displays a respective application view on the touch-sensitive display for a corresponding application in the plurality of concurrently open applications, ceases to display open application icons in the first predefined area, and exits the application view selection mode. The respective application view is displayed without concurrently displaying an application view for any other application in the plurality of concurrently open applications. For example, in FIG. 5H, gesture 511 (e.g., a tap gesture) is detected on application icon 5004-8. In response, the device updates the predetermined sequence of the open application icons, and displays a respective application view for a corresponding application (e.g., media store application view 504-2, FIG. 5C). An exemplary updated predetermined sequence #17 of the open applications is then as follows:

| Exemplary Sequence #7 | | | Exemplary Sequence #17 | |
| --- | --- | --- | --- | --- |
| 1 | [web browser application] | | 1 | [media store application] |
| 2 | weather application | | 2 | web browser application |
| 3 | map application | → | 3 | weather application |
| 4 | notes application | | 4 | map application |
| 5 | media store application | | 5 | notes application |
| 6 | email application | | 6 | email application |

In this exemplary sequence #17, the position of the media store application (or an application for which a corresponding view is displayed) has moved up to the top of the predetermined sequence (e.g., a first position in the sequence), and the positions of other applications are shifted down accordingly (e.g., the web browser application moves from the first position to the second position, etc.). Alternatively, in some embodiments, the predetermined sequence of open applications is scrolled until the media store application is positioned on top of the sequence. [00159] While displaying the first application view without concurrently displaying an application view for any other application in the plurality of concurrently open applications (and while not in the application view selection mode), the device detects (716) a first gesture of a first gesture type on the touch-sensitive display (e.g., a three-finger (or a multi-finger) left-swipe gesture that includes finger contacts 517, 519, and 521, FIG. 5M). The first gesture is distinct from the first predefined input (e.g., the left-swipe gesture that includes finger contacts 517, 519, and 521 (FIG. 5M) is distinct from both the double-click 503 on home button 204 and the three-finger swipe-up gesture that includes finger contacts 505, 507, and 509 (FIG. 5G).

In response to detecting the first gesture of the first gesture type, the device displays (718) a second application view on the touch-sensitive display that corresponds to a second application in the plurality of concurrently open applications (e.g., weather application view 504-5, FIG. 5N). The second application view is displayed without concurrently displaying an application view for any other application in the plurality of concurrently open applications. The second application is adjacent to the first application in the predetermined sequence. For example, prior to detecting the first gesture, an exemplary sequence is as follows:

| Exemplary Sequence #7 | |
| --- | --- |
| 1 | [web browser application] |
| 2 | weather application |
| 3 | map application |
| 4 | notes application |
| 5 | media store application |
| 6 | email application |

In the exemplary sequence #7, the web browser application and the weather application are positioned next to each other in the predetermined sequence, without any other application between the web browser application and the weather application. In some embodiments, the term "adjacent to" is used to describe a condition that there is no other application between two applications in the predetermined sequence. For example, when an application A is adjacent to an application B in the predetermined sequence, no other application is positioned between the application A and the application B.

In other words, the application A and the application B are positioned without any other application between the two applications. In some embodiments, the term "adjacent to" is also used to describe a condition that one application is at one end of the predetermined sequence and the other application is at the opposite end of the predetermined sequence. For example, when the application C is the first application in the predetermined sequence and the application D is the last application in the predetermined sequence, the application C is adjacent to the application D, even though there may be one or more applications between the application C and the application D in the predetermined sequence. In other words, if the predetermined sequence is considered to form a loop, then the first application is adjacent to the last application in the loop.

In some embodiments, the first application is (720) at a first end of the predetermined sequence of the open applications, and the second application is at a second end of the predetermined sequence of the open applications. For example, the first application is a first application in the predetermined sequence of the open applications, and the second application is a last application in the predetermined sequence of the open applications. Alternatively, the first application is a last application in the predetermined sequence of the open applications, and the second application is a first application in the predetermined sequence of the open applications. In another example based on the exemplary sequence #7, the first application is the email application (the last application in the exemplary sequence #7), and the second application is the web browser application (the first application in the exemplary sequence #7). Thus, as illustrated in FIGS. 5R and 5S, in response to detecting a multi-finger left-swipe gesture while displaying email application view 504-1, web browser application view 504-6 is displayed. In other words, in some embodiments, when the device reaches an end of the predetermined sequence, the device selects the next application from the opposite end of the predetermined sequence for display.

In some embodiments, in response to detecting the first gesture of the first gesture type, the device updates (722) the predetermined sequence of the open applications. For example, the predetermined sequence of the open applications may be scrolled, as shown below:

| Exemplary Sequence #7 | | Exemplary Sequence #18 |
| --- | --- | --- |
| 1 [web browser application] | | 1 [weather application] |
| 2 weather application | | 2 map application |
| 3 map application | → | 3 notes application |
| 4 notes application | | 4 media store application |
| 5 media store application | | 5 email application |
| 6 email application | | 6 web browser application |

In some embodiments, while displaying the second application view on the touch-sensitive display without concurrently displaying an application view for any other application in the plurality of concurrently open applications (and while not in the application view selection mode), the device detects (724) a second gesture of the first gesture type (e.g., a three-finger (or multi-finger) left-swipe gesture including finger contacts 523, 525, and 527, FIG. 5N). In response to detecting the second gesture of the first gesture type, the device displays a third application view on the touch-sensitive display that corresponds to a third application in the plurality of concurrently open applications (e.g., map application view 504-4, FIG. 5O). The third application view is displayed without concurrently displaying an application view for any other application in the plurality of concurrently open applications. The third application is adjacent to the second application in the predetermined sequence. For example, in the exemplary sequence #11, the weather application and the map application are positioned next to each other in the predetermined sequence, without any other application between the weather application and the map application:

| Exemplary Sequence #11 | |
| --- | --- |
| 1 | web browser application |
| 2 | weather application |
| 3 | [map application] |
| 4 | notes application |
| 5 | media store application |
| 6 | email application |

Thus, in response to detecting the first gesture of the first gesture type, the second application view replaces the first application view without passing through a separate, intervening interface in an application view selection mode; in response detecting to the second gesture of the first gesture type, the third application view replaces the second application view without passing through a separate, intervening interface in an application view selection mode; and so on. This provides an alternative way to change application views. This alternative does not display application launch icons that correspond to at least part of the predetermined sequence of the open applications (e.g., application icon area 506 is not displayed). If this alternative was the only way to change application views, a user could become confused about what application view would appear next in response to each successive detection of a gesture of the first type (e.g., in response to each three-finger (or a multi-finger) left-swipe gesture). Such confusion is avoided here by also having a separate application view selection mode available to the user that displays open application icons (e.g., in area 506) that show the user the current order of the open applications in the predetermined sequence of open applications. Providing two complementary ways to select open software applications, one via a separate selection mode and the other modeless, makes navigation of concurrently open software applications faster and more efficient than either way by itself.

In some embodiments, the device updates the predetermined sequence of the open applications in response to a determination that predefined update criteria are satisfied. Exemplary update criteria are described below.

For example, consider the situation where the second application view is displayed after detecting the first gesture of the first gesture type. In some embodiments, while displaying the second application view on the touch-sensitive display without concurrently displaying an application view for any other application in the plurality of concurrently open applications (and while not in the application view selection mode), the device detects (726) an input for the second application on the touch-sensitive display. For example, the input for the second application includes interaction with a displayed UI element, such as moving a control, or typing into a text field. In response to detecting the input for the second application on the touch-sensitive display, the device updates the predetermined sequence of the open applications. For example, when a user scrolls to weather application view 504-5 (FIG. 5N) (e.g., via a three-finger (or a multi-finger) left-swipe gesture) and interacts with displayed UI elements in the weather application (FIG. 5N), the position of the weather application moves to the top of the sequence, and the web browser application moves down to the second position in the sequence. Similarly, in some embodiments, when a user scrolls to notes application view 504-3 (FIG. 5P) (e.g., via a second three-finger (or a multi-finger) left-swipe gesture), the predetermined sequence is not updated until the user interacts with displayed UI elements in the notes application (FIG. 5P). When the user interacts with a displayed UI element, the position of the notes application moves to the top of the sequence, as shown below:

| Exemplary Sequence #12 | | Exemplary Sequence #19 |
|---|---|---|
| 1 web browser application | | 1 [notes application] |
| 2 weather application | | 2 web browser application |
| 3 map application | → | 3 weather application |
| 4 [notes application] | | 4 map application |
| 5 media store application | | 5 media store application |
| 6 email application | | 6 email application |

For example, consider the situation where the second application view is displayed after detecting the first gesture of the first gesture type. In some embodiments, while displaying the second application view on the touch-sensitive display without concurrently displaying an application view for any other application in the plurality of concurrently open applications (and while not in the application view selection mode), the device determines (728) a duration for which the second application view is displayed. In response to determining that the duration exceeds a predefined time (e.g., 5 seconds, 10 seconds, 30 seconds, etc.), the device updates the predetermined sequence of the open applications (e.g., see the update from the exemplary sequence #12 to the exemplary sequence #19 shown above).

In some embodiments, while displaying the first application view without concurrently displaying an application view for any other application in the plurality of concurrently open applications (and while not in the application view selection mode), the device detects (730) a third gesture of a second gesture type on the touch-sensitive display (e.g., a three-finger (or multi-finger) right-swipe gesture including finger contacts 553, 555, and 557, FIG. 5S). The second gesture type is distinct from the first gesture type (e.g., the three-finger right-swipe gesture is distinct from the three-finger left-swipe gesture). In response to detecting the third gesture of the second gesture type, the device displays a fourth application view on the touch-sensitive display that corresponds to a fourth application in the plurality of concurrently open applications (e.g., email application view 504-1, FIG. 5T). The fourth application view is displayed without concurrently displaying an application view for any other application in the plurality of concurrently open applications. The fourth application is adjacent to the first application in the predetermined sequence. The fourth application is distinct from the second application.

| Exemplary Sequence #7 |
|---|
| [web browser application] |
| weather application |
| map application |
| notes application |
| media store application |
| email application |

For example, in the exemplary sequence #7, the email application is adjacent to the web browser application, because (as explained above) the email application is the last application in the sequence and the web browser application is the first application in the sequence.

In some embodiments, while displaying the first application view without concurrently displaying an application view for any other application in the plurality of concurrently open applications (and while not in the application view selection mode), the device detects a third gesture of a second gesture type on the touch-sensitive display (e.g., a three-finger (or multi-finger) right-swipe gesture including finger contacts 553, 555, and 557, FIG. 5S). The second gesture type is distinct from the first gesture type (e.g., the three-finger right-swipe gesture is distinct from the three-finger left-swipe gesture). When the first application is at one end of the predetermined sequence of open applications, in response to detecting the third gesture of the second gesture type, the device displays a fourth application view on the touch-sensitive display that corresponds to a fourth application. In some embodiments, the fourth application is a concurrently open application in the plurality of concurrently open applications. In some embodiments, the fourth application is a predefined application (e.g., a music player application). In some embodiments, the fourth application is preselected by a user.

In some embodiments, the device detects (732) a multi-finger gesture on the touch-sensitive display that is distinct from the first predefined input and a gesture of the first type. In response to detecting the multi-finger gesture on the touch-sensitive display, the device displays a home screen (e.g., without concurrently displaying an application view for any application in the plurality of concurrently open applications as shown in FIG. 5A). In some embodiments, the multi-finger gesture is a multi-finger pinch gesture (e.g., a five-finger pinch gesture including finger contacts 565, 567, 569, 571, and 573, FIG. 5W).

In some embodiments, the device detects (734) a multi-finger gesture on the touch-sensitive display that is distinct from the first predefined input and a gesture of the first type (e.g., a five-finger (or an N-finger) pinch gesture including finger contacts 565, 567, 569, 571, and 573, FIG. 5W). While detecting the multi-finger gesture on the touch-sensitive display, the device concurrently displays the first application view in a first reduced scale and at least a portion of a home screen, and adjusts the first reduced scale in accordance with the multi-finger gesture. For example, in FIG. 5X, web browser application view 504-6 is displayed in a reduced scale, and the reduced scale is adjusted based on the five-finger pinch gesture including finger contacts 565, 567, 569, 571, and 573. In response to ceasing to detect the multi-finger gesture, the device ceases to display the first application view, and displays the entire home screen (e.g., FIG. 5A).

In some embodiments, the first application view is displayed (736) at a first position on the touch-sensitive display (e.g., web browser application view 504-6, FIG. 5U), and the first application is at one end of the predetermined sequence of open applications (e.g., exemplary sequence #7). While displaying the first application view without concurrently displaying an application view for any other application in the plurality of concurrently open applications (and while not in the application view selection mode), the device detects a respective gesture of a second gesture type on the touch-sensitive display (e.g., a three-finger (or multi-finger) right-swipe gesture including finger contacts 559, 561, and 563, FIG. 5U). The second gesture type is distinct from the first gesture type. In response to detecting the respective gesture of the second gesture type, the device moves the first application view from the first position to a second position in accordance with the respective gesture of the second gesture type such that at least a portion of the first application view moves off the touch-sensitive display. For example, in FIG. 5V, web browser application view 504-6 is moved from first position 524 to second position 522 in accordance with the three-finger right-swipe gesture including finger contacts 559, 561, and 563. In response to ceasing to detect the respective gesture of the second gesture type on the touch-sensitive display, the device moves the first application view in a damped vibration motion with respect to the first position until a predefined oscillation condition is satisfied. For example, when finger contacts 559, 561, and 563 cease to be detected on touch screen 112, web browser application view 504-6 oscillates with respect to first position 524. The magnitude of oscillation decreases over time. After a predefined oscillation condition is satisfied, web browser application view 504-6 is displayed without oscillation. In some embodiments, the predefined oscillation condition includes a number of oscillations, a duration of time the first application view oscillates, a minimum magnitude of oscillation, or any combination thereof.

In some embodiments, the damped vibration motion is modeled (738) by a function of a mass, a spring constant, and a damping coefficient, and the mass decreases as a function of time. An exemplary function is:

$$mX''+cX'+kX=0 \quad \text{(Eq. 1)}$$

where m is a mass (or a corresponding value), k is a spring constant, c is a damping coefficient, and X represents a position of the first application view, typically as a function of time. X' is a first derivative of X, and X" is a second derivative of X. FIG. 5V illustrates that, in some embodiments, X represents a distance from first position 524 to position 522 of the first application view (e.g., web browser application view 504-6). In some embodiments, m represents a constant value (i.e., the value corresponding to m does not change over time). In some embodiments, m is a function of time (i.e., the value corresponding to m changes over time). In some embodiments, the value corresponding to m decreases over time. In some embodiments, the value corresponding to m decreases linearly over time. In some embodiments, the value corresponding to m decreases nonlinearly over time. In some embodiments, the value corresponding to m decreases inverse proportionally to time. In some embodiments, the value corresponding to m decreases exponentially over time.

Figure 8:
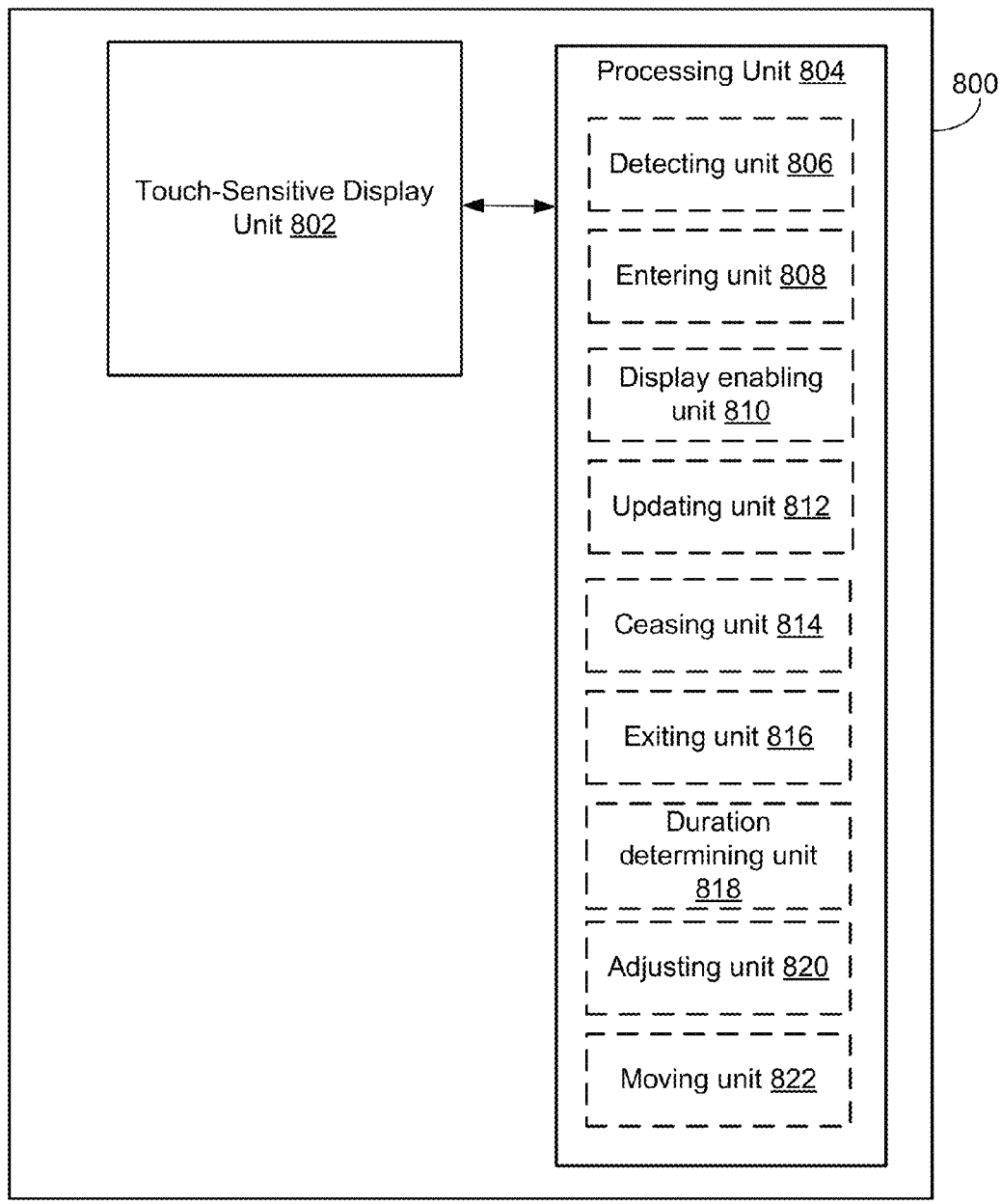
FIG. 8 is a functional block diagram of an electronic device in accordance with some embodiments.

In accordance with some embodiments, FIG. 8 shows a functional block diagram of an electronic device 800 configured in accordance with the principles of the invention as described above. The functional blocks of the electronic device may be implemented by hardware, software, or a combination of hardware and software to carry out the principles of the invention. It is understood by persons of skill in the art that the functional blocks described in FIG. 8 may be combined or separated into sub-blocks to implement the principles of the invention as described above. Therefore, the description herein may support any possible combination or separation or further definition of the functional blocks described herein.

As shown in FIG. 8, an electronic device 800 includes a touch-sensitive display unit 802 configured to display a first application view that corresponds to a first application in a plurality of concurrently open applications executable by a processing unit 804. The first application view is displayed without concurrently displaying an application view for any other application in the plurality of concurrently open applications. The electronic device 800 also includes a processing unit 804 coupled to the touch-sensitive display unit 802. In some embodiments, the processing unit 804 includes a detecting unit 806, an entering unit 808, a display enabling unit 810, an updating unit 812, a ceasing unit 814, an exiting unit 816, a duration determining unit 818, an adjusting unit 820, and a moving unit 822.

The processing unit 804 is configured to: while the touch-sensitive display unit 802 displays the first application view, detect a first predefined input (e.g., with the detecting unit 806); in response to detecting the first predefined input: enter an application view selection mode for selecting one of the concurrently open applications for display of a corresponding application view with the touch-sensitive display unit 802 (e.g., with the entering unit 808); enable display in a first predefined area of the touch-sensitive display unit 802 of a group of open application icons that correspond to at least some of the plurality of concurrently open applications (e.g., with the display enabling unit 810), the open application icons in the group being displayed in accordance with a predetermined sequence of the open applications; and enable concurrent display of at least a portion of the first application view with the first predefined area with the touch-sensitive display unit 802 (e.g., with the display enabling unit 810); while the touch-sensitive display unit 802 displays the first application view without concurrently displaying an application view for any other application in the plurality of concurrently open applications, detect a first gesture of a first gesture type on the touch-sensitive display unit 802 (e.g., with the detecting unit 806), the first gesture being distinct from the first predefined input; and, in response to detecting the first gesture of the first gesture type, enable display of a second application view on the touch-sensitive display unit 802 that corresponds to a second application in the plurality of concurrently open applications (e.g., with the display enabling unit 810), the second application being adjacent to the first application in the predetermined sequence, wherein the second application view is displayed without concurrently displaying an application view for any other application in the plurality of concurrently open applications.

In some embodiments, the processing unit 804 is configured to: while the touch-sensitive display unit 802 displays the second application view without concurrently displaying an application view for any other application in the plurality of concurrently open applications, detect a second gesture of the first gesture type (e.g., with the detecting unit 806); and, in response to detecting the second gesture of the first gesture type, enable display of a third application view on the touch-sensitive display unit 802 that corresponds to a third application in the plurality of concurrently open applications (e.g., with the display enabling unit 810), the third application being adjacent to the second application in the predetermined sequence, wherein the third application view is displayed without concurrently displaying an application view for any other application in the plurality of concurrently open applications.

In some embodiments, the processing unit 804 is configured to: while the touch-sensitive display unit 802 displays the first application view without concurrently displaying an application view for any other application in the plurality of concurrently open applications, detect a third gesture of a second gesture type on the touch-sensitive display unit 802 (e.g., with the detecting unit 806), the second gesture type being distinct from the first gesture type; and, in response to detecting the third gesture of the second gesture type, enable display of a fourth application view on the touch-sensitive display unit 802 that corresponds to a fourth application in the plurality of concurrently open applications (e.g., with the display enabling unit 810), the fourth application being adjacent to the first application in the predetermined sequence, the fourth application being distinct from the second application, wherein the fourth application view is displayed without concurrently displaying an application view for any other application in the plurality of concurrently open applications.

In some embodiments, the processing unit 804 is configured to: while the touch-sensitive display unit 802 displays the group of open application icons in the first predefined area, detect a gesture on a respective open application icon in the first predefined area (e.g., with the detecting unit 806); and, in response to detecting the gesture on the respective open application icon: update the predetermined sequence of the open application icons (e.g., with the updating unit 812); enable display of a respective application view on the touch-sensitive display unit 802 for a corresponding application in the plurality of concurrently open applications (e.g., with the display enabling unit 810), wherein the respective application view is displayed without concurrently displaying an application view for any other application in the plurality of concurrently open applications; cease to display open application icons in the first predefined area (e.g., with the ceasing unit 814); and exit the application view selection mode (e.g., with the exiting unit 816).

In some embodiments, the processing unit 804 is configured to: in response to detecting the first gesture of the first gesture type, update the predetermined sequence of the open applications (e.g., with the updating unit 812).

In some embodiments, the processing unit 804 is configured to: while the touch-sensitive display unit 802 displays the second application view without concurrently displaying an application view for any other application in the plurality of concurrently open applications: detect an input for the second application on the touch-sensitive display unit 802 (e.g., with the detecting unit 806); and, in response to detecting the input for the second application on the touch-sensitive display unit 802, update the predetermined sequence of the open applications (e.g., with the updating unit 812).

In some embodiments, the processing unit 804 is configured to: while the touch-sensitive display unit 802 displays the second application view without concurrently displaying an application view for any other application in the plurality of concurrently open applications: determine a duration for which the second application view is displayed (e.g., with the duration determining unit 818); and, in response to determining that the duration exceeds a predefined time, update the predetermined sequence of the open applications (e.g., with the updating unit 812).

In some embodiments, the processing unit 804 is configured to: detect a multi-finger gesture on the touch-sensitive display unit 802 that is distinct from the first predefined input and the first gesture (e.g., with the detecting unit 806); and, in response to detecting the multi-finger gesture on the touch-sensitive display unit 802, enable display of a home screen on the touch-sensitive display unit 802 (e.g., with the display enabling unit 810).

In some embodiments, the processing unit 804 is configured to: detect a multi-finger gesture on the touch-sensitive display unit 802 that is distinct from the first predefined input and the first gesture (e.g., with the detecting unit 806); while detecting the multi-finger gesture on the touch-sensitive display unit 802: enable concurrent display of the first application view in a first reduced scale and at least a portion of a home screen on the touch-sensitive display unit 802 (e.g., with the display enabling unit 810); and adjust the first reduced scale in accordance with the multi-finger gesture (e.g., with the adjusting unit 820); and, in response to ceasing to detect the multi-finger gesture: cease to display the first application view (e.g., with the ceasing unit 814); and enable display of the entire home screen on the touch-sensitive display unit 802 (e.g., with the display enabling unit 810).

In some embodiments, the first application is at a first end of the predetermined sequence of the open applications, and the second application is at a second end of the predetermined sequence of the open applications.

In some embodiments, the first application view is displayed at a first position on the touch-sensitive display unit 802, the first application is at one end of the predetermined sequence of the open applications, and the processing unit 804 is configured to: while the touch-sensitive display unit 802 displays the first application view without concurrently displaying an application view for any other application in the plurality of concurrently open applications: detect a respective gesture of a second gesture type on the touch-sensitive display unit 802 (e.g., with the detecting unit 806), the second gesture type being distinct from the first gesture type; in response to detecting the respective gesture of the second gesture type, move the first application view from the first position to a second position in accordance with the respective gesture of the second gesture type such that at least a portion of the first application view moves off the touch-sensitive display unit 802 (e.g., with the moving unit 822); and, in response to ceasing to detect the respective gesture of the second gesture type on the touch-sensitive display, move the first application view in a damped vibration motion with respect to the first position until a predefined oscillation condition is satisfied (e.g., with the moving unit 822).

In some embodiments, the damped vibration motion is modeled by a function of a mass, a spring constant, and a damping coefficient, and the mass decreases as a function of time.

The operations in the information processing methods described above may be implemented by running one or more functional modules in information processing apparatus such as general purpose processors or application specific chips. These modules, combinations of these modules, and/or their combination with general hardware (e.g., as described above with respect to FIGS. 1A and 3) are all included within the scope of protection of the invention.

The operations described above with reference to FIGS. 7A-7D may be implemented by components depicted in FIGS. 1A-1B. For example, detecting operation 704, application view selection mode entering operation 708, and updating operation 724 may be implemented by event sorter 170, event recognizer 180, and event handler 190. Event monitor 171 in event sorter 170 detects a contact on touch-sensitive display 112, and event dispatcher module 174 delivers the event information to one or more applications (e.g., 136-1 and 136-2) and/or operating system 126. A respective event recognizer 180 of an application (e.g., 136-1) or an operating system 126 compares the event information to respective event definitions 186, and determines whether a first contact at a first location on the touch-sensitive surface corresponds to a predefined event or sub-event, such as selection of an object on a user interface. When a respective predefined event or sub-event is detected, event recognizer 180 activates an event handler 190 associated with the detection of the event or sub-event. Event handler 190 may utilize or call data updater 176 or object updater 177 to update the application internal state 192 and/or the device/global internal state 157. In some embodiments, event handler 190 accesses a respective GUI updater 178 to update what is displayed by the application. Similarly, it would be clear to a person having ordinary skill in the art how other processes can be implemented based on the components depicted in FIGS. 1A-1B.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best utilize the invention and various embodiments with various modifications as are suited to the particular use contemplated.

What is claimed is:

1. A multifunction device, comprising:
a touch-sensitive display;
one or more processors;
memory; and
one or more programs, wherein the one or more programs are stored in the memory and configured to be executed by the one or more processors, the one or more programs including instructions for:
displaying a first application view on the touch-sensitive display that corresponds to a first application in a plurality of concurrently open applications, wherein the first application view is displayed without concurrently displaying an application view for any other application in the plurality of concurrently open applications;
while displaying the first application view, detecting a first predefined input;
in response to detecting the first predefined input:
entering an application view selection mode for selecting one of the concurrently open applications for display of a corresponding application view;
displaying in a first predefined area of the touch-sensitive display a group of open application icons that correspond to at least some of the plurality of concurrently open applications, the open application icons in the group being displayed in accordance with a predetermined sequence of the open applications; and
concurrently displaying at least a portion of the first application view with the first predefined area;
while displaying the first application view without concurrently displaying an application view for any other application in the plurality of concurrently open applications, detecting a first gesture of a first gesture type on the first application view, on the touch-sensitive display, the first gesture being distinct from the first predefined input; and
in response to detecting the first gesture of the first gesture type, displaying a second application view on the touch-sensitive display that corresponds to a second application in the plurality of concurrently open applications, the second application being adjacent to the first application in the predetermined sequence, wherein the second application view is displayed without concurrently displaying an application view for any other application in the plurality of concurrently open applications.

2. The multifunction device of claim 1, wherein the one or more programs include instructions for:
while displaying the first application view without concurrently displaying an application view for any other application in the plurality of concurrently open applications, detecting a third gesture of a second gesture type on the touch-sensitive display, the second gesture type being distinct from the first gesture type; and
in response to detecting the third gesture of the second gesture type, displaying a fourth application view on the touch-sensitive display that corresponds to a fourth application in the plurality of concurrently open applications, the fourth application being adjacent to the first application in the predetermined sequence, the fourth application being distinct from the second application, wherein the fourth application view is displayed without concurrently displaying an application view for any other application in the plurality of concurrently open applications.

3. The multifunction device of claim 1, wherein the one or more programs include instructions for, in response to detecting the first gesture of the first gesture type, updating the predetermined sequence of the open applications.

4. The multifunction device of claim 1, wherein the one or more programs include instructions for:
detecting a multi-finger gesture on the touch-sensitive display that is distinct from the first predefined input and a gesture of the first gesture type; and
in response to detecting the multi-finger gesture on the touch-sensitive display, displaying a home screen.

5. The multifunction device of claim 1, wherein the one or more programs include instructions for:
detecting a multi-finger gesture on the touch-sensitive display that is distinct from the first predefined input and a gesture of the first gesture type;
while detecting the multi-finger gesture on the touch-sensitive display:
concurrently displaying the first application view in a first reduced scale and at least a portion of a home screen; and
adjusting the first reduced scale in accordance with the multi-finger gesture; and
in response to ceasing to detect the multi-finger gesture:
ceasing to display the first application view; and
displaying the entire home screen.

6. The multifunction device of claim 1, wherein the first application view is displayed at a first position on the touch-sensitive display, the first application is at one end of the predetermined sequence of the open applications, and the one or more programs include instructions for:
while displaying the first application view without concurrently displaying an application view for any other application in the plurality of concurrently open applications:
detecting a respective gesture of a second gesture type on the touch-sensitive display, the second gesture type being distinct from the first gesture type;
in response to detecting the respective gesture of the second gesture type, moving the first application view from the first position to a second position in accordance with the respective gesture of the second gesture type such that at least a portion of the first application view moves off the touch-sensitive display; and
in response to ceasing to detect the respective gesture of the second gesture type on the touch-sensitive display, moving the first application view in a damped vibration motion with respect to the first position until a predefined oscillation condition is satisfied.

7. A method, comprising:
at a multifunction device with a touch-sensitive display:
displaying a first application view on the touch-sensitive display that corresponds to a first application in a plurality of concurrently open applications, wherein the first application view is displayed without concurrently displaying an application view for any other application in the plurality of concurrently open applications;

while displaying the first application view, detecting a first predefined input;

in response to detecting the first predefined input:
- entering an application view selection mode for selecting one of the concurrently open applications for display of a corresponding application view;
- displaying in a first predefined area of the touch-sensitive display a group of open application icons that correspond to at least some of the plurality of concurrently open applications, the open application icons in the group being displayed in accordance with a predetermined sequence of the open applications; and
- concurrently displaying at least a portion of the first application view with the first predefined area;

while displaying the first application view without concurrently displaying an application view for any other application in the plurality of concurrently open applications, detecting a first gesture of a first gesture type on the first application view, on the touch-sensitive display, the first gesture being distinct from the first predefined input; and in response to detecting the first gesture of the first gesture type, displaying a second application view on the touch-sensitive display that corresponds to a second application in the plurality of concurrently open applications, the second application being adjacent to the first application in the predetermined sequence, wherein the second application view is displayed without concurrently displaying an application view for any other application in the plurality of concurrently open applications.

8. The method of claim 7, including:

while displaying the first application view without concurrently displaying an application view for any other application in the plurality of concurrently open applications, detecting a third gesture of a second gesture type on the touch-sensitive display, the second gesture type being distinct from the first gesture type; and in response to detecting the third gesture of the second gesture type, displaying a fourth application view on the touch-sensitive display that corresponds to a fourth application in the plurality of concurrently open applications, the fourth application being adjacent to the first application in the predetermined sequence, the fourth application being distinct from the second application, wherein the fourth application view is displayed without concurrently displaying an application view for any other application in the plurality of concurrently open applications.

9. The method of claim 7, including:

in response to detecting the first gesture of the first gesture type, updating the predetermined sequence of the open applications.

10. A non-transitory computer readable storage medium storing one or more programs, the one or more programs comprising instructions, which when executed by a multifunction device with a touch-sensitive display, cause the device to:

display a first application view on the touch-sensitive display that corresponds to a first application in a plurality of concurrently open applications, wherein the first application view is displayed without concurrently displaying an application view for any other application in the plurality of concurrently open applications;

while displaying the first application view, detect a first predefined input;

in response to detecting the first predefined input:
- enter an application view selection mode for selecting one of the concurrently open applications for display of a corresponding application view;
- display in a first predefined area of the touch-sensitive display a group of open application icons that correspond to at least some of the plurality of concurrently open applications, the open application icons in the group being displayed in accordance with a predetermined sequence of the open applications; and
- concurrently display at least a portion of the first application view with the first predefined area;

while displaying the first application view without concurrently displaying an application view for any other application in the plurality of concurrently open applications, detect a first gesture of a first gesture type on the first application view, on the touch-sensitive display, the first gesture being distinct from the first predefined input; and in response to detecting the first gesture of the first gesture type, display a second application view on the touch-sensitive display that corresponds to a second application in the plurality of concurrently open applications, the second application being adjacent to the first application in the predetermined sequence, wherein the second application view is displayed without concurrently displaying an application view for any other application in the plurality of concurrently open applications.

11. The multifunction device of claim 1, wherein in response to detecting the first gesture of the first gesture type, the second application view replaces the first application view on the touch-sensitive display without passing through a separate, intervening interface in an application view selection mode.

12. The method of claim 7, including:

detecting a multi-finger gesture on the touch-sensitive display that is distinct from the first predefined input and a gesture of the first gesture type; and in response to detecting the multi-finger gesture on the touch-sensitive display, displaying a home screen.

13. The method of claim 7, including:

detecting a multi-finger gesture on the touch-sensitive display that is distinct from the first predefined input and a gesture of the first gesture type;

while detecting the multi-finger gesture on the touch-sensitive display:
- concurrently displaying the first application view in a first reduced scale and at least a portion of a home screen; and
- adjusting the first reduced scale in accordance with the multi-finger gesture; and in response to ceasing to detect the multi-finger gesture:
- ceasing to display the first application view; and
- displaying the entire home screen.

14. The method of claim 7, including:

while displaying the first application view without concurrently displaying an application view for any other application in the plurality of concurrently open applications:
- detecting a respective gesture of a second gesture type on the touch-sensitive display, the second gesture type being distinct from the first gesture type;
- in response to detecting the respective gesture of the second gesture type, moving the first application view from the first position to a second position in accordance with the respective gesture of the second gesture type such that at least a portion of the first application view moves off the touch-sensitive display; and in response to ceasing to detect the respective gesture of the second gesture type on the touch-sensitive display, moving the first application view in a damped vibration motion with respect to the first position until a predefined oscillation condition is satisfied.

15. The method of claim 7, wherein, in response to detecting the first gesture of the first gesture type, the second application view replaces the first application view on the touch-sensitive display without passing through a separate, intervening interface in an application view selection mode.

16. The non-transitory computer readable storage medium of claim 10, wherein the one or more programs include instructions, which when executed by the multifunction device with the touch-sensitive display, cause the device to:

while displaying the first application view without concurrently displaying an application view for any other application in the plurality of concurrently open applications, detect a third gesture of a second gesture type on the touch-sensitive display, the second gesture type being distinct from the first gesture type; and in response to detecting the third gesture of the second gesture type, display a fourth application view on the touch-sensitive display that corresponds to a fourth application in the plurality of concurrently open applications, the fourth application being adjacent to the first application in the predetermined sequence, the fourth application being distinct from the second application, wherein the fourth application view is displayed without concurrently displaying an application view for any other application in the plurality of concurrently open applications.

17. The non-transitory computer readable storage medium of claim 10, wherein the one or more programs include instructions, which when executed by the multifunction device with the touch-sensitive display, cause the device to, in response to detecting the first gesture of the first gesture type, update the predetermined sequence of the open applications.

18. The non-transitory computer readable storage medium of claim 10, wherein the one or more programs include instructions, which when executed by the multifunction device with the touch-sensitive display, cause the device to:

detect a multi-finger gesture on the touch-sensitive display that is distinct from the first predefined input and a gesture of the first gesture type; and in response to detecting the multi-finger gesture on the touch-sensitive display, display a home screen.

19. The non-transitory computer readable storage medium of claim 10, wherein the one or more programs include instructions, which when executed by the multifunction device with the touch-sensitive display, cause the device to:

detect a multi-finger gesture on the touch-sensitive display that is distinct from the first predefined input and a gesture of the first gesture type;

while detecting the multi-finger gesture on the touch-sensitive display:
concurrently display the first application view in a first reduced scale and at least a portion of a home screen; and
adjust the first reduced scale in accordance with the multi-finger gesture; and in response to ceasing to detect the multi-finger gesture:
cease to display the first application view; and
display the entire home screen.

20. The non-transitory computer readable storage medium of claim 10, wherein the one or more programs include instructions, which when executed by the multifunction device with the touch-sensitive display, cause the device to:

while displaying the first application view without concurrently displaying an application view for any other application in the plurality of concurrently open applications:
detect a respective gesture of a second gesture type on the touch-sensitive display, the second gesture type being distinct from the first gesture type;
in response to detecting the respective gesture of the second gesture type, move the first application view from the first position to a second position in accordance with the respective gesture of the second gesture type such that at least a portion of the first application view moves off the touch-sensitive display; and
in response to ceasing to detect the respective gesture of the second gesture type on the touch-sensitive display, move the first application view in a damped vibration motion with respect to the first position until a predefined oscillation condition is satisfied.

21. The non-transitory computer readable storage medium of claim 10, wherein in response to detecting the first gesture of the first gesture type, the second application view replaces the first application view on the touch-sensitive display without passing through a separate, intervening interface in an application view selection mode.

* * * * *